United States Patent [19]
Ritchey

[11] Patent Number: 5,130,794
[45] Date of Patent: Jul. 14, 1992

[54] PANORAMIC DISPLAY SYSTEM

[76] Inventor: Kurtis J. Ritchey, 26374 Tonganoxie Rd., Leavenworth, Kans. 66048

[21] Appl. No.: 501,277

[22] Filed: Mar. 29, 1990

[51] Int. Cl.$^5$ .............................................. H04N 7/18
[52] U.S. Cl. ..................................... 358/87; 358/104; 358/250; 358/230; 358/93
[58] Field of Search ................... 358/87, 104, 93, 230, 358/250, 237, 238; 454/40; 364/521; 352/70; 353/82

[56] References Cited

U.S. PATENT DOCUMENTS

| | | | |
|---|---|---|---|
| 3,564,134 | 2/1971 | Rue et al. | 358/109 |
| 4,172,264 | 10/1979 | Taylor et al. | 358/185 |
| 4,299,447 | 11/1981 | Soltan et al. | 350/334 |
| 4,303,946 | 12/1981 | Berry | 358/87 X |
| 4,334,245 | 6/1982 | Michael | 358/183 |
| 4,339,694 | 7/1982 | Ohkoshi et al. | 315/366 |
| 4,355,328 | 10/1982 | Kulik | 358/87 |
| 4,463,380 | 7/1984 | Hooks, Jr. | 358/160 |
| 4,514,818 | 4/1985 | Walker | 364/521 |
| 4,549,208 | 10/1985 | Kamejima et al. | 358/108 |
| 4,562,478 | 12/1985 | Hirasawa et al. | 358/236 |
| 4,563,703 | 1/1986 | Taylor et al. | 358/160 |
| 4,571,628 | 2/1986 | Thornton | 358/224 |
| 4,613,210 | 9/1986 | Pollard | 350/356 |
| 4,650,280 | 3/1987 | Sedlmayr | 350/96.27 |
| 4,656,506 | 4/1987 | Ritchey | 358/87 |
| 4,670,648 | 6/1987 | Hall et al. | 250/216 |
| 4,672,435 | 6/1987 | Glück | 358/87 X |
| 4,734,779 | 3/1988 | Levis et al. | 358/231 |
| 4,740,779 | 4/1988 | Cleary et al. | 358/104 X |
| 4,885,878 | 12/1989 | Wuu | 358/104 |
| 4,962,420 | 10/1990 | Judenich | 358/104 X |
| 5,023,725 | 6/1991 | McCutcheon | 358/87 |

OTHER PUBLICATIONS

"Model 34V-131 Flatscreen TM—A Supersize TV/Computer Display"; 1985 Lucitron, Inc.
"Show It Big, with Professional General Electric Talaria TM Television Projection"; GE Projection Display Products; 1987.
"Guide to Professional Video Projectors" Videography, May '86; Heiss.
"Beamscope"; Edmund Scientific Co.; 1985.
"Fibervision", Advance Display Technologies, Inc., 1986.
"Telepresence Systems—Display System Optics" Ritchey presentation on Mar. 30, 31 '89 to SPIE; pp. 1-15.
"The Lens and All Its Jobs"; Ray; Hastings Howe Publishers, New York, N.Y.; 1977; various pages.
"Basic Optics and Optical Instruments"; Bureau of Navy Personnel; Dover Publications, Inc.; New York; 1969; various pages.
Carl Zeiss T* Lenses 1980's by CONTAX of Japan.
Tamron SP17mm F3.5 Ultra-Wide Angle 104° Field of View lens by Tamron Co. Ltd. 1980's Japan.
"Fiberoptics: Theory and Applications" Technical Memorandum by Gallileo Electro-Optics Corp. 1980's.
"Schott Image Guides—Resolution Beyond Compare"; Schott Fiber Optics, Jan. '89.

(List continued on next page.)

Primary Examiner—Victor R. Kostak

[57] ABSTRACT

A panoramic image based virtual reality display system includes a panoramic optical assembly, preferably of substantially spherical coverage, feeding composite optical images to a light sensitive surface of a video camera for storage or further processing in image processing circuitry. Such image processing circuitry includes a special effects generator and image segment circuitry to divide a composite image into a plurality of image segments or sub-segments for display on individual displays of multiple video display assemblies. Such a multiple video display assembly preferably includes a closed structure having individual display units mounted in all viewable directions therein, with segments of the composite image displayed on respective display units to recreate the panoramic view gathered by the panoramic optical assembly. The image processing circuitry may also select a portion or portions of the composite image for display on one or two displays of a head mounted display unit.

48 Claims, 24 Drawing Sheets

OTHER PUBLICATIONS

"½ Inch CCD Color Video Camera" BY-1OU Series; JVC Professional 1989.

"S-VHS Product Line" Panasonic, 1989.

"8mm Camcorder" by Sony, 1990,

"TMC-50" by Polnix, 1990.

"XC-711" by Sony, 1990.

"DAGE-MTI Products Guide" DAGE-MTI Inc., 1990.

"Video Multiplexer 496A/B"; Colorado Video Inc., 1989.

"Data Recording" Janes Avionics Inc, U.K., 1989–'90.

"Wireless Video Camera Link" Sheets et al; Radio Electronics Feb. '86.

"Digital Production Center" Quantel Inc. 1987.

"Quantel—Step Closer to the Digital Studio" Quantel Inc., 1985.

"Encore" Quantel Inc., 1989.

"HarrySound" Solid State Logic; 1989.

"Inventing Images: The Mirage"; Foreman; Motion Magazine Dec. '85.

"Paintbox", Quantel Inc., 1989.

"The Illuminator—Software Reference Manual"; Matrox Electronic Systems Ltd; Dec. '89.

The Illuminator-Installation Manual; Matrox Electronics Systems Ltd. Dec. '89.

"Jarga—Videographic Adapters/Software and AT-Vista" by Truevision; 1988.

"Megaplus Framegrabber" Epix 1990.

"Pixar Image Computer—Geophysical Analysis" Pixar, 1986.

"Eyephone" System; VPL Research Inc., 1989.

"What is Artificial Reality?" Article by Pollach in Apr. '89 issue of New York Times.

"3 Space Isotrak" User's Manual; Polhemus Navigation Sciences Division of McDonnell Douglas Electronics; May '87.

"3 Space Isotrak and 3 Space Tracker"; Polhemus Navigation Sciences Division of McDonnell Douglas Electronics; Jan. '86.

"Talk Instead of Type" Kurzweil Voicesystem of Kurzweil Applied Intelligence, Inc.; 1987.

"Robotics—Robots and voice recognition"; Robillard in Radio-Electronics, Jan. '86.

"FD-40A—Flat Black and White TV" by Sony, 1984.

"PICBLOC—A Flexible Method of Controlling Video Walls"; Image Technology; Oct. '87.

"PICBLOC", Electronic Systems Inc., 1988.

"The Eyeful Tower: Video Wall Stacks Up" Stark; Video Systems Magazine, Part I in Apr. '87, Part III in May '87.

"Delcom Universal System", Sounds Good Audio; Aug. '88.

"Universal", Station-Pro, Station-Base, Combination: Universal and Station Pro for 64 Monitor Wall, Delcom USA Inc; '88.

"The Delcom Video Wall"; Delcom USA Inc., '88.

"Philips-Multi-Image Giant Screen Video-Vidiwall" North American Philips Inc. '88.

Barco SCM 2840: 28" Flat Square System Colour Monitor" Barco '89.

"RCA Discloses Technical Details of Concept for a Wall-Mounted, 50 Inch Color TV Display" RCA News; Apr. '80.

"A Four-Square-Foot Monochrome Flatscreen TM Display" Lucitron, Inc.; Dejule et al. 1986.

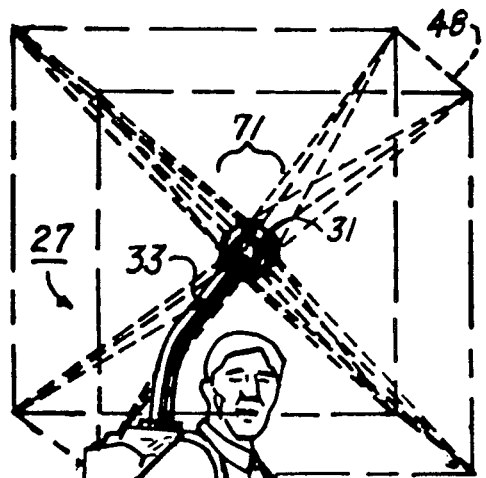
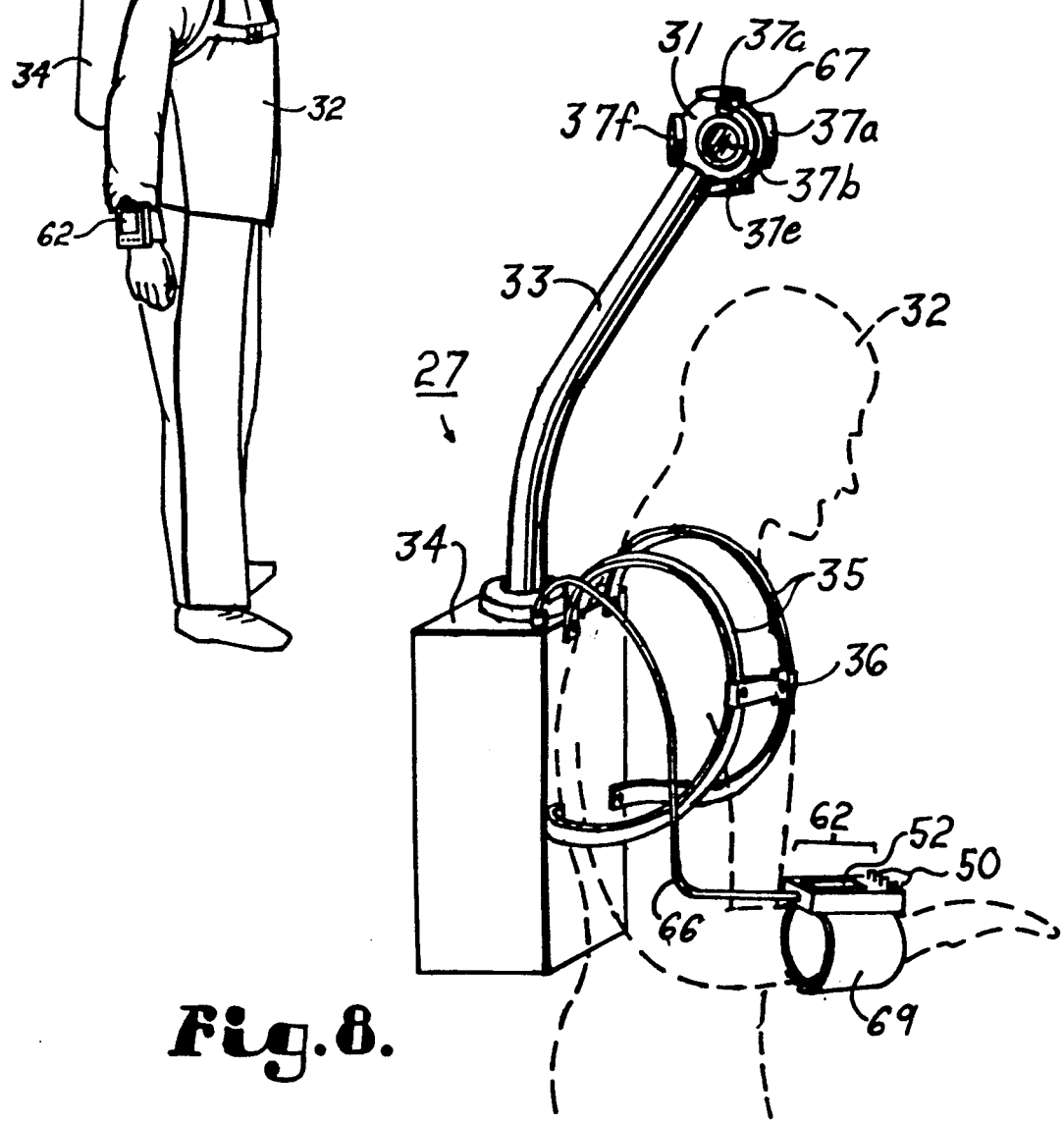
Fig. 7.
Fig. 8.

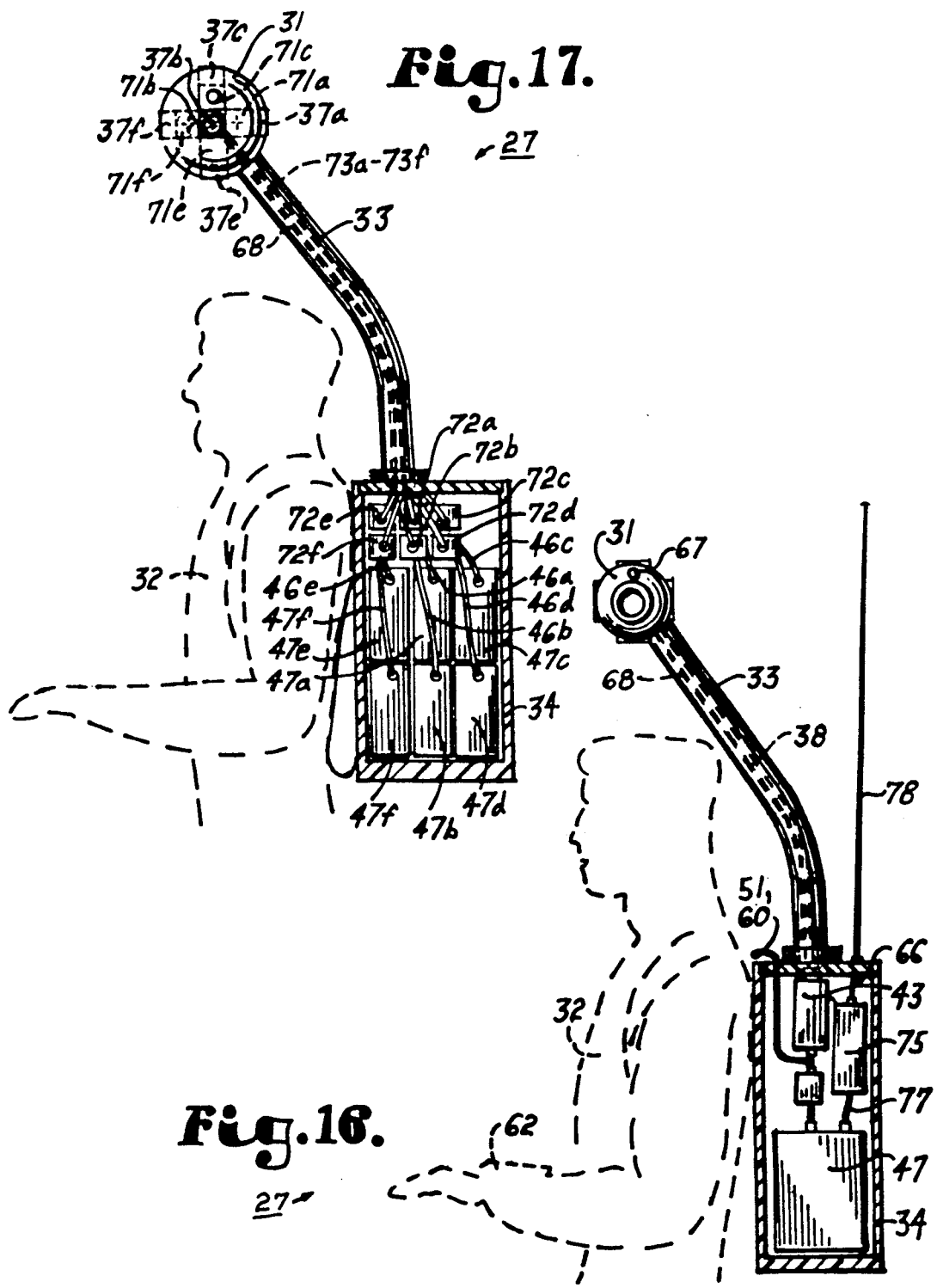

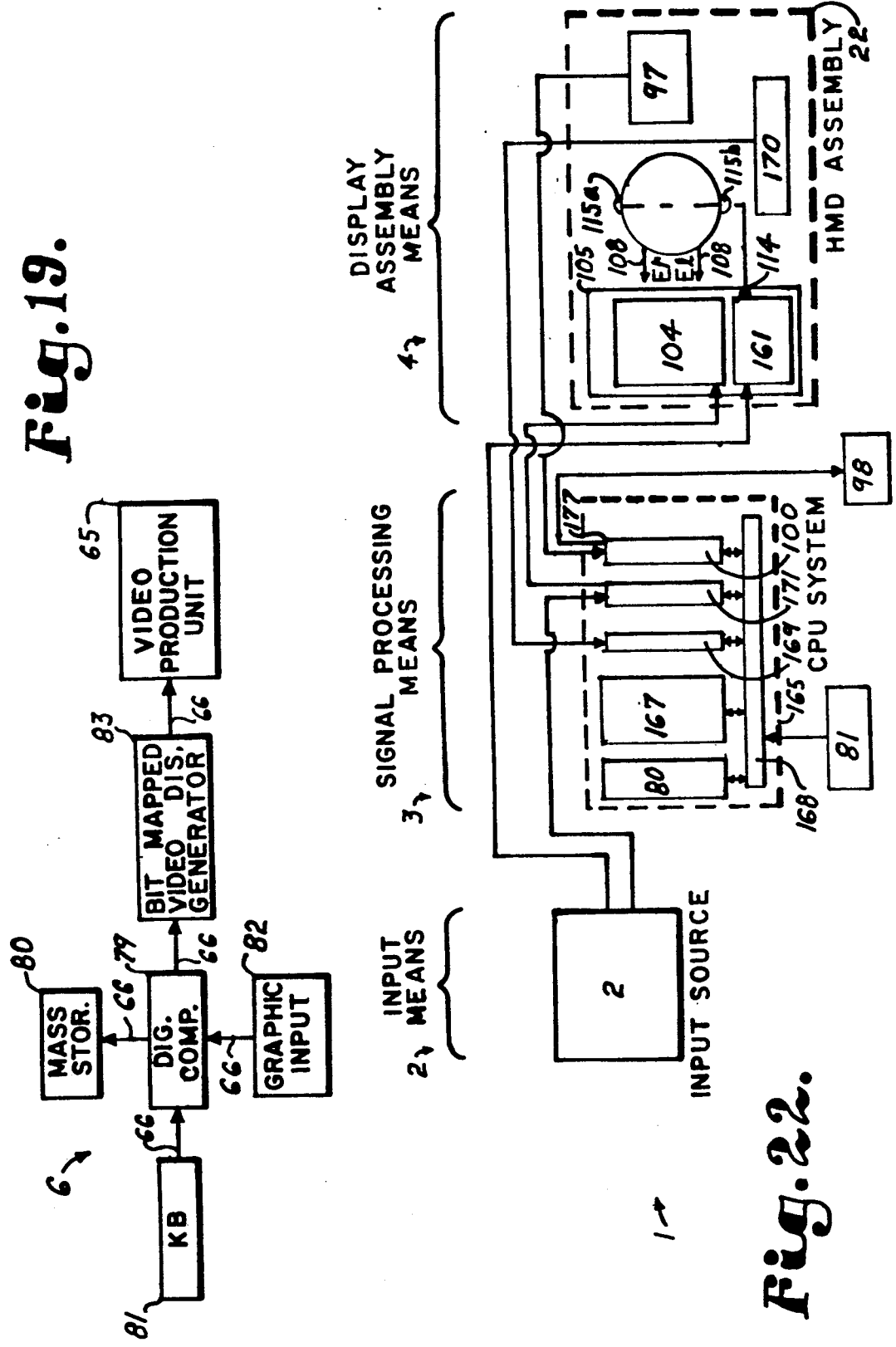

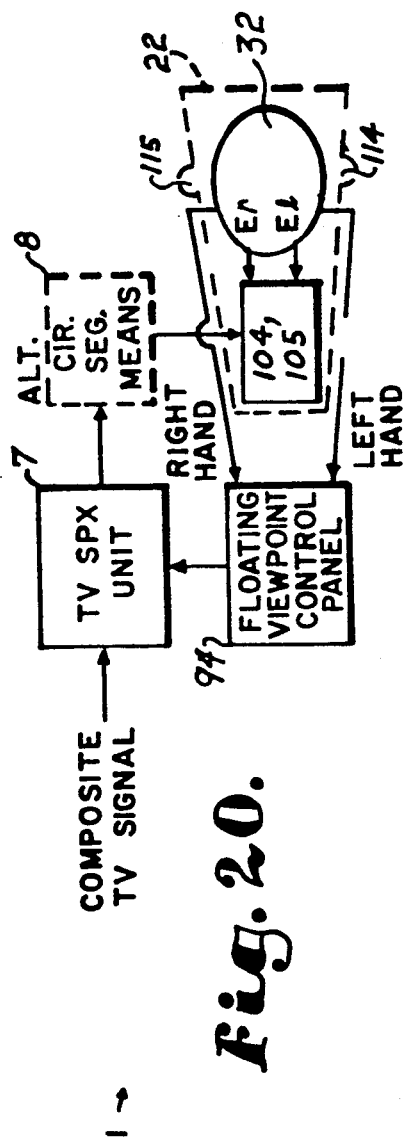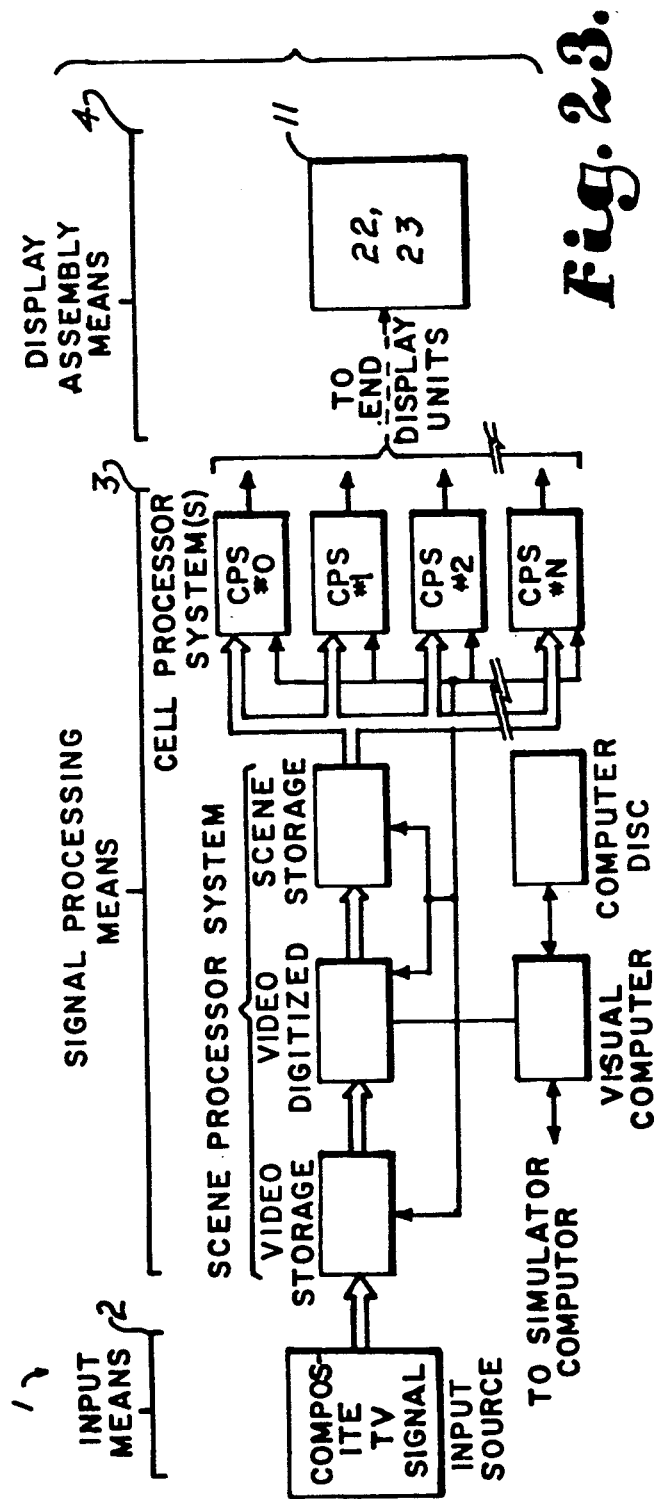

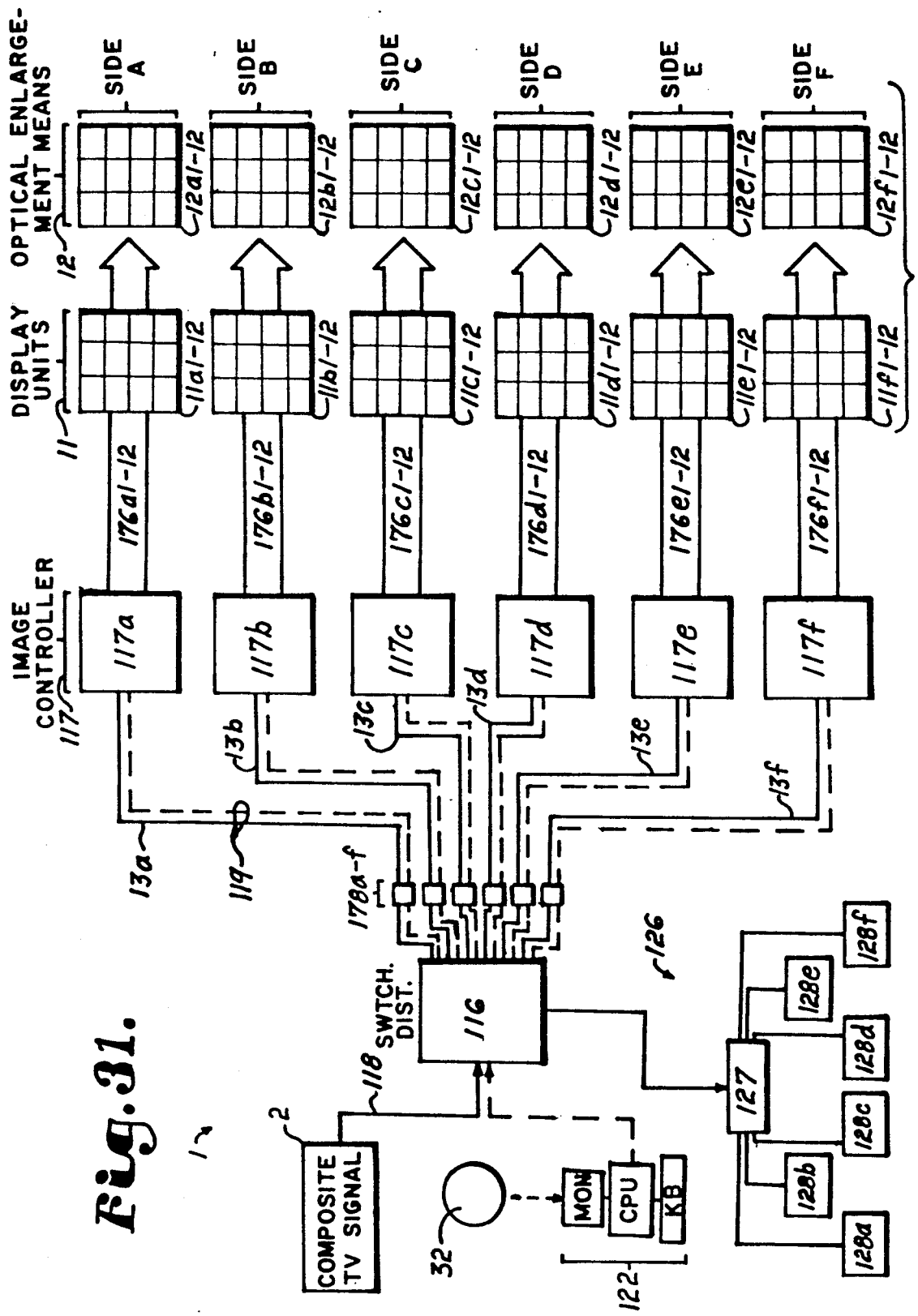

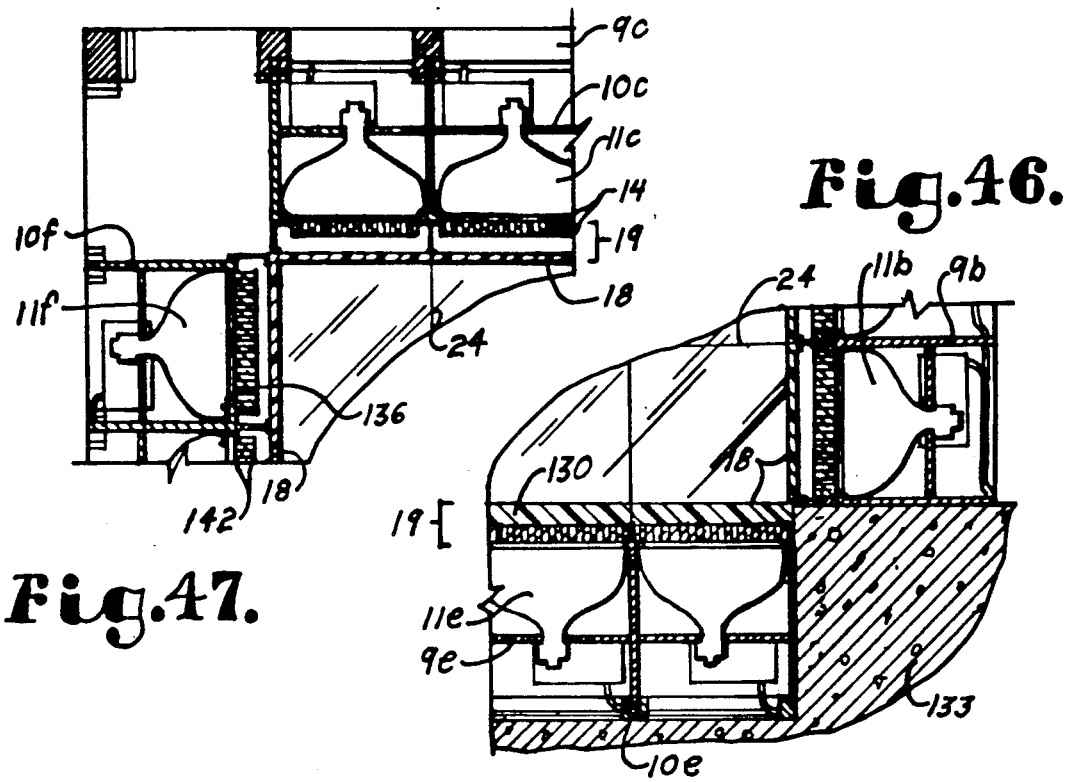
Fig.46.
Fig.47.
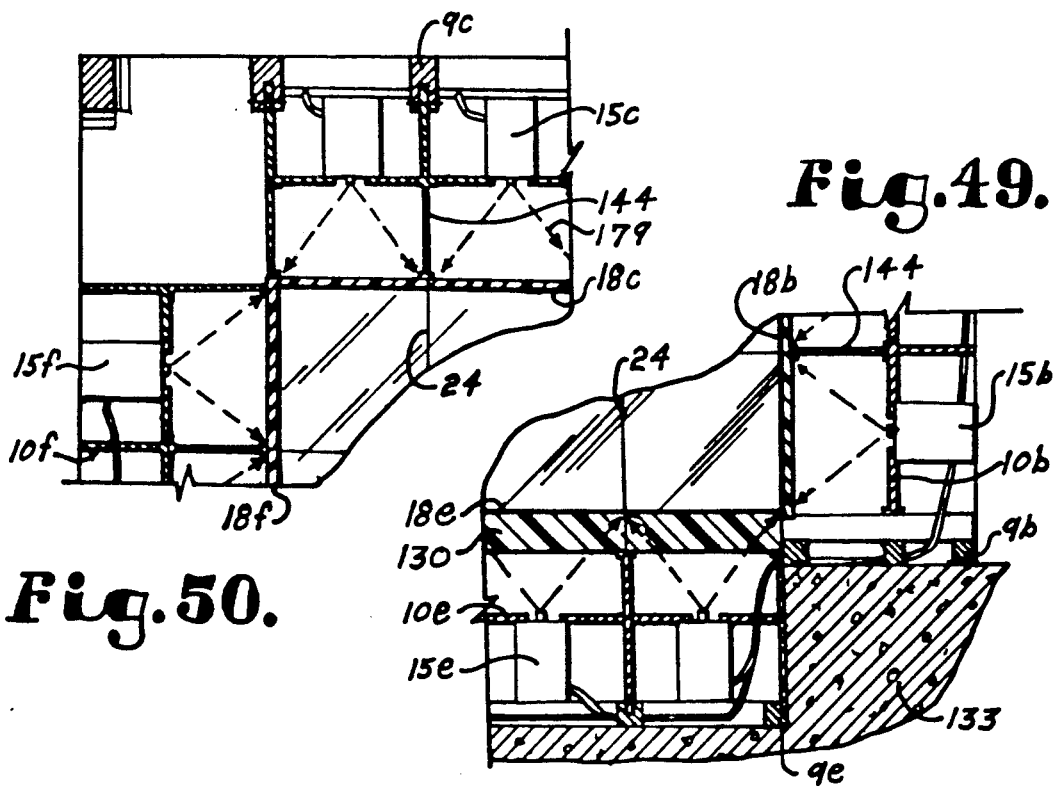
Fig.49.
Fig.50.

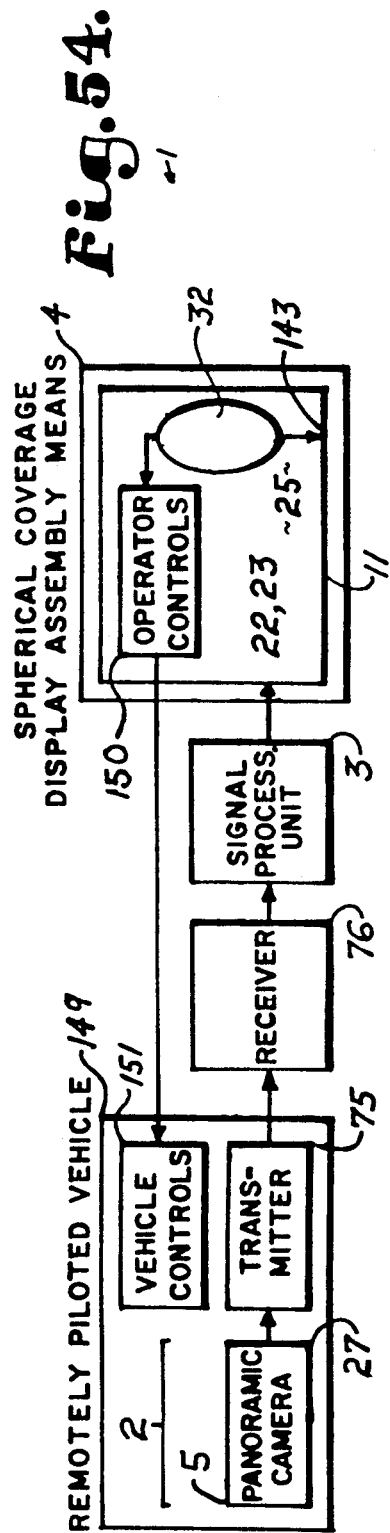
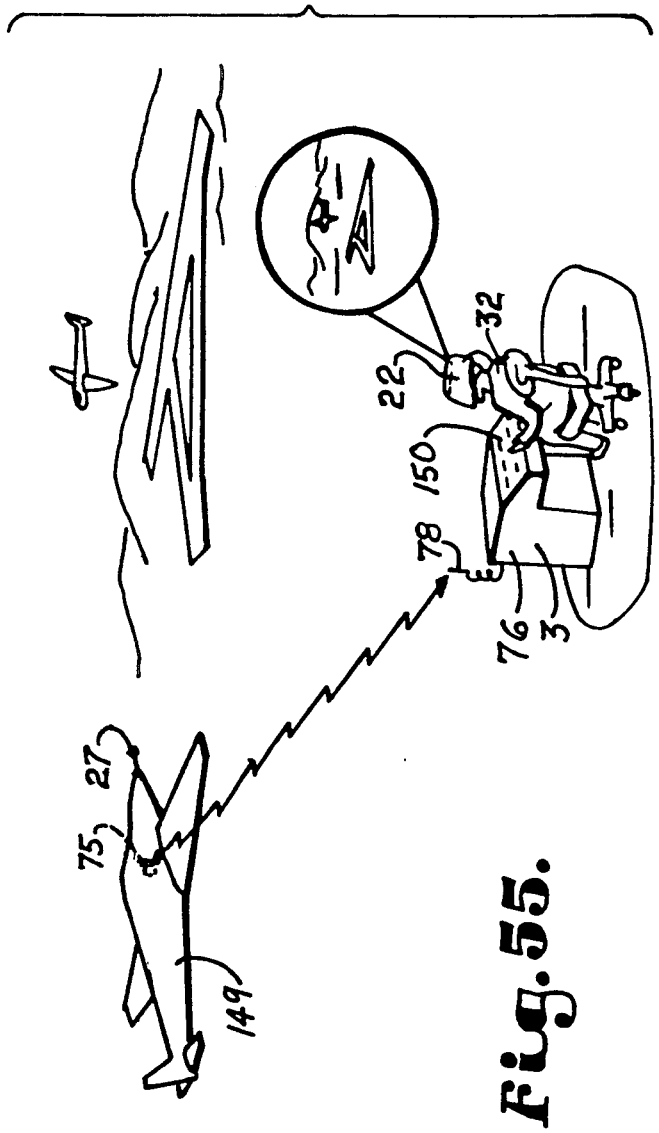
Fig. 54.
Fig. 55.

PANORAMIC DISPLAY SYSTEM

SUMMARY OF THE INVENTION

The present invention provides improved panoramic display systems for recording, distribution and display of panoramic scenes which encompass all directions viewable by a viewer. In a first embodiment of the invention, the system comprises a panoramic camcorder system, a television production system, and two panoramic display assemblies. The panoramic camcorder is arranged to record video pictures of spherical coverage. The television production system comprises a digital production center for performing digital effects to recorded panoramic pictures in order that they are rendered for viewing. A head mounted display assembly is included for viewing the image of spherical coverage. The panoramic display assembly includes an image segment circuit means for distribution of the rendered panoramic scene to a large display assembly once post production has been accomplished using the head mounted display assembly. A structural assembly is provided for securing the plurality of active displays such that they surround the viewer in all viewable directions.

In a second embodiment, the system comprises a personal computer or PC for processing the input panoramic scene, and a helmet mounted display system for viewing the scene.

In a third embodiment, the system comprises an image controller that segments and distributes the panoramic scene for viewing.

Several alternative input sources for the above system embodiments are disclosed. A first input source comprises a panoramic camcorder system of spherical coverage. Each objective lens of the camera records a segment of spherical coverage. Mirrors, prisms, and fiber optic image conduits are arranged to reflect the image from the plurality of objective lenses to the light sensitive recording surface of the camera. Adjacent and overlapping lenses of the cameras of spherical field of view coverage are disclosed. An over-the-air video transmission system comprising a transmitter for broadcasting the panoramic scene from the camcorder to a transmitter located at a remote location is also disclosed. A second input device includes a plurality of cameras. A third input device include a computer graphics system for creating panoramic scenes and editing camera recorded panoramic scenes.

Several distribution systems are set forth for distribution of the panoramic scenes on associated display assemblies. In one arrangement an image controller distributes image segments to the plurality of displays. In another arrangement a first and then a second set of image controllers cooperate to distribute a plurality of image segments to a plurality of displays. In yet another arrangement a plurality of input sources with respective image controllers are incorporated.

A head mounted display system is proposed for both binocular and stereoscopic viewing.

A large display assembly includes structural framework, supports, and associated fasteners which are integrated to securely hold the displays and optional enlargement optics above, to the sides of, and below the viewer. The floor on which the viewer is situated is of rigid transparent material through which the viewer sees the viewing side of the display systems or optical enlarging assemblies. Alternatively, the viewing side of the display systems or optical enlarging assemblies are constructed of materials that support the viewer. Entries and exits are configured to not interfere with a continuous panoramic scene. Furthermore, each display systems is serviceable from the viewing side or rear side of the viewing space.

Several display units are set forth for use with the system to include video monitors, video projectors, or flat panel displays. Several enlarging techniques are disclosed to enhance the continuity of the displayed scene. These include a fiber optic assembly, a lenticular plate & rear projection assembly, a fresnel lens plate assembly, and rear projection screen.

The systems are proposed for use with various peripheral and host systems.

BACKGROUND OF THE INVENTION

There have been many attempts and approaches to increase the perceived realism of multi-media presentations. One method of increasing the viewers perceived realism has been to display an image of spherical coverage such that the viewer perceives that the scene surrounds him. To date there have been only limited attempts at recording, processing, and displaying an image of spherical coverage. A limitation of prior art systems was that no compact method existed, such as a helmet mounted display (HMD) system, for simulating the effect of viewing a scene of spherical coverage in a large display room. Such a system would be extremely useful and economical in post production use and for home viewing. All attempts have had limitations which the present invention attempts to overcome.

In recent years a variety of portable video camera and recorder systems have been integrated into a single unit popularly known as "camcorders". U.S. Pat. No. 4,571,628 by Thornton of Miami, Florida includes a binocular arrangement which include typical components found in conventional camcorders. In Thornton's assembly an adjustable object lens assembly observes the predetermined field of viewing and additional processing assemblies convert the resulting visual image into electrical video signals which are transferred to a remotely located video recorder which in turn transfers the process signal back to a liquid crystal display specifically dimensioned for mounting within the portable housing along independent lines of sight of the viewing assembly. Remote control means may serve to operate the video recorder so as to accomplish selective and substantially concurrent playback of the previously recorded field of vision selectively observed by the object lens assembly wherein such replay may be reviewed on the liquid crystal display structure within the housing. No portable video camera and recorder system proposed in prior art has included a lens assembly with spherical coverage.

Various systems have been proposed in which a transmitter transmits conventional TV signals over-the-air to a receiver located at a remote location. Radio Electronics, February 1986, p. 51+ entitled "Wireless Video Camera Link" describes such a system . No prior art has disclosed a method for transmitting and receiving a camera recorded scene of spherical coverage.

Starting in 1985 a large number of companies started marketing arrays of CRT-based (cathode ray tube) video monitors mounted in a variety of matrix geometries, such as four monitors by four monitors or 4×4 (whose overall image may be 6.6 feet by 5.0 feet), 3×3, 2×2, and also arrays involving as may as 356 monitors. The audience directly views directly the front faces of video monitors. These video array systems are capable of creating multi-image effects involving the entire matrix of CRT's using electronic digital image processing circuits. The user may present a single image covering the entire array or the same image on each individual CRT, or any combination of image/CRT displays. Examples of such video array systems are as follows: The "Vidiwall" (TM) of Philips of Holland, which is driven by a laser videodisk system using a large number of laser videodisks; a system marketed by TC Studios of West Germany, whose video array is driven by a 1" VTR (video tape recorder); a system marketed by Nurnberger Medientechnick GmbH (Tele-wall Delcom 256 Model) of West Germany, also operated by 1" VTR or laser disks; systems marketed by Electronic ("videowall" TM) of Minneapolis, MN. Electronic markets video systems which are both 1" VTR or laser video disk sources; and systems marketed by Video Matrix Corporation, U.S. Pat. No. 4,734,779 by Levis et al., whose system accepts a standard VTR/VCR or computer source and includes rear projection elements to hide the seams between display monitors. Furthermore, there are several custom-made systems in various places, mainly discotheques, around the United States and Europe. While a matrix of monitors have been arranged to form a wall of display monitors, the monitors have not been arranged about the viewer such that a continuous picture is displayed about the viewer in all viewable directions.

In 1984, U.S. Pat. No. 4,463,380 by John T. Hooks, Jr., marketed by Vought Corporation of Dallas, TX disclosed an image processing system which processes information corresponding to a selected geographical region of a geometric system which is stored and selectively retrieved and processed to reproduce images corresponding to selected portions of the geographical or geometric system. In a preferred embodiment, the information is initially recorded photographically by a camera with semi-spherical coverage. Processing, memory, and control systems are employed for producing video signals to be provided to video display units of semi-spherical coverage, for producing simulated real time images corresponding to the selected portion of the geographical or geometric system. A limitation of Hook's system is that only a system for recording, processing, and displaying semi-spherical images is disclosed, and not a system for recording, processing, and displaying an image of spherical coverage. A system with spherical coverage is desirable in order to increase the realism perceived by the viewer. A further limitation is that the whole process can not be accomplished in near realtime, which is desirable for interactive applications, such as teleconferencing and telerobotic applications.

In 1987, U.S. Pat. No. 4,656,506, by the inventor of the present invention, disclosed the a spherical projection system that rear screen projected a panoramic scene of spherical coverage completely around the viewer. A limitation of the '506 system is that plural cameras used to achieve spherical coverage had limited portability and compactness. A further limitation is that the rear projection screen system required a large amount of space for rear projection and the system does not prescribe a method whereby portions of the images can be transmitted to remote sides of the viewer other than by reflective mirrors.

Since the early 1980's a variety of companies have marketed T.V. special effect generators and image processing systems for accomplishing three dimensional visual effects on a display monitor. Examples of such generators and image processing systems include: The "Digital Production Center" by Quantel Inc. of Stamford, CT, whose Mirage special effects system can perform 3-D image manipulation in realtime with live video (U.S. Pat. No. 4,334,245); and less expensive image processing systems such the "Illuminator" videographics printed circuit board by Matrox of Quebec, Canada, whose board level system operates from of an expansion port of an IBM PC. Both of these systems allow video images to be manipulated and integrated with computer graphics. Prior art has not incorporated such image processing systems to process an image recorded by a panoramic camera of spherical coverage such that a viewer can pan, scroll, and zoom in on portions of the recorded panoramic scene on a HMD system.

Various head mounted display (HMD) systems have been disclosed which display images in front of the viewer's eyes such that the viewer views a virtual reality. To date images for display on HMD systems have been generated by a single camera or two cameras pointing in a single direction or by using computer graphics. A camera system of spherical coverage has not been proposed for use with HMD systems in prior art. Camera systems of prior art have had limited fields of view, not allowing for replay of a scene having spherical coverage. Some prior art HMD systems, such as the "EyePhone" TM by VPL Research Inc., Redwood City, CA, included a position sensing system to electronically define the direction in which the viewer is looking and to define the computer graphic scene to be generated in the HMD system. Makers of such position sensing systems include the Isopace 3D by Polehmus Navigational Systems of Colchester, VT. Prior art has not incorporated position sensing systems to interact with a camera recorded image of spherical coverage. A limitation of interacting with a computer graphic scene is that it typically lacks the realism of a camera recorded scene.

A variety of remotely piloted vehicles (RPV) have been proposed to work with viewing systems of less than spherical coverage. Prior art RPV and unpiloted autonomous vehicles, have not incorporated a camera system with spherical coverage, processing, and display systems of the present invention.

OBJECTS OF THE INVENTION

The principal objects of the present invention are: to provide an improved image display system for panoramic viewing; to provide such a system which increases the perceived realism of the displayed images; to provide alternative arrangements for such a system; to provide such a system in which the portions of the image are viewable in all directions in which a viewer may turn such that the viewer perceives that he or she is completely surrounded by a continuous panoramic scene; to provide such a display systems including a conventional video production unit for creating visual effects and routing video input and output signals within the system; to provide such display systems including a graphics computer including a keyboard or other graphics input devices for the creation of computer generated graphics for display on the display system; to provide such display systems including an image processing computer including a keyboard or other input devices for the manipulation of images for display on the display system; to provide a system for individual viewing and a complementary system for large theater viewing of an image with spherical coverage; to provide a panoramic camera system of spherical coverage; to provide a system for camera coverage of adjacent and overlapping fields of view; to provide a head mounted display assembly for binocular and stereographic viewing; to provide such display systems in which the image displays utilized are flat panel displays; to provide such display systems in which the image displays utilized are television cathode ray tube (CRT) monitors; to provide such a system which incorporates video projectors; to provide several arrangements of the system sized to receive a viewer entirely within the assembly; to provide a planar floor assembly of transparent material such that the viewer can observe the display beneath the transparent flooring on which he or she is situated; to provide a transparent floor on which the viewer is situated through which the viewer can see the displayed image emanating from picture enlargement means; to provide a floor on which the viewer is situated which can receive a rear screen projected image; to provide a floor which supports the viewer that is a fiber optic display panel; to provide a polyhedral display assembly which is located to the sides and above the viewer; and to provide a spherical viewing system for a remotely piloted and unpiloted vehicle.

BRIEF DESCRIPTION OF THE DRAWINGS

FIG. 7 is a perspective view of a cameraman carrying the panoramic camcorder system of spherical coverage.

FIG. 8 is a perspective view of the panoramic camcorder system coupled with a remote control system.

FIG. 16 is a side elevational view with portions broken away to show the interior of an alternative arrangement of the panoramic camcorder system which includes a transmitter for sending over-the-air video signals.

FIG. 17 is a view similar to FIG. 16 and shows a second alternative arrangement of the panoramic camcorder system which includes a plurality of camcorder systems with remote camera heads for recording a mosaic of picture elements constituting representing spherical coverage.

FIG. 19 is a block diagram of a graphics computer system for generating and rendering images for display in the panoramic display system.

FIG. 20 is a block diagram showing details of a video special effects unit incorporating a HMD assembly and floating viewpoint control panel to interactively define the scene viewed.

FIG. 22 is a block diagram showing a microcomputer based system for processing an image of spherical coverage for viewing in the HMD assembly.

FIG. 23 is a block diagram showing an alternative embodiment of a system for processing an image of spherical coverage.

FIG. 31 is a block diagram showing details of an image segment circuit means of the panoramic display system.

FIG. 46 is an enlarged fragmentary sectional view of a lower corner of the display assembly enclosure illustrating details of the interconnection of the display assembly enclosure and a lenticular plate and rear projection screen assembly.

FIG. 47 is an enlarged fragmentary sectional view of an upper corner of the display assembly enclosure and the lenticular plate and rear projection screen assembly.

FIG. 49 is an enlarged fragmentary sectional view of a lower corner of the display assembly enclosure illustrating details of the interconnection of the display assembly enclosure and a rear projection screen assembly.

FIG. 50 is an enlarged fragmentary sectional view of an upper corner of the display assembly enclosure illustrating details of the interconnection of the assembly enclosure and projection screen assembly.

FIG. 54 is a block diagram illustrating a remote control system for a remotely piloted vehicle with a panoramic camera system that transmits a composite signal of spherical coverage to a control station for processing for spherical coverage viewing to facilitate a controller in piloting the remotely piloted vehicle.

FIG. 55 is a perspective, partially diagrammatic view illustrating the remote control viewing system described in FIG. 54.

DETAILED DESCRIPTION OF THE PREFERRED EMBODIMENTS

Figure 1:
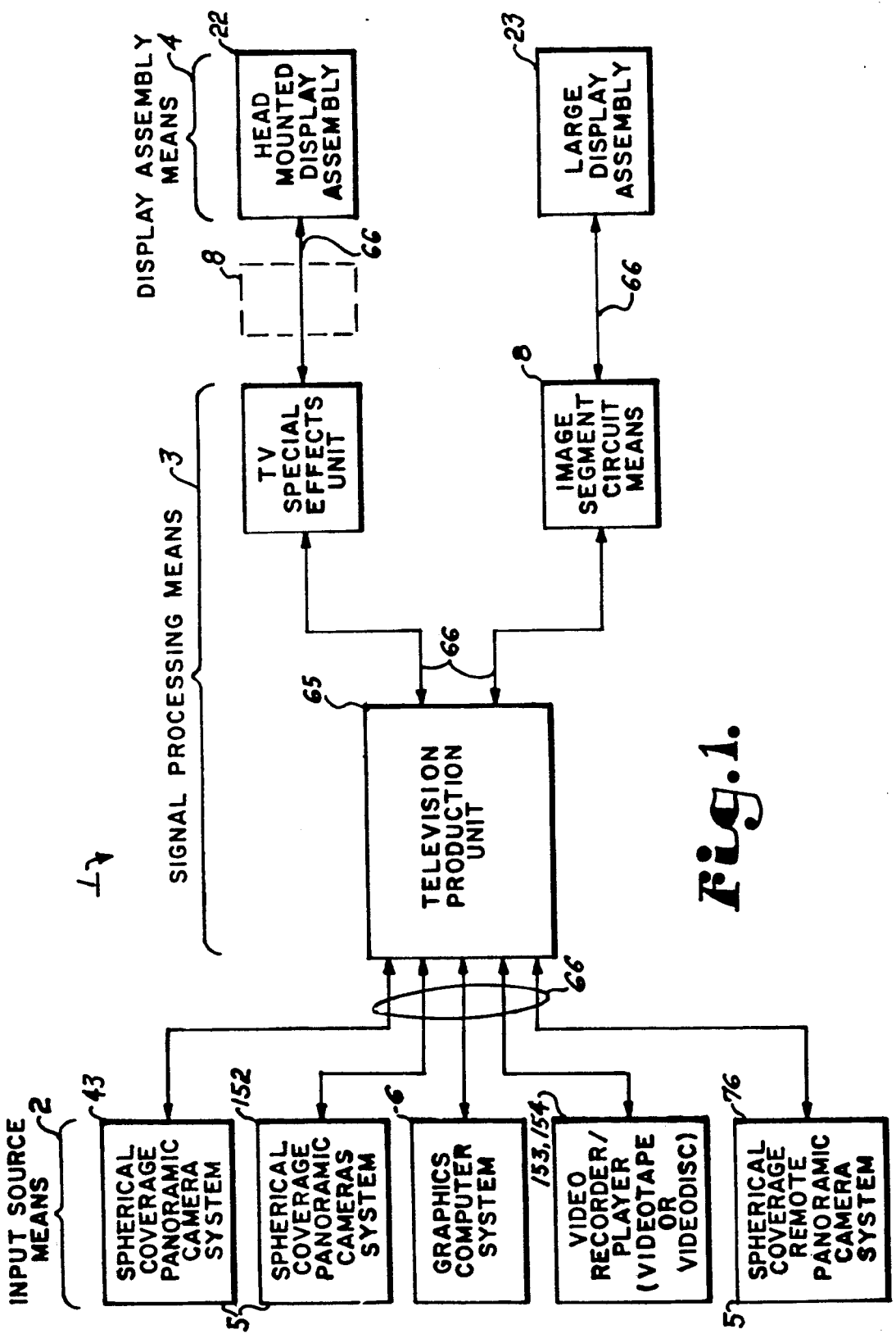
FIG. 1 is a block diagram of an image formatting system for recording, processing, and display of an image of spherical coverage which embodies the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

For clarity of description, a preliminary summary of the major features of the recording, processing, and display portions of a preferred embodiment of the system is now provided, after which individual portions of the system will be described in detail.

Referring to the drawings in more detail:

As shown in FIG. 1 the reference 1 generally designates a panoramic display system according to the present invention. The system 1 generally includes an input means 2, signal processing means 3, and display means 4 connected generally by suitable electrical interface means 66. Electrical interface means 66 is indicated by lines and arrows in the drawings. Input means 2, typically a panoramic video camera system 5 or graphics computer system 6, are provided such that image segments 13 of adjacent spherical coverage about a center point CP of a geographic or geometric system are recorded on a single frame 14 to form a composite image 26. Television signal processing means 3 typically includes a television production unit 65 that switches incoming television signals to other signal processing components of the signal processing means. Components at least include a television special effects unit 7 for manipulation of an image prior to display; or image segment circuit means 8 for transmitting the processed television signal representing one of a plurality of image segments 13 or sub-segments comprising portions of a scene of a spherical field of view coverage to each predetermined illuminated image display unit 11 of the display means 4.

Still referring to FIG. 1, the preferred embodiment of the system 1 generally comprises two display means: a headmounted display (HMD) assembly 22 and a large display assembly 23. The HMD 22 and large display assembly 23 are designed to essentially complement and emulate one another such that post production work is accomplished using the HMD assembly 22 which is more compact and economical to construct, while the large display assembly 23, which is less compact and more expensive to construct, is used by large audiences to view finished productions. The viewer wears the HMD assembly 22 to preview, manipulate, and review panoramic scenes recorded by input means 2 and manipulated by the signal processing means 3. Once post production work is accomplished, a composite signal representing the composite image 26 is transmitted to the image segment circuit means 8. The image segment circuit means 8 performs operations on the signal representing the composite image 26 such that image segments 13 are transmitted to display units of the display assembly 23. The viewer's entire body is positioned in the large display assembly, referred to herein as a "VIDEOROOM" TM; in which the viewer is surrounded by display units such that the viewer sees a respective portion of the scene of spherical coverage in any viewable direction. For best viewing, the viewer is positioned at the center of a viewing space 25. The large display assembly 23 is comprised of a structural framework 9 and supports 10, which hold the display units 11 and optical enlarging means 12 securely in place. Alternative display units typically incorporated in the large display assembly 23 include a conventional video projector 15, a cathode ray tube (CRT) 16, or a flat panel display 17 units. Alternative optical enlarging means include a rear projection screen 18, a lenticular optical plate assembly 19 with a rear projection screen, or a fiber optic plate 21 assembly. Components of the display assembly 23 cooperate to display a substantially continuous panoramic scene of spherical coverage about the viewer. The composite image 26 is in such a compatible and interchangeable format that it can be processed for input into either the HMD 22 or large display assembly 23. An alternative arrangement of the system 1 is provided in which the input means 2, signal processing means 3, and display means 4 cooperate to provide a stereoscopic system of spherical field of view coverage for viewing in the HMD assembly 22.

Still referring to FIG. 1, in operation the input means 2 transmits a signal representing a panoramic scene of spherical coverage through an image processing means to the display assembly 4. The panoramic scene consists of a plurality of image segments 13 which form a composite image 26 on a single video frame 14. Image segments 13 represent portions of a camera recorded scene or computer graphic information. Typically the segments represent adjacent portions of the surrounding panoramic scene. Each image segment 13 is displayed at a designated area within the display assembly 4 such that the recorded scene is re-formed in the same geometric or geographic orientation in which the scene was recorded. Images are displayed adjacent to one another on the display units 11 and optical enlarging plates or screens 12. Only a portion of the panoramic scene displayed on the display unit 11 at any one time is displayed to the viewer wearing the HMD assembly 22, while the entire panoramic scene is displayed on the display devices of the large display assembly 23 at any given time. In the large display assembly 23, the viewer typically defines or selects the portion of the scene he or she chooses to view by turning to view a portion of the scene. With the HMD assembly 22, the viewer operates viewer interactive control devices to electronically define the scene the viewer wishes displayed before his or her eyes. A viewer of the HMD 22 or large display means 23 perceives a similar visual effect when viewing the same footage in that the viewer perceives a continuous coherent panoramic scene of spherical field of view coverage rendered before his or her eyes.

INPUT MEANS

Figure 6:
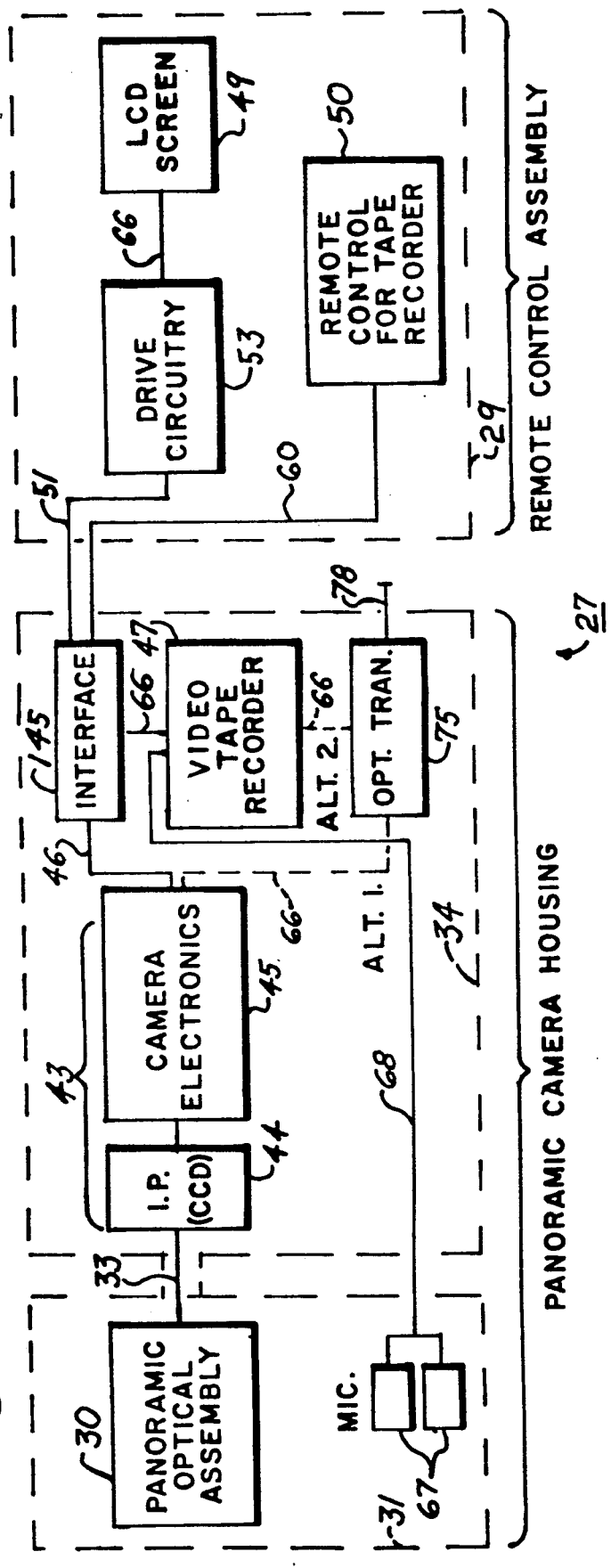
FIG. 6 is a block diagram illustrating a portable panoramic viewing and recording system (camcorder) with spherical field of view coverage.

FIG. 6 illustrates the preferred input means 2 for recording a panoramic scene of spherical coverage, which is the panoramic camera system 5 including a camera 43, and which comprises a portable panoramic video viewing and recording system 27, referred to hereafter as a "panoramic camcorder". The panoramic camcorder 27 is carried by a host being or vehicle. Housing means 28 is provided to hold the major components of the camcorder 27 in place. The inner and outer portions of the housing 28 are constructed of a conventional material, such as plastic or metal. Housing means 28 includes a panoramic optical assembly 30 held in place by a optical assembly housing 31. Preferably the optical housing 31 is supported over the camera operators head by a rigid support armature 33. The optical housing 31 and support armature 33 are mounted to a the backpack housing 34. The backpack housing 34 is held in place on the camera operator by straps 35 and fasteners 36 or other conventional means. Objective lenses 37a-37f are directed outward from a center point of the panoramic optical assembly 30. Each objective lens 37 is preferably fixed and focused at infinity to cover a predetermined field of view. In the present example the optical assembly 30 is associated with the panoramic video camera system 5. Alternatively, the optical assembly 30 may be associated with still or movie photographic cameras (not shown). Preferably, conventional objective lenses 37 are incorporated which have wide angles of acceptance such that the image segments 13 have a wide field-of-view, but with minimal barrel distortion. A type of objective lens utilized is generally of the type manufactured by Carl Zeiss of West Germany as the Distagon T*/f3.5 15 mm and the Distagon T*f/4 18 mm which have a circular field of view coverage of greater than 90 degrees. Alternatively, the optical assembly may include a minimum of two "fisheye" objective lenses which cooperate to achieve a spherical field of view coverage. The fisheye lenses have greater than 180 degree spherical field of view coverage and are faced in opposite directions on a similar axis at a short distance from a common center point. The fisheye objective lens may be generally of the type manufactured by Nikkor Nikon of Japan, such as the 6 mm f2.8 fisheye lens with a 220 degree hemispherical field of view coverage. Preferably, the objective lenses 37 and their associated focusing lenses are of a lightweight and compact design to facilitate integration with the optical assembly 30. Integral with the objective lenses 37a-37f are respective optical elements 63a-63f for transmitting the images in focus to the receiving end of each image fiber optic bundle 38a-38f.

Figure 2:
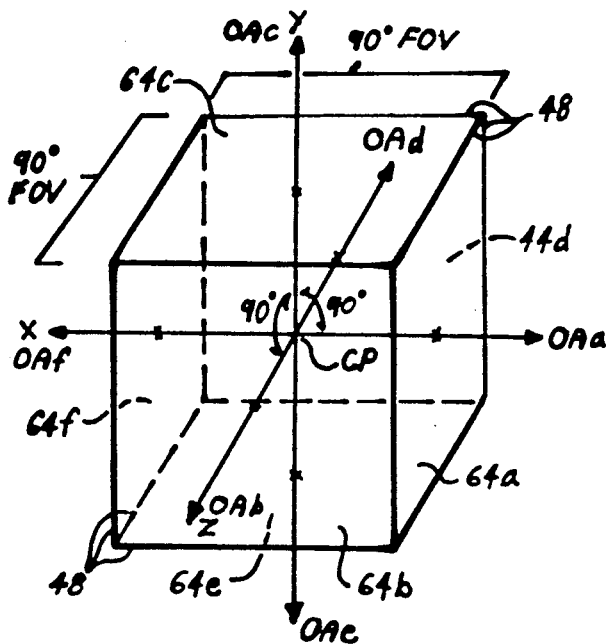
FIG. 2 is a diagrammatic representation of the spherical field of view coverage provided within the system.
Figure 3:
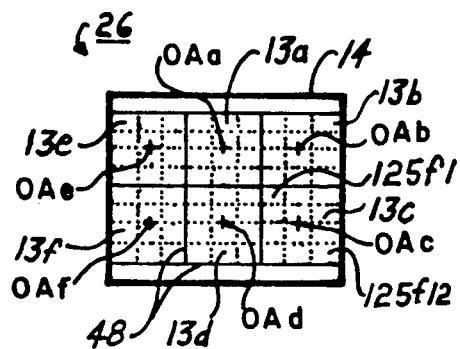
FIG. 3 is a diagrammatic representation of a video frame having image segments which comprise a composite image of spherical coverage.
Figure 10:
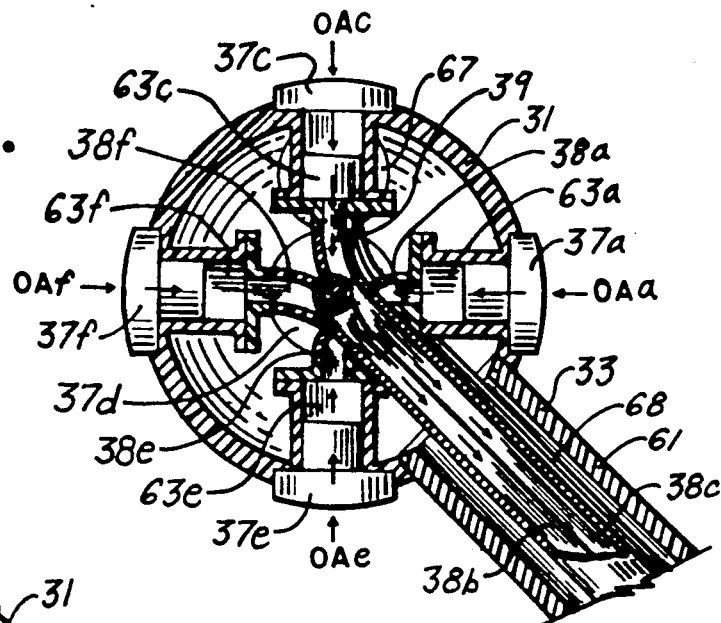
FIG. 10 is a greatly enlarged fragmentary sectional view of the optical assembly of the panoramic camcorder used for taking pictures of spherical coverage.
Figure 11:
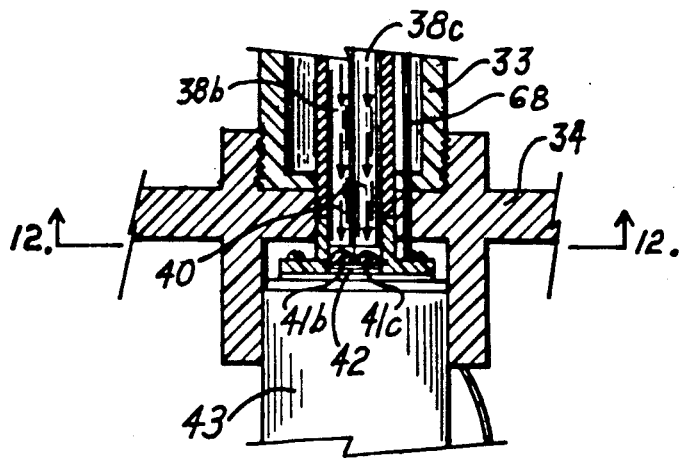
FIG. 11 is a greatly enlarged fragmentary sectional view of one of the optical assemblies of the camera and illustrates an optical assembly interface.
Figure 12:
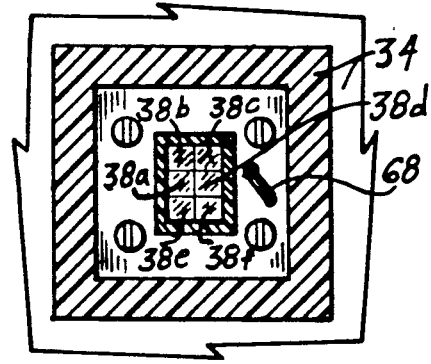
FIG. 12 is a greatly enlarged sectional view taken on line 12—12 of FIG. 11 and illustrates further details of the optical system.

Referring to FIGS. 2 and 3, the objective lenses 37 may be directed outward from a center point CP of the lens assembly 30 at any angle from the lens assembly housing 31 as long as the objective lenses 37 are arranged to achieve spherical coverage about the camcorder 27. The illustrated objective lenses 37a-37f are directed outward along right angle axes at 90 degree intervals of an x-y-z Cartesian coordinates. In the present example, each objective lens 37 transmits an image segment 13 with a field of view of 90 degree coverage across the optical axis OA. The result is that each image segment 13 is recorded in a square format with the center point of the square corresponding to the optical axis OAa-OAf of each objective lens 37. The field-of-view coverage of adjacent objective lenses is tangent or slightly overlapping, such that each edge 48 of adjacent image segments 13 can be placed beside one another to form a polyhedral mosaic, such as a cube, In this manner a continuous scene of spherical coverage is achieved. For instance, referring to FIGS. 2 and 10, objective lens 37a transmits scene 64a, lens 37b scene 64b, lens 37c scene 64c, lens 37d scene 64d, lens 37e scene 64e, and lens 37f scene 64f of the scene that surrounds the lens assembly. The scene of each objective lens 37a-37f is focused as an image segment 13a14 13f by the respective objective lens to the receiving end 39a-39f of a corresponding image fiber optic bundle 38a-38f. Each respective image segment 13a-13f is then transmitted by its respective image fiber bundle 38 to the exit end 40a-40f of the image fiber bundle 38, in focus and as a coherent image (See FIGS. 11 and 12). Conventional coherent image fiber optic bundles 38 are incorporated in the optical assembly 30. The image fiber bundles 38 may be of a rigid or flexible design, such that they can be bent at an angle to accept the image transmitted from the objective lenses 37, and then to bent at some point between the entrance end 39 and their exit end 40 to facilitate transmission of the image segments 13 to the receiving surface 42 of the camera 43. The optical fiber bundles 38 are of a type that allows them to be twisted in route such that the desired image orientation at the exit end 40 of the bundle 38 is facilitated. In the present example the image fiber bundles 38 have rectangular cross sections to facilitate the formatting of the image within the camera's format. Alternatively, image fiber bundles 38 of various cross sections and lengths are commercially available for use within the present invention. It is foreseen that a remote camera head 71 (FIG. 15) could be placed in the optical housing 31, and very short fiber optic bundles 38 be used to transmit the image from each objective lens 37 to the recording surface 42 of the camera 43. The image fibers that comprise the image fiber optic bundles 38 are of a quality that allows low light transmission loss as the image is transmitted through the fibers.

Referring to FIGS. 9 through 12, the image fiber optic bundles 38 are positioned inside and held in place by the support armature 33. In this manner the image is transmitted from each objective lens 37 to the camera 43. Optical fibers are gathered at the exit end 40 such that the image fibers optical axes are parallel to one another. Optical elements 41a-41f are provided to focus an associated image segment 13 of the scene formed on the exit end of the image fiber to the light sensitive recording surface 42 of the TV camera 43. The optical elements 41 are located adjacent to one another to focus the scenes imaged by each objective lens 37 to a separate, but adjacent, area on the recording surface of the TV camera 43. The optical elements 41 are interfaced with the camera 43 to facilitate the composite image 26 being transmitted to the recording surface 42 of the camera 43 by conventional means, such as a screw or bayonet mount arrangement. The recording surface 42 is directly associated with an image processor means 44 of a self-scanning solid state imaging device such as a charge coupled device located in the image plane of each respective lens element 41. Alternatively, it is known to those skilled in the art that the lens elements 41 may be omitted, and the exit ends of the fiber optic image bundles may be placed directly adjacent to or welded to the light sensitive recording surface 42 of the TV camera 43 to facilitate recording of the transmitted image segments 13.

Figure 4:
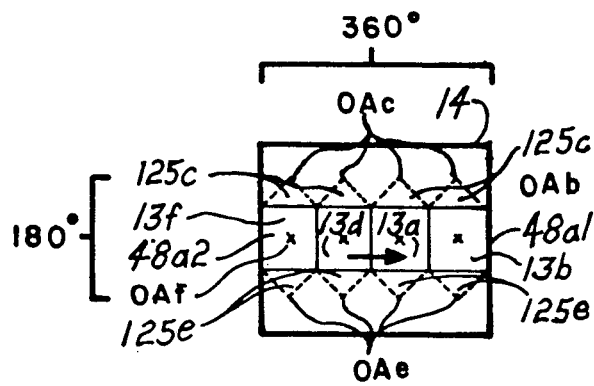
FIG. 4 is a diagrammatic representation of a video frame having image segments which are arranged adjacently according to their true geographic adjacency.

FIG. 3 illustrates an exemplary picture frame 14 comprising a composite image 26 of spherical coverage recorded by the camcorder 27. Each image segment 13a-13f is placed on the frame adjacent to another image segment 13 to form a composite scene 26. FIG. 4 illustrates an alternative frame format in which the exit ends 40 of image bundles 38 of rectangular and triangular cross sections are incorporated to form a composite image 26. In FIG. 4, the image segments 13 are generally positioned on the planar surface similar to their geographic adjacency. Scene segments 64c and 64e are sub-segmented triangularly to facilitate conversion of a three dimensional scene to a scene where the image segments 13 have proper adjacency and orientation.

Alternatively, objective lenses 37a-37f of camera 5 of FIG. 1, are incorporated which have overlapping fields of view. In such an arrangement at least two views of all scenes are recorded by the camcorder 27. A "fisheye" lens, similar to that previously described, can be incorporated in the present invention to accomplish overlapping coverage (also see FIGS. 7-10 and 15-17).

Although a simple optical system assembly 30 is depicted in the drawings, it should be clear to one skilled in the art that a more complex optical assembly can be herein employed without departing from the teachings of the present invention. Other optical elements and electro-optic components that may be included are automatic shutters, automatic focusing arrangements, optical filters and coatings, image intensifiers, correcting and inverting lenses, lens adapters, and so forth. Such optical elements (not shown) are inserted into the optical path at the designers choice to accomplish a specific task. Additionally, high resolution or high definition cameras and recordings systems of various types of may be incorporated without departing from the spirit of the invention. Objective lenses 37a-37f, optical elements 63a-63f, optical elements 41a-41f, and construction of the optical housing 31, support armature 33, and camera interface means which may be utilized in the present invention are manufactured for or manufacture by Schott Fiber Optics of Southbridge, MA.

As shown in FIGS. 6 through 10 the camcorder 27 also includes a conventional portable audio recording system commonly associated with conventional camcorder systems. The camcorder 27 receives audible sounds for recording within proximity to the camcorder. Preferably, each microphone 67a and 67b is integrated with the optical assembly housing 31 such that the microphones 67 face outward. The two microphones 67 are dispersed respectively on the left and right side of the housing 31 such that stereo sound is recorded. Conductors 68 are provided to transmit the audio signals from the microphones 67 through the support armature 33 to the recorder/player 47 where the audio signals are input using a conventional input jack. Alternatively the microphones 67 may be located elsewhere on the camera operator or elsewhere on the camcorder 27. The recorded audio signals are synchronized with the picture being recorded by the camera 43 by means of the electronic circuitry of the recorder/player 47 such that a conventional television signal results.

Referring to FIGS. 6-10 and 15-17, the electrical section 45 is structured to convert the visual images received by the image processor 44 into electrical video signals such that the information is in a format that is compatible with standard video processing equipment. Any conventional TV camera 43 may be adapted to accept the images from the disclosed optical system 30. The image processor 44 is structured to convert the visual images received into electrical video signals. The processed signals are standard synchronized coded signals utilized in the United States for video transmission. The signal processor 3 could be modified so as to convert the received electrical video signal from the image processor means 44 into a standard synchronized coded signal of any given country or format for transmission as desired, such as NTSC, PAL, SECAM or the like.

Figure 9:
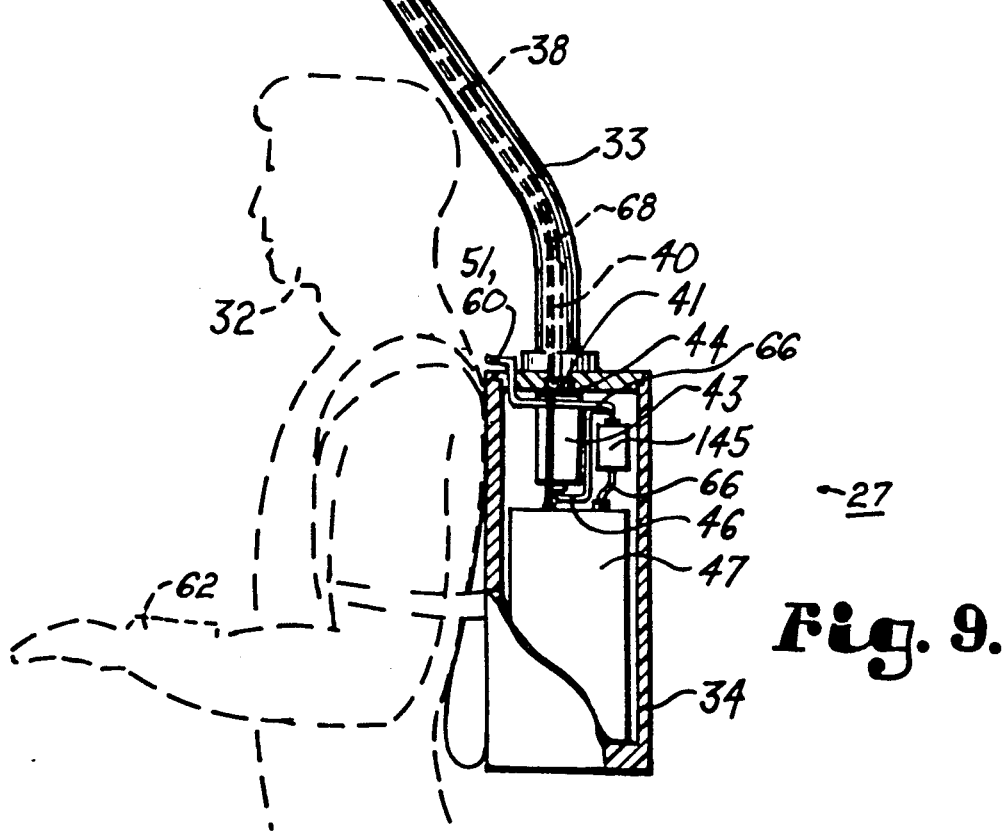
FIG. 9 is a side elevational view with portions in section and showing the interior components of the panoramic camcorder system.

As shown in FIGS. 6 and 9, the picture signal from the camera 43 is then transferred through conductor 46 to a conventional portably structured videotape recorder/player 47. The conductor 46 along with other conductors to be described hereinafter are positioned to be housed within a conductor sheath 61. An electronic interface generally indicated as 145 is provided to receive the various signals being transferred over such conductors and to interface such signals for reception by and transmission from the video recorder/player 47 in any substantially conventional fashion. A connecting jack or suitable input connection, as at 146, is provided for proper interconnection in a conventional fashion. A type of electronic interface, generally of a type utilized in the present invention, is referenced in U.S. Pat. No. 4,571,628. This television signal is then stored by the recorder/player 47 on video tape.

As FIGS. 6-10 and 15-17 illustrate, the camera 43 and recorder 47, along with the lens assembly 31 may be integrated into a single housing. Such an integrated housing is currently being marketed as conventional "camcorder" units. With the exception of the optical assembly 31 and support armature assembly 33, conventional camcorder components are incorporated to form the recorder and camera portions of the panoramic camcorder 27. U.S. Pat. No. 4,571,628 dated Feb. 18, 1986 to Thirstol Thorton discloses components of a type which may form the components of the camcorder 27 of the present invention. Such conventional camcorders include integrated battery packs which supply electrical power to all components requiring electrical current to function. A conductor with suitable input/output jacks is provided for proper interconnection in a conventional fashion between the camera 43 and the recorder/player 47.

Referring to FIGS. 6-9, 13 and 14, an important part of the portable panoramic camcorder 27 system is a remote control assembly 62. The remote control assembly 62 includes a remote control housing 29 including a wrist mounted video screen means 49 and remote controls 50 for operating the video recorder/player means 47. Conductor 60 is interconnected from the video recorder/player 47 to the remote control housing 29 by conventional input/output jacks. The conductor 60 wires are housed within a conductor sheath 61 and serves to transmit the recorded signal from the video recorder/player 47 to the video screen means 49 previously mentioned. The video screen means 49 comprises a liquid crystal display drive circuitry 53 associated therewith and structured to electronically communicate with and receive the signal from the video tape recorder 47 through conductor 51. More specifically, the liquid crystal display system 52 may be of the type disclosed above and manufactured by Suwa Seikosha Co of Suwa, Japan. In addition and as stated above, the size of the screen 49 is such as to be capable of being mounted within a wrist mounted housing 29 wherein the display screen itself is approximately two inches in diagonal producing a substantially 43.2 by 32.4 millimeter display. As set forth above, the liquid crystal display means 52 is specifically structured to convert the electrical video signal received from the video recorder 47 onto a visual display.

Figure 13:
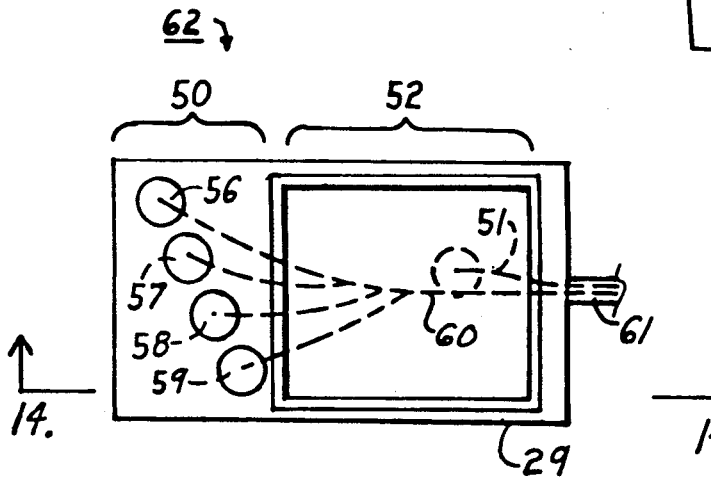
FIG. 13 is a top sectional view of the remote control assembly showing the interior components thereof.
Figure 14:
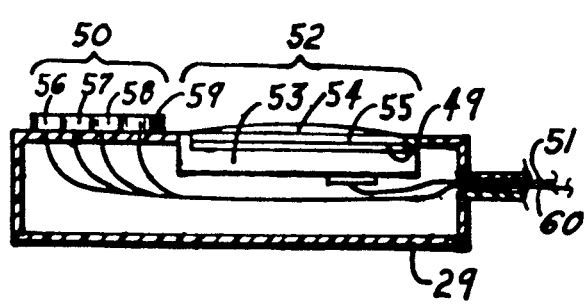
FIG. 14 is a cross sectional view taken on line 14—14 of FIG. 13 and illustrates further details of the remote control assembly.

Referring also to FIGS. 13 and 14, further structural features of the present invention include the provision of the remote control assembly 62 with individual activating controls or buttons 50 for appropriate switching (not shown) wherein the switching communicates with the video recorder/player 47 through conductor 60 also housed within conductor sheath 61 and interconnected to the recorder/player 47 through electronic interface 145. The individual activating buttons 50 are structured to cause activation by switch conductors 60 so as to selectively activate the recorder in a play mode, rewind mode, record mode, and on/off switch as desired respectively, dependent on the function which the user wishes the mechanism to perform. The remote control housing 29 is constructed of a rigid material such as metal or plastic. A conventional wrist band is provided to hold the remote control housing 29 to the camera operator's arm.

Figure 15:
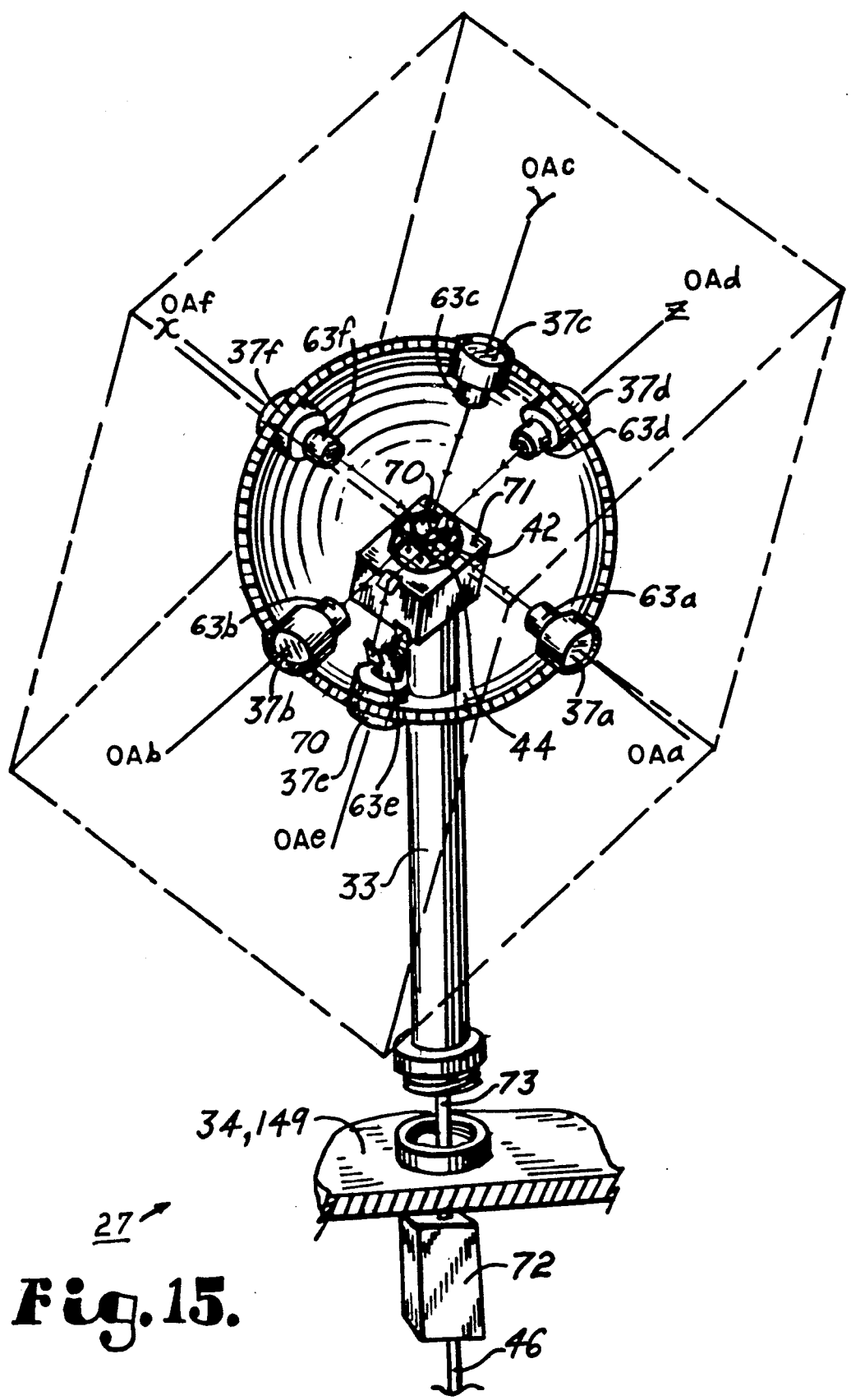
FIG. 15 is a perspective view of an alternative arrangement of the optical assembly of a panoramic camera with portions broken away to illustrate mirrors or prisms to reflect each image from the objective lens to a remote camera head.

Alternatively, as shown in FIG. 15, an optical assembly 74 of the camcorder 27 which is configured to provide an image of spherical coverage by incorporating reflective means 70 such as mirrors, prisms, or a combination of mirrors and prisms that transmit the image from the objective lenses through respective optical paths to the image processor 44 of the camera 43. Each objective lens 37a-37f, including respective focusing lenses 63a-63f are located at approximately 90 degree intervals facing outward from a center point CP. The fields of coverage of the objective lenses 37a-37f are at least tangent or touching to achieve a spherical field of view or coverage. Each objective lens 37 transmits the image in focus to the light sensitive recording surface 42 of the remote camera head 71. Planar mirrors or right-angled reflecting prisms 70 are placed at 90 degree angles to the optical path such that the image is reflected to the light sensitive recording surface 42 of the remote camera head 71. Rotating dove prisms (not shown) may be provided and positioned incident to the optical axis along the optical path such that the incident image is rotated to the desired orientation within the optical assembly 74. Collective and erecting lens (not shown) elements are provided to orient and focus the images as the images are transmitted along the optical path of the optical assembly 74. The optical components are held in place by a lens assembly housing 31 similar to that previously described. The housing 31 contains the remote camera head 43 whose recording surface 42 is positioned perpendicular to the incident optical path of the transmitted images to facilitate recording of the incident images. The image transmitted by objective lens 37c is reflected directly onto the recording surface of the remote camera head, and requires no reflective means because lens 37a's optical axis is perpendicular and incident to the recording surface of the remote camera head. The remote camera head 71 is positioned in the optical assembly housing 31. The connector cable runs from the remote camera head 71, through the support armature 33, and to the backpack housing 34. The remote camera head 71 communicates a picture signal to the camera electronics by means of a connector cable 73. The cable 73 is enclosed and supported by the support armature 33 which attaches to the backpack housing. The camera electronics unit and recorder/player 47 are located in the backpack housing 34. The camera system with a remote camera head utilized above is generally of a type manufactured by Pulinx America Inc, Sunnyvale, CA as the TMC-50/TMC-60 RGB remote version.

FIG. 16 illustrates an alternative arrangement of the panoramic camcorder system 27 shown in FIGS. 6 in which an over-the-air transmitter 75 transmits a television signal representing a composite image of spherical coverage to a remote television receiver 76 (FIG. 1). The transmitter 75 is of a compact portable configuration such that it is positioned in the backpack housing 34. The recorder/player 47 outputs a conventional television signal over a conventional output cable 77 with conventional input/output jacks to the wireless over-the-air video camera signal transmitter 75. The transmitter 75 transmits high quality over-the-air signals from a whip antenna 78 to the remotely located conventional television receiver 76 tuned into the proper channel and frequency. An over-the-air system compatible for use with the camcorder system 27 is described in the periodical Radio-Electronics, February 1986, p. 51+ entitled "Wireless Video Camera Link". The received signal is then transmitted via conventional switching means to the image processing means 44 of the panoramic display system 1. Alternatively, the transmitter 75 may transmit a picture signal received directly from the camera 72. In such an instance, the recorder/player 47 is not necessary, but an electrical power source (not shown) must be provided to run the camera 72 and transmitter 75.

Figure 18:
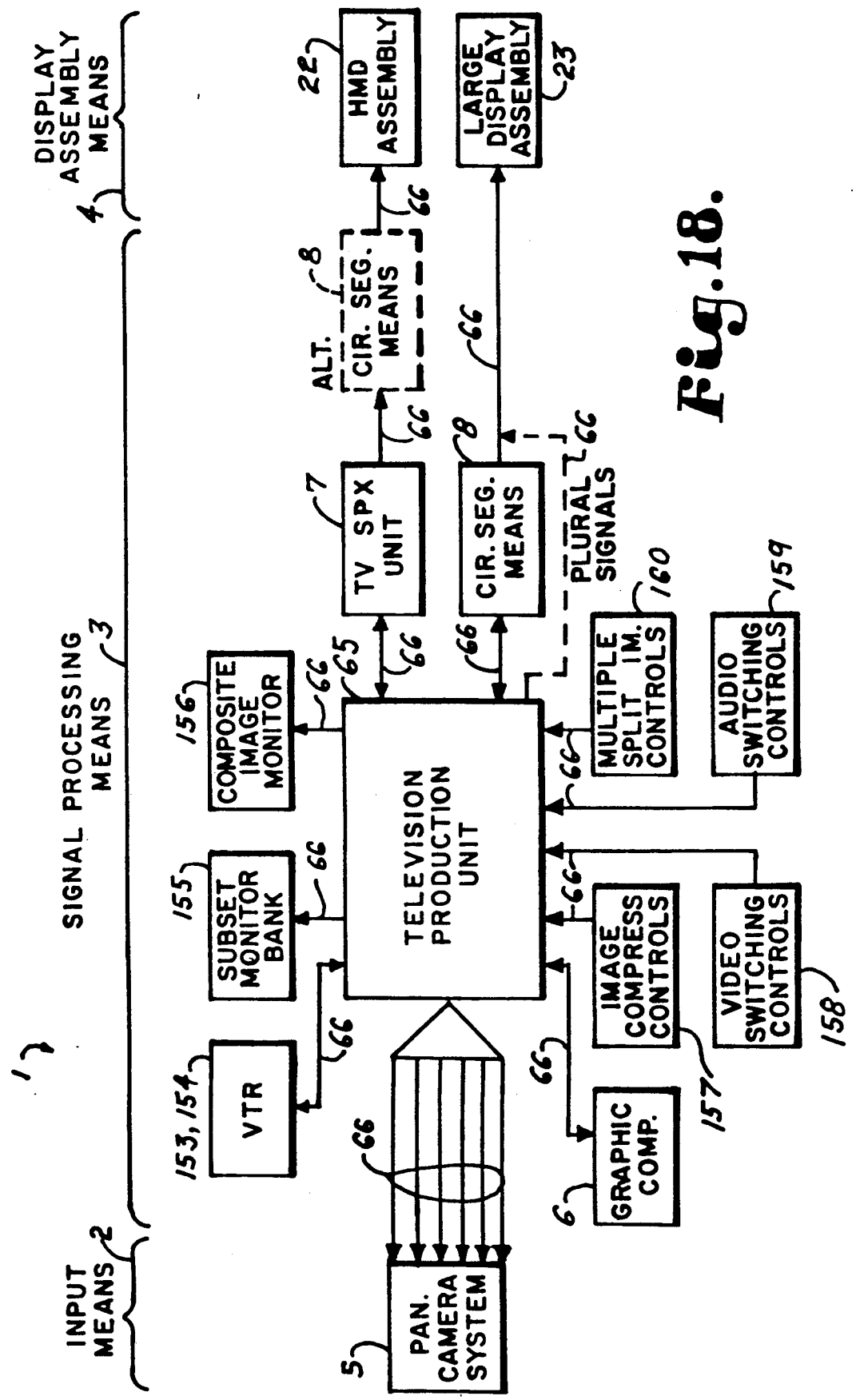
FIG. 18 is a block diagram showing details of the television production portion of the panoramic display system.

Alternatively, a plurality of cameras 72 may comprise the panoramic camera system 5. As shown in FIG. 17 and as disclosed in U.S. Pat. No. 4,656,506, a plurality of cameras 72 are positioned to record images which together achieve substantially spherical coverage. Objective lenses of each camera cooperate to provide adjacent field of view coverage. Referring to FIG. 17, preferably, cameras 72a-72f with remote camera heads 71a-71f record an image on portable recorder/players 47a-47f. As illustrated in FIG. 18, the video signals having the images encoded therein are applied to separate channels of a conventional video production unit 65. The signals are then processed by the production unit 65 and distributed for display. The signals representing image segments 13a-13f may be compressed into a single composite image or distributed independently for processing or to display units. Alternatively, a portably configured video multiplexer (not shown) operates to combine the signals from each camera into a single recorder/player as a composite image. A video multiplexer system utilized above is generally of a type manufactured by Colorado Video Inc. of Boulder, Colorado as the 496A/B. The individual signals may then be demultiplexed for processing and/or display.

Still alternatively, as shown in FIGS. 1 and 19, a graphics computer 6 is operated as an input source to create images comprising a spherical coverage. The computer system 6 includes a digital computer 79 including a central processing unit, memory, communications ports, and the like. Operating system software, graphics software, processing data, generated images and the like are stored in mass storage devices 80 which may include magnetic disk drives, optical disk drives, and so forth. Commands to operate the computer system 6 and graphics generation commands are entered by means of the viewer interaction devices which may include a keyboard 81 and a graphics input device 82. The graphics input device 82 may consist of one or more of a joystick, a trackball, a "mouse", a digitizer pad, or other such devices. The computer system 6 includes a bit mapped video display generator 83 wherein each picture element or pixel is accessible for generating high resolution images. The video display generator 83 is connected to one of the channels of the video production unit 65. The computer generated images are then further processed by the signal processing means 3 for display. The digital computer 79 may be any type of computer system which has the required processing power and speed such as the type which are employed in computer graphic animation and paint applications. The computer system 6 may function as a simulator controller if the display means of the present invention are used as simulators or as a game controller if the systems are employed as arcade games. The computer system 6 may also be used to create special visual effects by combining artificial and animated scenes with live camera recorded scenes.

Figure 21:
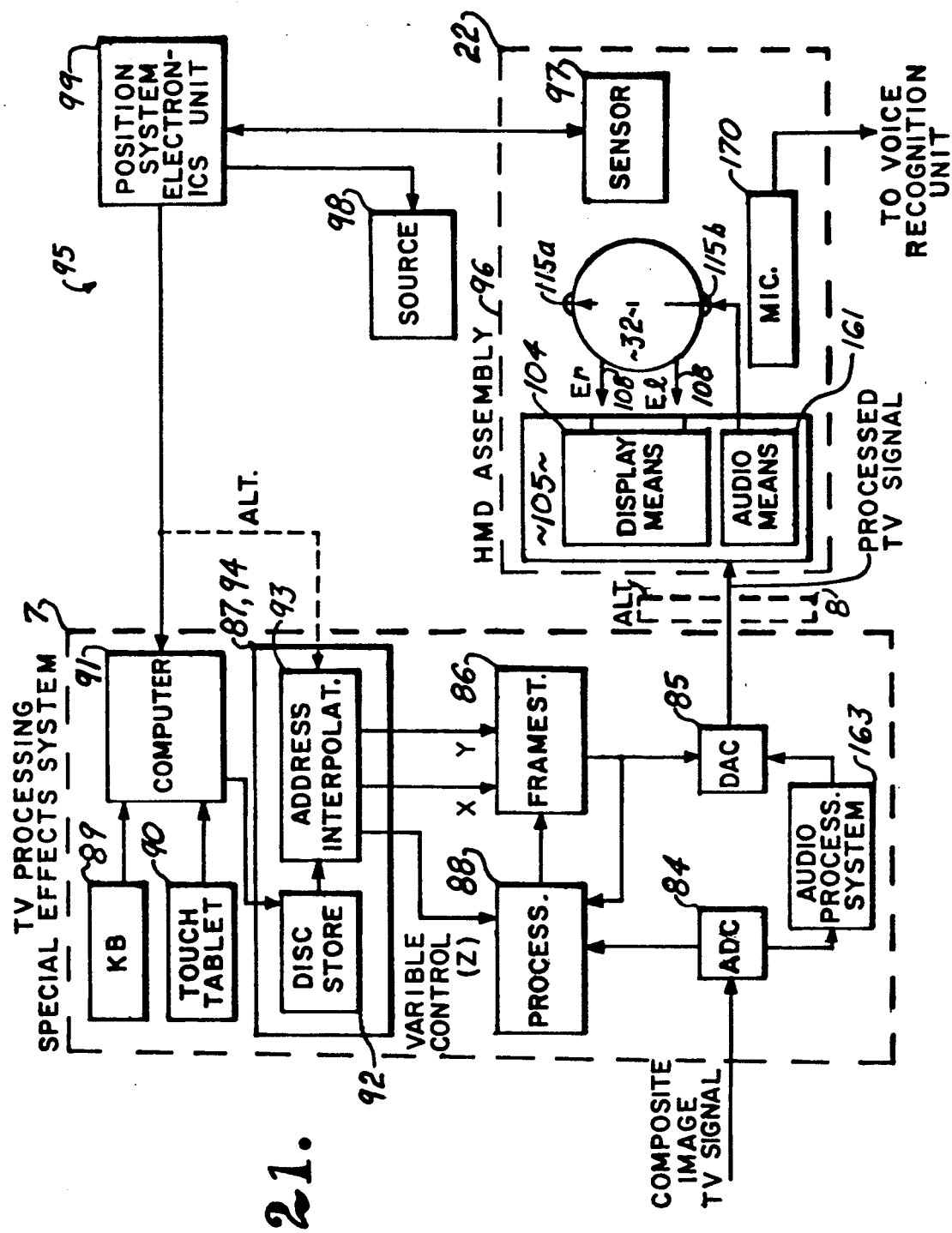
FIG. 21 is a block diagram showing details of a video special effects unit incorporating a video special effects unit including a position sensing system that is interfaced with the HMD to interactively define the scene viewed.

Preferably an integrated part of the post production unit 65 and its video special effects unit 7 is the graphics computer system 6. In FIG. 18 the graphics computer system 6 is in direct communicating relationship with the special effects system 7 via the production unit 65. The keyboard 89, touch tablet 90, and host computer 91 are also operated to control the processors and memory and other devices which comprise the graphics computer system 6. Various input sources 2 may be routed by the production unit 65 to the graphics computer system 6 for rendering. Once the graphics computer system 6 has been operated to create or affect an existing picture, the picture is stored in mass storage 80 or bused as a picture signal to the effects unit 7 or image segmentation circuitry means 8. Graphics system 6 transmits a picture signal to the processor of the effects unit 7. In FIGS. 1, 18, and 21 a computer graphics system 6 comprising a digital computer may be operated to create or effect the recorded video images. To those skilled in the art it is known that such a system 6 may be integrated with a television production unit 65 or special effects unit 7. The two are typically integrated in order for the viewer/operator to affect the video images captured by a camera. Typically the viewer/operator affects the video images frame by frame. Such a system 6 is used in the present invention to affect the images captured by input sources. The components in a typical vector or raster electronic graphic system 6 include a touch tablet 90, a computer 91, framestore 86, and a display.

A graphics computer system of a type utilized herein is generally of the type manufactured by USA Quantel Inc., Stamford, CT as the Quantel Graphics "Paintbox" TM.

Additionally, conventional videotape 153 and videodisk 154 (FIG. 18) player's input signals representing prerecorded images to the signal processing means 3. Preferably, each frame consists of a composite image representing a scene of spherical coverage.

SIGNAL PROCESSING MEANS

The signal processing means 3 performs two major signal processing functions in the preferred system: first, the video post production unit 65 that includes a TV special effects unit 7 is used to compose the image for viewing; and second, image segment circuit means 8 distributes the scene of spherical coverage to the display means 4 for viewing.

1) TV PRODUCTION UNIT

FIG. 18 illustrates a video production unit 65 for viewing, composing, and distribution of television signals representing a panoramic scene of spherical coverage. The video production unit 65 is comprised of various image processing devices. Preferably, a panoramic camera system 5 inputs a standard television signal on which the image has been encoded as a composite image 26 of spherical coverage for application to the television production unit 65. Alternatively, a plurality of image segments 13 from a plurality of cameras 72 may be input to the production unit 65. The production unit 65 may have compression functions, the ability to create multiple split images, and the ability to position the split images at selected locations on a video screen. The unit 65 includes image compression controls 157 for accomplishing such functions. In order to view the quality of the individual image segments, the production unit 65 preferably includes a subset monitor bank 155 including a video monitor corresponding to each video camera. A composite image monitor 156 connected to the production unit 65 allows viewing the image segments 13 assembled onto a single screen. The assembled images 26, as processed by the production unit 65 and viewed on the composite image monitor 156, may be stored.

Additionally, the production unit 65 is of a conventional type (see FIG. 18) that also has audio and video switching and distribution functions such that a single or a plurality of channels can be input and output to the television special effects units 7, the segment circuit means 8, the graphic computer system 6, or the display 11 and recording 153, 154 units. The unit 65 includes video switching controls 158 and audio switching controls 159 for accomplishing such functions. Computer graphics unit 6, illustrated in FIG. 19 and previously discussed, functions as a graphics computer for the post production unit 65 and the effects unit 7. A production unit 65 of the type generally utilized in the present invention is manufactured by Industrial Sciences, Inc. as the Model 200-3 Video Production Switcher; and manufactured by Quantel Inc., of Stamford, CT, as the "HARRY" TM digital video recording, editing, processing, and composing control system as part of their Digital Production Center. An image compression unit of the type generally utilized in the present invention is manufactured by Precision Echo, of CA, as the "Squeezer". Alternatively, it will become apparent to those skilled in the art that some input means can transmit a signal representing a composite image 26 directly to the TV special effects unit 7 and then to an associated HMD assembly 22. An input means can also transmit a signal representing a composite image 26 directly to the segment circuit means 8 and then directly to an associated large display assembly 23. In such an instance, the TV production unit 65 is not necessary to connect components of the system to facilitate post production work as shown in preferred arrangement of the system 1 shown in FIG. 1.

2) VIDEO SPECIAL EFFECTS UNIT

Referring to FIGS. 1 and 18-23, preferably, the composite signal is applied by the television production unit 65 to an analog-to-digital (ADC) converter 84 whose digital output is transmitted to the television special effects unit 7.

The effects unit 7, such as that described in U.S. Pat. No. 4,563,703 and U.S. Pat. No. 4,334,245, is used to manipulate the image segments 13. For instance, the component signals comprising image segments 13a-13f are transmitted from the panoramic camcorder 27. The image segments 13 are manipulated by the effects unit 7 to generate the effect to the viewer that he or she can visually pan the scene of spherical coverage. To accomplish this effect in the HMD assembly 22, the effects unit 7 performs programmed mathematical operations on the input composite scene resulting in the reconstruction of the image segments 13 specified for viewing. The image segments 13 are reconstructed in the same geographic or geometric orientation in which they were recorded.

In FIGS. 1, 20, and 21, the effects unit 7 receives a standard television signal representing a composite image 26. The signal, together with information previously stored in framestore 86, is operated upon within the effects unit 7. The x, y, address which is used to access the framestore 86 at a given picture point location is determined by the output of an address mechanism 87. In addition a parameter Z is provided by the address mechanism for controlling the processing within the processor 88. In the example shown here, a keyboard 89 or a touch tablet 90 is used to input standard mathematical formulas to generate the desired polyhedral shapes (such as a cube shown in FIG. 2a) in the computer 91. Other shapes, such as a sphere could also be input. In the case of a cube, the standard text book equation of a cube is entered and simply by defining the cell address of the center of each side, the diameter, compression (K), and orientation it is possible to determine whether a particular cell address is within the boundaries of each side. This defines the resultant picture shape.

The calculated values for x, y, together with the appropriate value for K for that cell for a given shape are then passed to disc store 92. In practice, disc 92 contains a whole range of shapes including shape sequences to allow picture transformation from one shape to another to be achieved. Once the shapes have been entered, the computer 91 is not necessarily required thereafter, and the system merely uses the disc store 92 as its shape data source. The disc access is generally not rapid enough to accommodate near real-time video rates of addressing. In order to overcome this problem, an address interpolator 93 is used. The disc store 92 holds coarse cell address data used to address specific cell patches within a recorded picture frame of matrixed pixel data. The interpolator 93 addresses every 8th frame. Thus updating the address at this rate can be handled by the disc 92 and the addresses between the available points are interpolated therefrom, both spatially and temporally. This technique does not produce any noticeable degradation to the picture produced. In this way address mechanism B7 produces the main x, y, address for the respective framestores 86, the fractional (Z) part of the address, and the density compensation value (K). In operation the address mechanism 87 addresses framestore 86 and video processor 88 cooperate to wed every eighth live or prerecorded video frame with a shape. The wedding of shape and content is called texture or surface mapping. The video processing system 7 may form the cube by wrapping, warping, twisting, or moving the video. FIG. 3 shows a typical video frame 26 comprised of six image segments 13a-13f representing portions of the surrounding scene of spherical coverage. Portions of the picture 13a–13f are moved and wed to the sides of the cube defined in the video processing system 7. More specifically, the type of special effects unit 7 utilized are generally of the type manufactured by Quantel Inc., of Stamford, Conn., as the "Mirage" TM; as part of their video "Digital Production Center".

Figure 5:
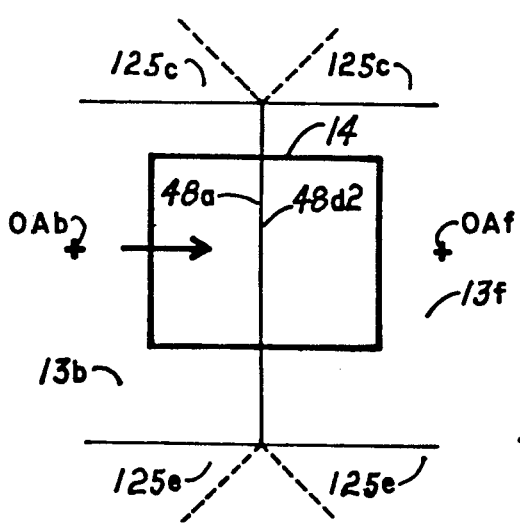
FIG. 5 is a diagrammatic representation of a processed video frame shown in FIG. 4.

Alternatively, FIG. 4 shows a video frame 14 recorded by the panoramic camera 27 in which 13a–13f may be folded or wrapped into a cube. In such an instance, the effects system 7 or video graphics board 171 mazy achieve a wrap-around effect without using a 3-dimensional mathematical formula (also see FIGS. 18, and 20–22). In this arrangement the viewer operates the effects system 7 or computer 171 to pan a 360 degree scene on the horizontal axis. An arrow (FIG. 4) is oriented in the direction of the pan. Image segments 13, representing adjacent portions of the scene, are placed in side-by-side touching or tangent relation. FIG. 5 illustrates a wrap-effect command operated upon by the image processing system 7 or 171 such that when a write command goes to the maximum limits of the x or y coordinates of the buffer, the coordinates automatically re-enter the buffer again on the opposite edge. For instance when the buffer is reached at edge 48a1 of frame 64d, the image processing system 7 or 171 automatically performs calculations such that the opposite edge 48a2 of image segment 64d is automatically placed tangent to edge 48a1. In this manner a viewer can achieve a wrap around effect which provides the visual effect of being able to pan a scene of spherical coverage. Processing the image using two dimensional mathematical formulas allows less sophisticated small pC console based image processing integrated circuit boards to be incorporated to achieve similar effects as that by more sophisticated image processing systems that manipulate live video in three dimensions. Systems that can accomplish this type of effect include the "Harry" TM and "Mirage" TM video special effects system manufactured by Quantel Inc, of Stamford, CT; or the "Illuminator" video graphics board 171 running on an IBM personal microcomputer system using the "Ilumilib" software library manufactured by MATROX Electronic Systems Limited, of Dorval, Quebec, Canada.

FIG. 20 shows a simplified arrangement of the system where the viewer/operator uses his hands to operate a floating viewpoint control panel 94 of address mechanism 93 to interactively define the portion of the scene he or she wishes to view. Panel 94 is used in lieu of the keyboard 89 or touch tablet 90 for input into computer 91. A panel 94 of the type generally utilized is manufactured by Quantel Inc., Stamford, CT, as the "Floating Viewpoint Control Panel" TM. The control panel 94 has a track ball (not shown) for controlling the x, y viewpoint parameters, and a shift bar (not shown) for controlling the z viewpoint parameter of the created shape. Referring to our cube example, the viewer having previously defined a cubical shape and K so that the viewpoint appears to be at CP as shown in FIG. 2, operates the shift bar and tracker ball to pan the inside walls of the cube on which image segments 64a–64f are texture mapped as a continuous scene. As the inside of the cube is panned, the address interpolator 93 of address mechanism 87 responds to the spatial address interpolator 93 for interpolating picture point addresses in pictures intermediate of two separated pictures. In this manner the multipliers and adders of the system 7 define the picture to be viewed based on the x, y, z orientation of the cube. The value of compression K, length L, and time T will vary between 0 and 1 typically in ⅛ steps as the addresses to modify the successive shapes within each frame are calculated. This allows any change in address shape between the 8 frame periods to be gradually introduced.

Effects system 7 can be programmed to warp image segments of the composite picture. This type of operation is conducted to remove barrel distortion introduced by wide angle objective taking lenses, such as "fisheye" lenses, that may be used with the panoramic camera system 27.

Referring to FIGS. 20 through 23 the signal representing the processed image is then typically reconverted into an analog form by digital to analog converter (DAC) 85. The converters 84 and 85 are standard items used in digital video systems and are therefore not described further. The digital signal is typically converted to standard NTSC synchronized analog signal compatible for input with the head-mounted display assembly 22 or the image segment circuit means 8.

Figure 26:
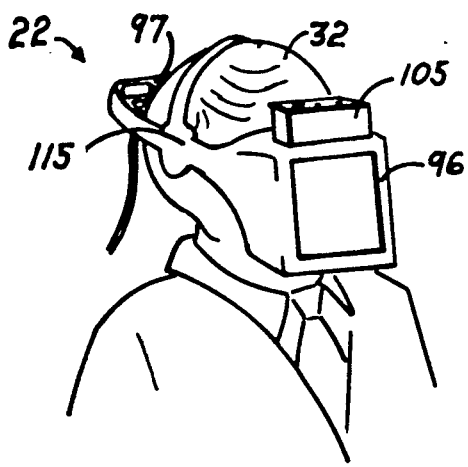
FIG. 26 is a perspective view of the exterior of the HMD system worn by a viewer.
Figure 24:
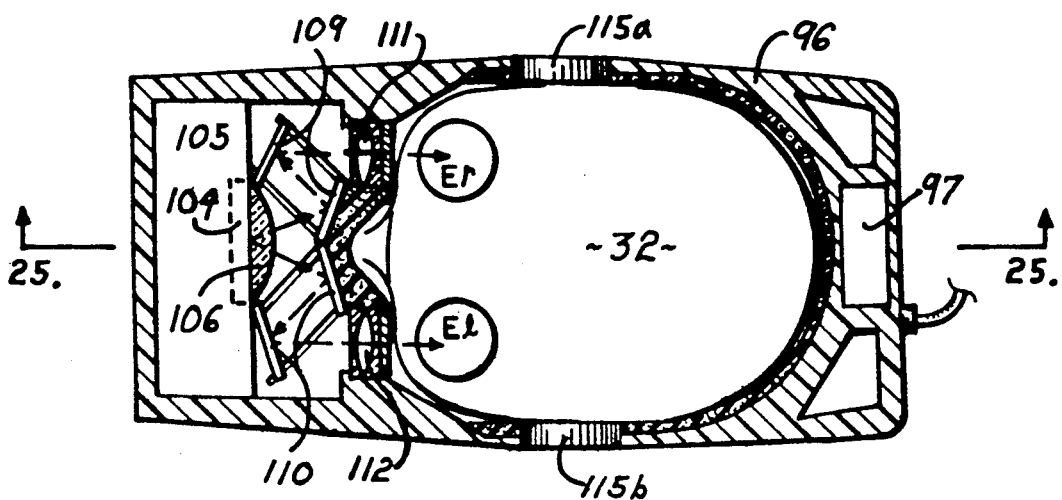
FIG. 24 is a horizontal sectional view of a head mounted display (HMD) assembly and shows components of the HMD assembly.
Figure 25:
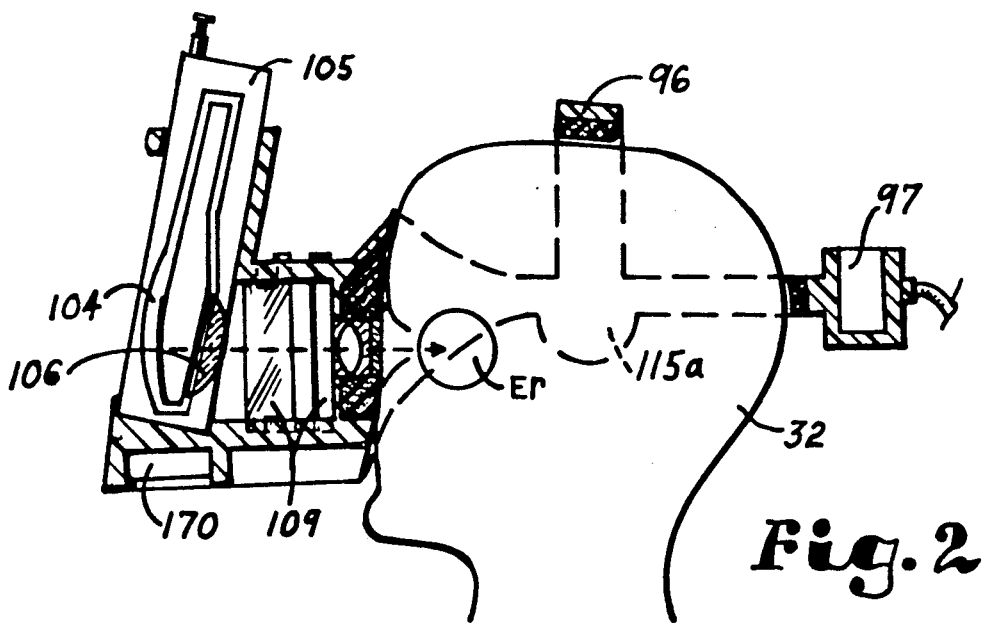
FIG. 25 is a sectional view taken on line 25—25 of FIG. 24 and illustrating further details of the HMD assembly.
Figure 27:
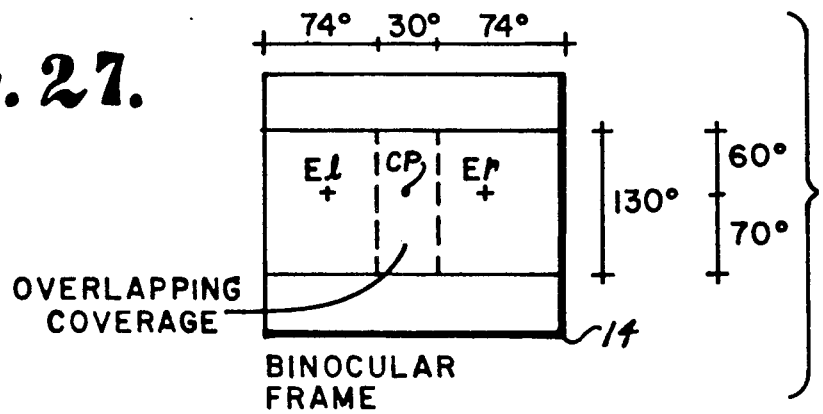
FIG. 27 is a diagrammatic representation of a video frame having binocular field of view for viewing in a HMD assembly.
Figure 28:
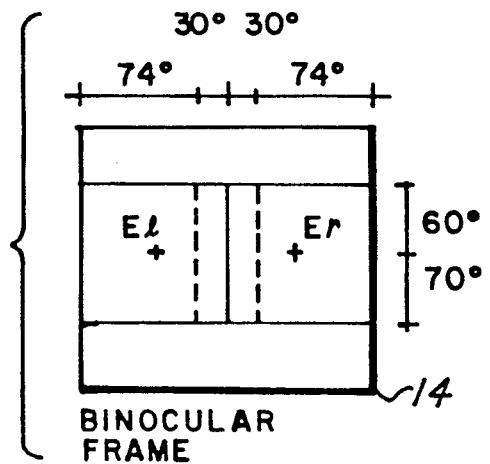
FIG. 28 is a diagrammatic representation of a video frame having a binocular coverage scene for viewing in a HMD display assembly and sampled from the frame in FIG. 3 which has adjacent field of view coverage image segments.

FIG. 21 shows a more complex embodiment of the system in which a position sensing system 95 mounted on a head-mounted display assembly 22 worn by the viewer/operator VO 32 defines the resultant scene viewed. FIGS. 24 through 26 illustrate the construction of the head-mounted assembly 22 to be described hereafter. The viewer/operator VO wears the head-mounted display assembly 22. The head assembly includes a helmet 96 constructed of a non-metallic substance, preferably plastic, which does not interfere with the electronics of the position sensor 97. Mounted on helmet 96 is a position sensor 97 which monitors the magnetic field generated by a magnetic source 98. The sensor 97 is a lightweight cube whose position and orientation is measured as it moves through free space. The source 98 generates a low-frequency magnetic field for pick-up by the sensor, and is the reference point for sensor measurements. The source 98 and the sensor 97 both receive an analog voltage signal. A voltage signal transmitted to the sensor is pulsed burst, and energizes x, y, and z coils (not shown) in turn or in phases. The affected current for each coil is then transmitted from the sensor to the position sensing system electronics unit 99. Each coil provides three readings for a total of nine readings that are processed in the position sensing system electronics unit 99 to provide position and orientation data readings. The source 98 is stationed in relation to the viewer/operator in a stationary location several feet from the viewer/operator. The position sensor 97 transmits electronic signals providing position (x-y-z coordinates) and orientation (angular vectors), with respect to the location of source 98, to the position system electronics unit 99. System electronics unit 99 contains the hardware and software necessary to control the tracker elements and interface with the host computer 91 or address mechanism 93 of the video effects system 7. The signal transmitted from the system electronics unit 99 to the host computer 91 is a digital signal. Computer 99 or address mechanism 93 is connected through a serial output port on the system electronics unit 99.

Alternatively, as illustrated in FIG. 22, a system electronic board in the form of a printed circuit board 100, which has the same capabilities of unit 99 and occupies an separate console, may be plugged into the host computer terminal bus. If the board 100 is used, the source 98 and sensor 97 transmit position sensing data to the board 100. Conductor links from the board 100 provide electrical current to the source 98 and sensor 97.

Position sensing systems 95 and 100 of a type generally utilized are manufactured by Polhemus Navigational Sciences Division of McDonnell Douglas Electronics Company, Colchester, VT under the name "3SPACE Isotrak" TM.

Referring to FIGS. 21 and 22, as the viewer/operator moves his head, the updated coordinates cause the multipliers and adders of the video effects unit 7 to update the field of view every 8 frames and in $\frac{1}{8}$ steps, conveniently using a look up table. The effects system 7 is configured to be frame addressable and pixel addressable. As illustrated in FIG. 2, the pixels of each image segment 13 of each composite image 26 are associated with cartesian coordinates of a three dimensional scene of spherical coverage about a substantially common viewpoint. As shown in FIG. 3, once the scene is translated onto a planar frame format, each three dimensional coordinate pixel point is addressable as a corresponding x-y axis pixel point. Look up tables are programmed into the effects system 7 to mathematically define the relationship between the three dimensional world and the two dimensional world represented. The look up tables are operated upon by the effects system 7 to facilitate a three dimensional effect on the two dimensional display means provided in the HMD assembly 22.

Referring to FIG. 2 for example, as the viewer looks up from center point CP, the position sensing system 95 affects the video effects unit 7 such that the portion of the panoramic scene displayed on the HMD display assembly 22 corresponds to the upward head movement of the viewer. In this way the viewer can interactively scan the entire simulated scene of spherical coverage.

Figure 30:
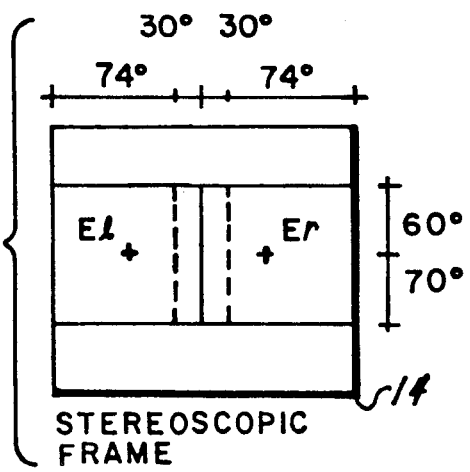
FIG. 30 is a diagrammatic representation of a video frame with a left and right eye stereoscopic view sampled from the frame in FIG. 29 for viewing in a stereoscopic HMD assembly.
Figure 29:
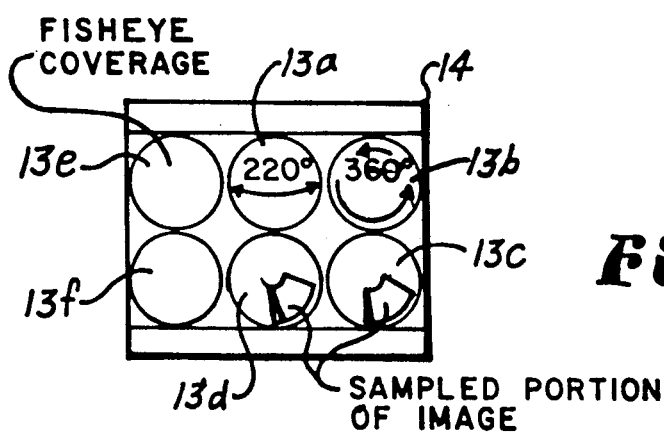
FIG. 29 is a diagrammatic representation of a video frame having image segments comprising overlapping stereoscopic spherical coverage for processing for display in a stereoscopic HMD assembly.

Alternatively, adjacent objective lenses 37a-37f of the panoramic camera system 5 have adjacent overlapping coverage such that at least two views of all portions of the surrounding scene are recorded, and a stereographic image may be sampled by the image processor 7 for stereographic viewing. In such an arrangement, each objective lens 37a-37f may consist of a fisheye lens with greater than 180 degree field of view coverage. FIG. 29 illustrates a composite image 26 whose image segments 13a-13f each have greater than 180 degree coverage. The image processing system 7 performs mathematical operations using look up tables to define corresponding left eye and right eye views to be sampled from the composite image 26 based upon the point of view defined by the viewer. A stereographic field of view is arrived at by sampling left and right eye fields of either side of the orientation defined by the position sensors 97. To achieve a stereographic effect, image segments 13 for the left eye and right eye are chosen from two adjacent objective lenses 37, each with a different, but adjacent, overlapping field of view of the visual scene. Preferably, the point of view is defined automatically by the position sensing system 95 associated with the HMD assembly 22. FIG. 30 illustrates the resultant stereoscopic image 101 that the image processing system 7 has processed for stereographic display. As shown in FIG. 30, a single stereographic image 101, represented on a single frame and output over a single channel to a single display, may be viewed on the HMD assembly 22 in FIGS. 24 through 26.

The stereoscopic image 101 may comprise a single frame and be transmitted over a single channel to the display means 4, or may be segmented for display on two channels. In the latter instance, image segment circuit means 8, such as a type described later, may be provided to segment the stereoscopic image 101 into a left eye and right eye image each for distribution over two separate channels. The segment circuit means 8 may be operated to scan out the same scene, adjacent scenes, or overlapping scenes from a binocular or stereoscopic frame created by the special effects unit 7. Each channel's signal is then applied to a display associated with the correct eye. The HMD assembly 22 with two display units of a type generally utilized for stereoscopic viewing with two channels herein is manufactured by VPL Research Inc., Redwood City, Calif., as the "EyePhone" TM System.

FIG. 22 illustrates an alternative arrangement of system 1 in which the signal processing means 3 for the HMD assembly 22 comprises a microcomputer system 165. The system includes a digital computer including a central processing unit 165, terminal bus 168, communication ports 177, memory, and the like. Operating system software, board level software, processing data, generated images and the like are stored in mass storage devices 80 which may include disk drives, optical disk drives, and so forth. A conventional microcomputer generally of a type utilized is manufactured by International Business Machines of Armonk, New York as the 386 based "IBM PC AT" (TM). The microcomputer 165 includes expansion slots for adding circuit boards on the bus 168. The boards are addressed over the system bus 168 of the microcomputer 165. Commands to operate the computer system 165 and associated board level commands are entered by means of the viewer interaction devices which may include a keyboard 81, and printed circuit board level systems such as position sensing system 97, 98, and 100, videographics system 171, and a voice recognition system 169 and 170. The operation of the board level position sensing system 100 is similar to the position sensing electronics unit 99 and associated components described earlier. The position sensing board 100 transmits position and orientation data to the videographics board 171 to define the scene viewed in the HMD assembly 22. The videographics board 171 operates to pan, zoom, and wrap each composite frame shown in FIG. 4 in a manner previously described according to FIG. 5. The videographics system 171 includes conventional input connectors for communicating with the input means 2, and output connectors for transmitting an NTSC video signal to the HMD assembly 22. Additionally, a voice recognition system 169 operates to translate audible sounds made by the viewer into machine language to control processing functions of the microcomputer 165. The voice recognition system 169 includes a microphone which transmits a signal representing audible sounds over an associated conductor with an input jack arranged in receiving relationship to the voice recognition printed circuit board. A board level voice recognition system generally of a type utilized is manufactured by Speech Systems, Batavia, Ill., as the Electronic Audio Recognition System.

Additionally, FIG. 23 illustrates a modification according to the present invention of a system shown in U.S. Pat. No. 4,463,380, in which a system of hemispherical coverage is modified for processing a spherical image. Illustrated is the image processing system 7 wherein information corresponding to a selected spherical geographical region or geometric system is stored and selectively retrieved and processed to reproduce images corresponding to selected portions of the spherical geographical or geometric system. In a preferred embodiment, the information is initially recorded photographically and subsequently stored in a digital recording system. Processing, memory, and control systems are employed for producing video signals to be provided to video display units, for producing simulated real time images corresponding to the selected portion of the geographical or geometric system. A panoramic camera system 6 of overlapping spherical coverage replaces the hemispherical camera of U.S. Pat. No. 4,463,380. The processing system 3 is reprogrammed to accept and process images of spherical coverage. Display assembly means 4, as described herein, are provided to display the processed image of spherical coverage.

3) IMAGE SEGMENT CIRCUIT MEANS

Image segment circuit means 8 are provided to distribute the images comprising spherical coverage to the large display assembly 23. The function of the digital processing circuitry means 8 is to accept an incoming NTSC television signal and to display it over an array of display units 11 so that the resulting image appears as it would on a single very large screen TV that completely and continuously surrounds the viewer. This is called segmenting an image. Referring to FIG. 31, the circuit segment means 8 generally includes:

Video Input Source 2—SECAM, PAL, or NTSC compatible;
Programming Computer 122—IBM PC XT with MS DOS;
Video Distribution System 116—i.e., Delcom;
Audio Distribution System 127, 128—ie, 8 Track Audio System;
Image Processing System 117—ie, Delcom Universal System;
Control Units 178—ie. Delcom RGB converters;
Display Units 11—ie. CRT, projection, or flat panel;
Associated electrical receptacles and conductor cables 118, 119, 176—ie, Delcom.

Referring to FIG. 31, an input signal representing a composite scene according to frame 26 of FIG. 3 is transmitted is from an input means 2, such as a panoramic video camera 5, to the video distribution switcher/amplifier 116. Such a video distributor is manufactured by Delcom USA, Inc., Philadelphia, Pa., for use in their "VIDEOWALL" TM systems. Video distribution amplifier/switcher devices are well known to those in the industry and so will not be described in detail. An image processing system or video image controller 117, described hereinafter, can alternatively be operated to distribute a signal representing the composite image 26, image segments 13a-13f, or sub-segments 13a1-13f12. The distributor 116 routes the input video signal representing a composite image to a plurality of control units or red-green-blue (RGB) converters 178a-178f. Each RGB converter 178 converts the signal into RGB signals and routes them to a respective image controller 117a-117f. Alternatively, the image controller manufactured by Video Matrix Corporation may be incorporated in which an NTSC signal may be routed directly to the image controller 117 which accomplishes the RGB conversion internally.

The electronic video controller system 117a-117f accepts the incoming video signal and partitions and processes it for display on the display units 11a1 through 11f12. The image is partitioned into "segments", one segment or sub-segment for each display unit 11. In FIG. 3, the edges of the segments 13a-13f are denoted by dashed lines, and the edges of the sub-segments 13a-f,1-12 are denoted by dotted lines.

The image controller 117 is capable of accepting a single NTSC type video signal and dividing this single image into a displayable array covering 2×2, 3×3 or 4×4 television units. The segment on any individual display unit may be frozen, independent of the incoming signal, and the system is compatible with certain computer generated graphic images.

In order to cover the 2×2, 3×3 and 4×4 monitor array configurations while maintaining a reasonably clean system design, it is desirable to set the number of vertical and horizontal picture elements to a value which is divisible by the least common multiple of the array size, in this case 12. The number of vertical lines in a standard TV frame is 480, which meets the above criterion. The number of pixels to be sampled in each horizontal line is somewhat arbitrary; a larger number provides better resolution at the cost of increased processing speed. A number which meets the above criterion and which is reasonable from both the resolution and processing standpoints is 768 pixels per line. The 768 pixel per line sample is about (14.318 Mhz), which is 4 times the color subcarrier frequency exceeding the Nyquist Sampling Criterion by a fairly comfortable factor of two.

In terms of computer generated graphic images, there is available the IBM PC graphics adapter (640×200) and similar extended graphics adapter (640×480). The pixel clock, which is the relevant parameter, for these products is 14.31818 Mhz. Use of this clock rate for sampling of the NTSC video information permits pseudo synchronous operation of the video segmentation system with these computer graphics products.

The active portion of a video line of information is displayed in an interval of about 54 microseconds. Given a sampling of 14.31313 Mhz, 773 video samples can be acquired in this time of 54 microseconds. In order that the image be segmented into segments which can be individually frozen, the system preferably allows for selection of image storage elements within the image memory with boundaries identical to those associated with 2×2, 3×3 and 4×4 display unit arrays. Alternatively, but not preferably, each display unit output channel may be provided with an individual sub-frame of storage.

The incoming NTSC signal provides a complete video image typically each 1/30th of a second. The system 117 produces N (4,9,16 . . .) processed image segments and N' sub-segments (e.g. 48,108,192 . . .) in the same 1/30th of a second. Each segment contains the same number of lines as the original image. The process for performing this type of function is known as "scan conversion and interpolation". Scan conversion is the production of information at a rate different form that at which it is acquired. Interpolation is the provision of a finer grain in the information output than is present in the input. This general technique of scan conversion and interpolation is used in acquisition and display systems for medical imaging and military imaging applications.

Still referring to FIG. 31, the digital scan conversion and interpolation video processing is carried out by a respective image controller 117a-117f. System 117 typically consists of four discrete modules when the image converters 178 are not present: an NTSC converter and digitizer; a frame memory; a line segment router; and output converters (not shown).

The function of each module is described below:

When present, the NTSC converter and digitizer 178 converts the incoming NTSC video signal to a stripped, DC restored video and sync form. It digitizes the video signal in time synchronization with the stripped sync signal and passes the resulting image data to the frame memory. The data is stored in frame memory of controller 117 (a digital storage system, preferably a high-speed solid-state memory) as sequential image lines taking into account the interlaced nature of the NTSC signal.

The frame memory acts as a data storage device for a full frame of video data, consisting of two interlaced fields each containing 240 lines of information.

The line segment router extracts segments of video lines from frame memory and routes these line segments, appropriately, to a number of output converters, one of which is associated with each video display unit displaying some portion of the desired image.

The output converters take the line data and perform the necessary interpolation and digital-to-analog functions to produce an RS-170 (RGB+SYNC) video signal to drive the individual TV display units 11.

In the system 117 the line segment router and the output converter are programmable to accommodate the multiplicity of display unit array sizes. In this way image segments and sub-segments can be scanned out of the composite image signal.

Video images are conventionally generated in an interlaced fashion wherein every other line in the image frame is generated during one field interval the alternative lines are generated during the next field interval. If each frame of video information is written to a memory and read out, for example, onto a 2×2 array of monitors, with the writing and reading process beginning at the top of each image and proceeding to the bottom of the image, the writing process will overtake the reading process almost immediately on the top row of monitors and again ¼ the way down the image (in the center of the bottom row of display units). The implications are that the information contributing to the ¼ of the image beginning at the top of the lower row of units will be out of time sync with the remainder of the image by as much as 1 frame interval, depending on motion, which is clearly unacceptable.

The preferred solution to this problem, considering also the previous constraints is to provide a rotating 3-field queue in which the image output to the monitor array comes from 2 static fields of memory data while the input field is stored in the 3rd memory. This will inject a 1/60th second (1 field) delay between the incoming information and the display, a "video field pipeline".

Within each image controller 117a-117f is a central processing unit (CPU) 120a-120f, respectively, which executes software commands to effect the processing of the images in each framestore memory of framestore cards 121a-121f. The CPU's of each image controller are connected by an internal bus to each respective framestore card. The software commands read by the CPU may be pre-recorded onto optical disk, video tape, or image controller by use of a conventional microcomputer 122. Alternatively, the viewer operator may interactively operate a conventional microcomputer 122 programmed to interact with segment circuitry means 117 by operating an input device 123, such as a keyboard. The microcomputer 122 is connected by a control bus to the image controllers 117a-117f via the distributor 116. The microcomputer transmits software commands to the image controllers 117a-117f to effect image display. Software commands consist of time code and program code for control of the displayed picture. The host computer 122 is also used to input software commands that specify the picture aspect ratio to be scanned for display. In this manner the signal representing the composite image within the image controller 117 may be segmented into image segments 13a-13f or sub-segments 13a1-13f12. The video signal representing each framestore cards (not shown) picture segment is then transmitted to a corresponding display unit 11. The number of picture segments that the image controller can segment the composite picture into varies and determines the maximum number of display units that can be accommodated. Preferably, image segments are preformatted by the panoramic camera 5 to correspond to the picture segmentation accomplished by the image controller 117.

The associated audio signal transmitted from the input source is applied to an audio distribution system 126. The audio signal 129 is applied to an amplifier 127 which transmits the signal to audio speakers 128.

Image segment circuit means 8, including an audio system, of the type generally utilized in FIG. 31 of the system 1 is marketed by DELCOM USA, Philadelphia, Pa. and includes image controllers 117 sold as the "Station Pro" and "Universal".

Alternatively, any image processing system 3 that facilitates the segmentation and distribution of images of spherical coverage can be adapted for use within the present system. Similar segment circuit means 8 which is of a type generally utilizable within the scope of the present invention is also disclosed in U.S. Pat. No. 4,734,779.

Figure 32:
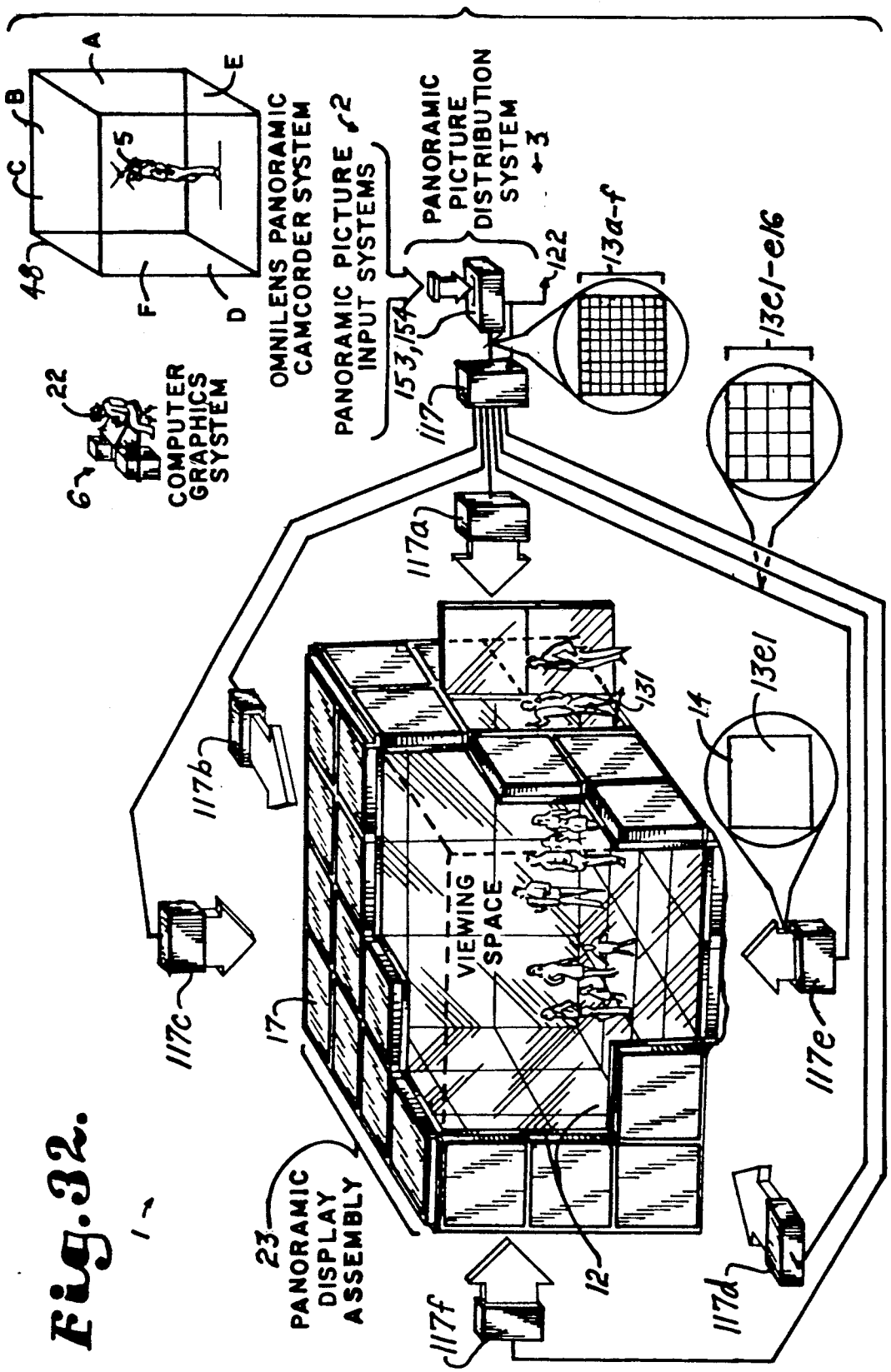
FIG. 32 is a perspective, partially diagrammatic view showing details of an alternative arrangement of the image segment circuit means with a first and second image controller.

FIG. 32 illustrates an alternative segment circuit means 8 arrangement in which a first image controller 117 transmits an image segment 13a-13f of the composite image to a second image controller. The second image controller 117a-117f operates upon the transmitted signal to sub-segment the image. The sub-segmented image is then applied to an associated display units 11a-11f,1-12. The first and second image controllers receive program and time code in the form of computer language over a control bus from the programming computer 122 as previously discussed. Dots in FIG. 3 indicate the edges of the sub-segmented image 131a1-13f12 displayed on the display units of FIGS. 31 through 33. Image segment circuit means 8 of the type generally utilized in FIGS. 31 and 32 of the system 1 is manufactured by DELCOM USA, Inc., Philadelphia, Pa., and includes a first image controller and a second image controller sold under the name Universal and Station Pro respectively.

Figure 33:
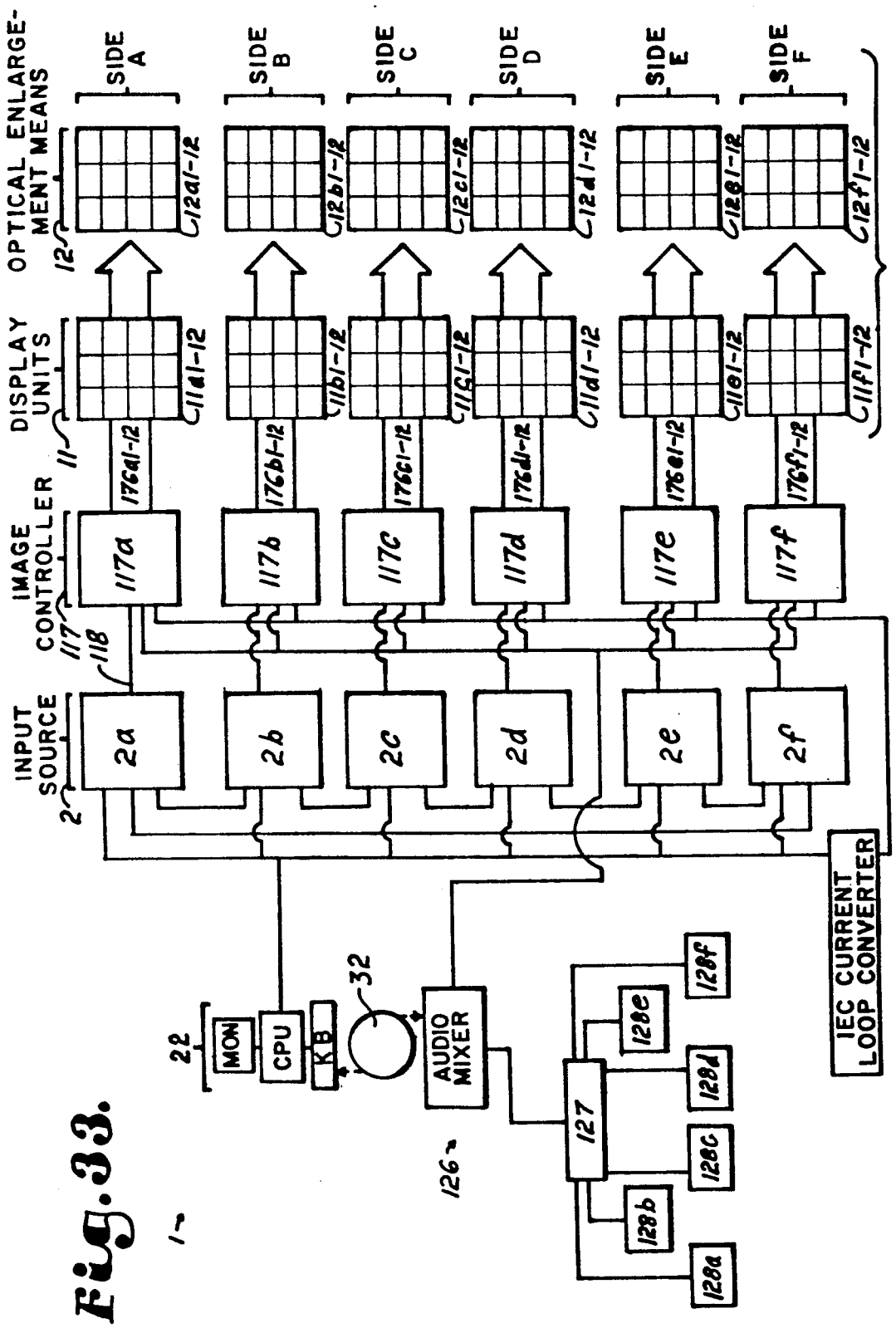
FIG. 33 is a block diagram showing details of an alternative arrangement of the image segment circuit means with plural input sources and image controllers.
Figure 34:
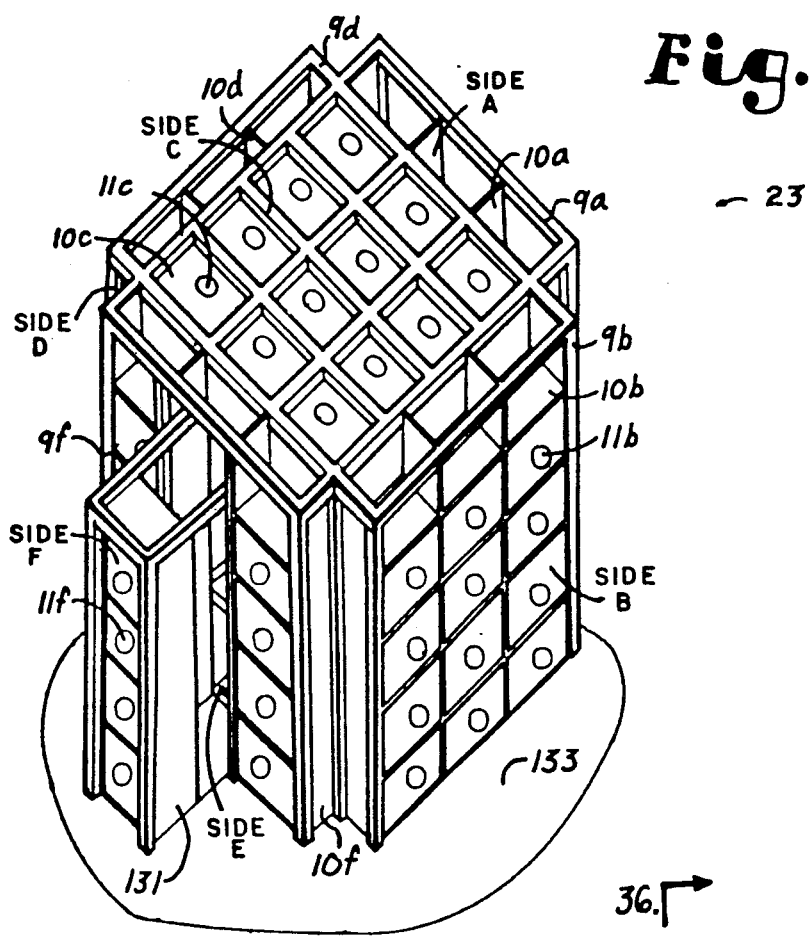
FIG. 34 is a perspective view of the exterior of a large image display assembly for displaying images of spherical coverage.

FIG. 33 illustrates a segment circuit means 8 arrangement in which a plurality of image controllers 117a-f receive an image segment 13a-13f from a respective input source 2. Each block of display units 11a-11f, 1-12 receives an image sub-segment from an associated image controller 117a-117f. A microcomputer 122 is programmed and operated to control the functions of each image controller 117a-117f and input source 2. Image segmentation circuitry means 8 of the type generally utilized in FIGS. 33 of the system 1 is manufactured by North American Philips Inc., of New York, N.Y. under the name "VIDIWALL".

FIG. 23 illustrates an additional arrangement for image segment circuit means 8 which is adaptable and of a type which may be utilized in system 1 and which is manufactured by Vought Corporation, Dallas, Tex., and described in U.S. Pat. No. 4,463,380. Segment circuit means 8 may be configured to sample out an image segment or segments for display in the head mounted display assembly 22 or numerous image segments for large display assembly 23.

DISPLAY ASSEMBLY MEANS

1) HEAD MOUNTED DISPLAY ASSEMBLY

Preferably, the video effects unit 7 cooperates with the head-mounted display assembly 22 which is designed to allow the viewer a natural field of view. A humans binocular visual field is about 130 degrees vertically and 208 degrees horizontally, assuming the eyes to be fixated straight ahead. The vertical field extends from 60 degrees above horizontal to 70 degrees below. The horizontal field extends 104 degrees laterally (left and right). With an overlap at the center point of the viewed image of about 30 degrees for both the left and right eye. The field of view is a function of compression (K) as defined by the viewer/operator of the effects system 7.

Referring to FIGS. 24 through 26, the digital-to-analog converter 85 transmits the video signal to the head mounted display means 104 of the HMD assembly 22. Head-mounted display means 104 consist of a conventional portable flat television display 105 generally of a type manufactured by Sony Corporation, Tokyo, Japan as US Model FD-40A, U.S. Pat. No. 4,339,694 or by Casio Computer LTD, Tokyo, Japan, under U.S. Pat. No. 4,562,478. The portable television 105 receives a conventional television signal. The signal output by the effects unit 7 is processed to be compatible for input to the television unit. The signal may be transmitted to the TV over a conductor and input through a video input jack or broadcast over-the-air to the portable television. A portable television has a audio/video input jack for receiving a standard video signal. Portable television 105 is held in place by conventional fasteners and is a sub-assembly of the HMD assembly 22. In operation the display means 104 portion of the portable television 105 is positioned flush or immediately adjacent to dispersion lens means 106. The placement of the dispersion lens means 106 allows projection of the displayed image on display means 104 in visual communication via lines of sight 107 and 108 with the respective right eye (Er) and left eye (El) of the viewer. The displayed image on display means 104 is reflected to reflector elements or mirrors 109 through viewing lens 111 to the viewers right eye Er. The displayed image on display means 104 is reflected to reflector elements or mirrors 110 through viewing lens 112 to the viewers left eye El. Mirrors are mounted such that they are adjustable to achieve overlapping or non-overlapping coverage. The mirrors are mounted in brackets 147 and 148 that may be slid forward and backward to define the portion of the displayed scene reflected from the display means to the viewers eyes. Position sensor 97 is mounted at the rear of the helmet. The position sensor 97 is connected to the position electronics unit 99 by a conductor and appropriate interface means. The audio reception from portable television 105 is transferred to the viewers ears using conventional headphones which plug into the earphone jack 114. Earphones 115a and 115b are provided for both the left and right ear, respectively. The helmet is of a lightweight material, such as plastic that holds the components of the assembly in place. Cushions are placed in the helmet to facilitate the wearing of the helmet by the viewer.

2) LARGE DISPLAY ASSEMBLY

Preferably, a large display assembly 23 is provided to receive and display the image of spherical coverage to large audiences once post production work using the HMD assembly 22 has been completed.

As illustrated in FIGS. 34 through 39 the large display assembly 23 is configured in a polyhedral arrangement. The display assembly comprises a structural assembly that enclosed the viewers head, upper body, or entire body. The assembly is designed to facilitate a single or plural number of viewers. The floor 130 and its associated display units 11 beneath, to the sides, andover the viewer/operator are integrated so the viewer is presented with a substantially continuous scene for viewing. The structural framework 8, supports 10, and associated fasteners 134 are integrated with the display assembly such that they are hidden from the viewer. Preferably, structural framework 9 and supports 10 are constructed of conventional metal rods and plates, respectively. The structural supports 10 and framework 9 cooperate to securely hold the display systems 11 and optical enlargement panels 12 securely in place. Conventional fasteners 134 are used to hold the framework and supports together and in place. Display systems and optical enlargement means mounted on spring-hinged doors, latches, or rollers, allow the entry and exit assembly 131 to move back and forth in an open and closed position to enable viewer entry and exit. Entry and exit assemblies, and other sections of the display assembly can be omitted, however this will detract from the realism of the panoramic scene. The floor 130 on which the viewer is situated is preferably of a rigid transparent material through which the viewer sees the viewing side of the display systems or optical enlarging assemblies. Alternatively, the viewing side of the display systems or optical enlarging assemblies is constructed of materials that support the viewer. The material on which the viewer is situated is preferably formed of a transparent rigid glass, plastic, or glass-plastic laminate.

FIGS. 23 and 31-33 illustrate how the processing means typically relates to the display assembly. Referring to FIG. 31 as an example, each framestore card, 121a1-121a12, 121b1-121b12, through 121f1-121f12 associated with image controllers 117a-117f respectively, output a picture signal representing sub-segments 13a-13f,1-12 of the composite image 26. Each respective display units electrical circuitry possesses the signal for display. Conventional display units such as flat panel 17, cathode ray tube (CRT) 16, or video or laser projector 15 units are incorporated to receive the image segments from each image controller 117a-117f. FIGS. 35 through 39 illustrate a basic display assembly 23 that uses CRT's 16. FIG. 32 illustrates a similar arrangement that uses flat panel units 17, such as large plasma, electroluminescent, or liquid crystal displays. FIGS. 49 through 53 illustrates a similar assignment that incorporates projector units 15. The example presented in FIGS. 35 through 37 uses seventy-two display units 11, comprised of six arrays of twelve display units each.

Figure 52:
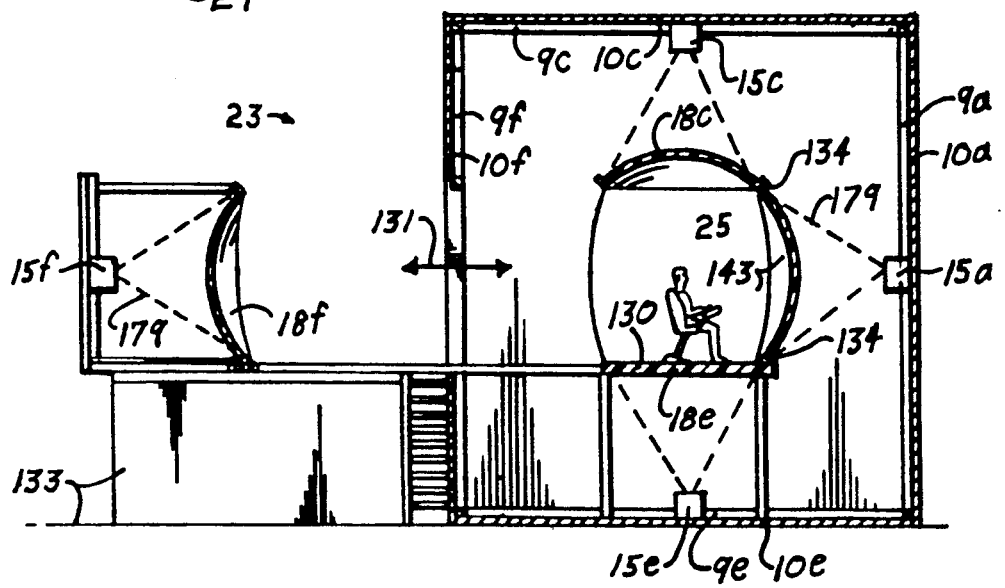
FIG. 52 is a cross sectional view of a spherical projection assembly enclosure with a wall removed to illustrate details of the assembly.
Figure 53:
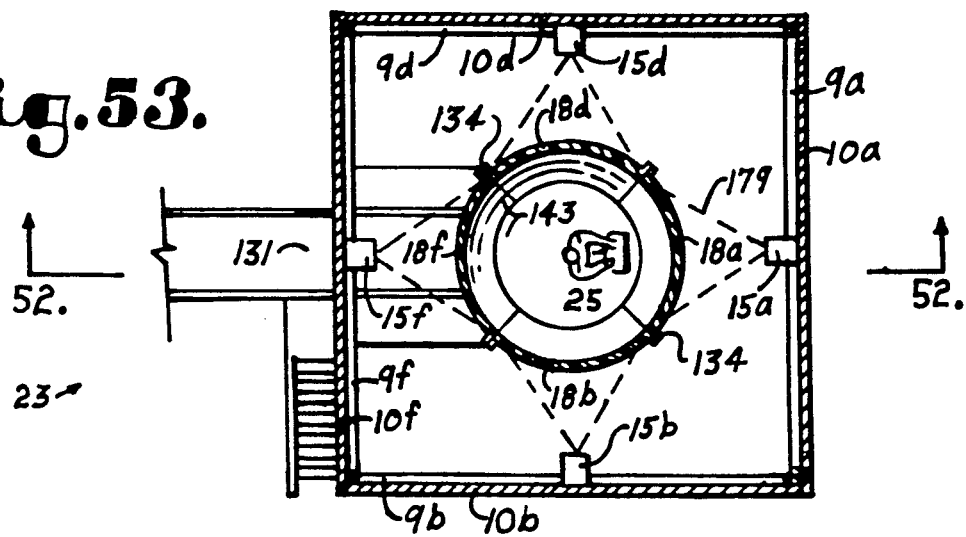
FIG. 53 is a top plan view of a spherical projection assembly with the roof removed to illustrate details of the assembly.

Alternatively, a singular number of display units may be placed to each side of the viewer to provide an assembly of spherical coverage. FIGS. 52 and 53 illustrates a system in which a single display unit 11a-11f is positioned to each side of the viewer to achieve a scene of spherical coverage. In such an arraignment a single image controller using six framestore cards transmit image segments to a corresponding number of display units.

Displays of various aspect ratios and color or monochrome displays can be incorporated. Display subsystems are located to the rear of the display units such that the viewing surface of the display unit is maximized and the frame of the display unit minimized. Display unit control and adjustment levers are located on a small area on the front of the panel, located on the back side of the panel, or preferably, located in a console in an adjacent room. Each display is powered by standard power source using conventional electrical outlets.

In the arrangement shown in FIGS. 35 through 39 the frames and spaces between the display units are simply located as closely as possible to one another. In this arrangement the frames and spaces between the display units are visible, but minimized.

Figure 35:
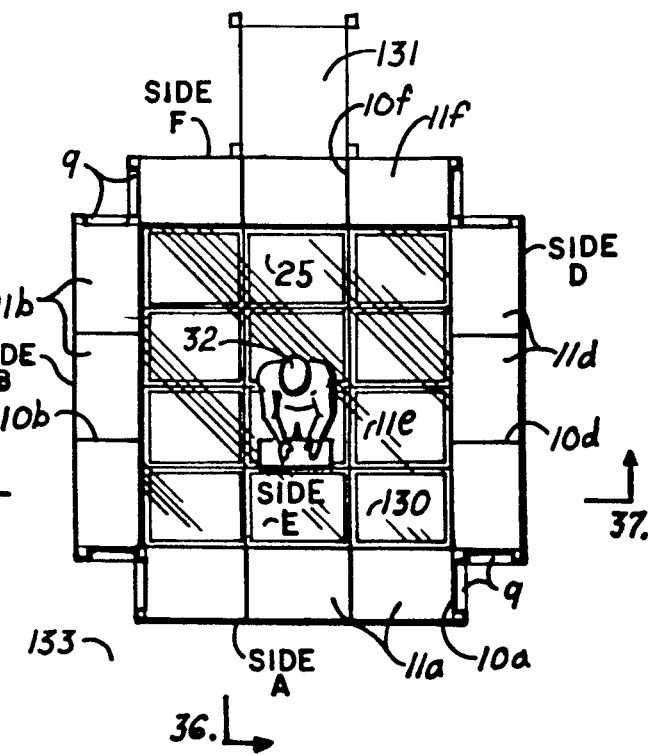
FIG. 35 is a top plan view of the display assembly enclosure with the ceiling removed to illustrate details of the assembly.
Figure 37:
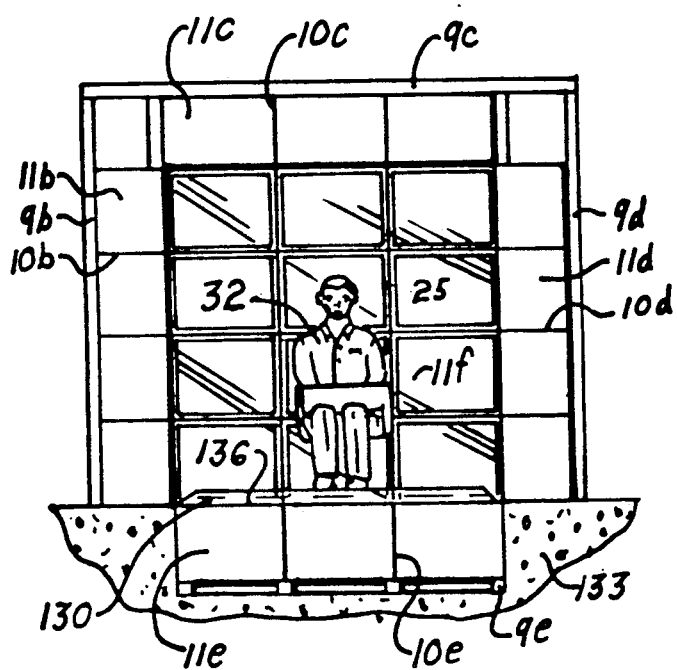
FIG. 37 is a cross sectional view of the display assembly enclosure taken on line 37—37 of FIG. 35.
Figure 36:
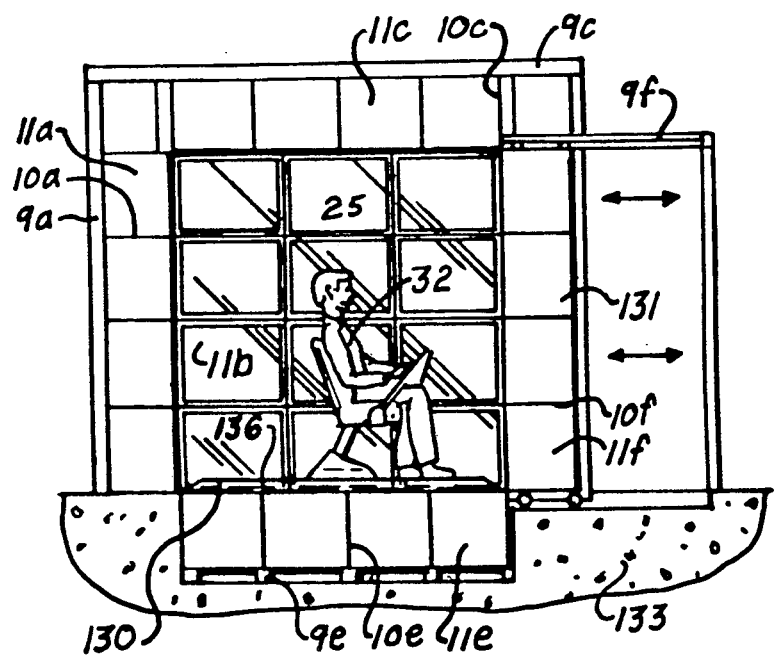
FIG. 36 is a cross sectional view of the display assembly enclosure taken on line 36—36 of FIG. 35 and illustrates details of the assembly.
Figure 38:
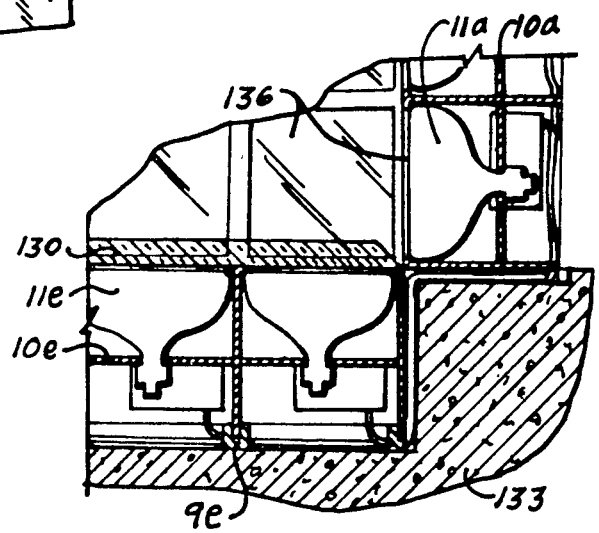
FIG. 38 is an enlarged fragmentary sectional view of a lower corner of the display assembly enclosure and illustrates details of the interconnection of the component sections of the display assembly.

FIG. 38 shows an enlargement of the bottom corner of the large display assembly 23 shown in FIGS. 35 through 37. Floor framework 9e holds the display unit supports 10e of the floor above the stage 133. The display unit supports 10e hold the transparent flooring material 130 above the display units. The transparent flooring material 130 in turn supports the viewer and any associated interactive input, control, or peripheral systems located in the viewing space 25. The viewer observes the display units 11 below him through the transparent flooring material 130. Access space behind the display screen of the display units is allowed for ventilation, electrical cables, and wires, audio speakers required to operate the system. Display units are packed beside one another as tightly as possible to increase the continuity of the displayed panoramic scene.

Figure 39:
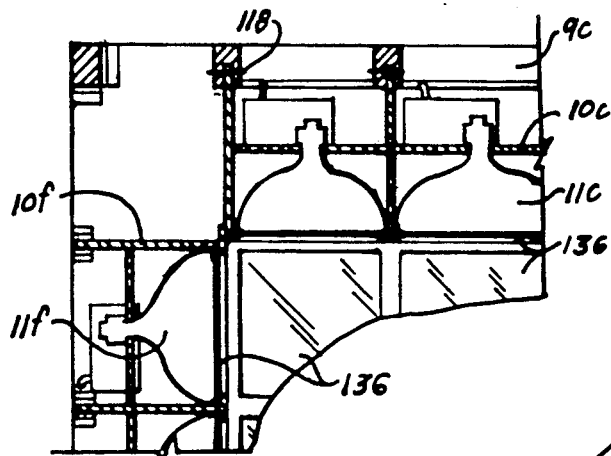
FIG. 39 is an enlarged fragmentary sectional view of a top corner of the display assembly enclosure and illustrates details of the interconnection of the component sections of the display assembly.

FIG. 39 shows an enlargement of the top corner of the assembly 23 shown in FIGS. 35 through 37. Display units over the viewer that form the ceiling are held securely by ceiling display unit supports 10c which surround and are fastened by fasteners 134 to each display unit 11c. The display support framework supports 10c are fastened by conventional fasteners 134, such as nuts and bolts or welds, to horizontal beams 9c of the supporting structural framework 9. The horizontal beams form a matrix that is supported by vertical columns of the framework 9a, 9b, 9f, and 9d. The vertical columns 135 are supported by the stage 133. The vertical columns 9a, 9b, 9f, and 9d of the assembly 23 hold the CRT display unit supports 10a, 10b, 10f, and 10d which form the wells of display units 11a1-12, 11b1-12, 11f1-12, and 11d1-12 located to the sides of the viewer. Access space for electrical cables, ventilation ducts, and audio speakers are positioned behind the display units 11.

Referring to FIGS. 41 through 51, optical enlargement means 12 hide or minimize the undisplayed area between and around the active viewing portion of each display unit so that a viewer sees a continuous scene in any viewable direction. Enlargement means 12 comprise a plurality of optical enlargement plates 19, 20, 21 or screens 18 arranged adjacent to one another to form an assembly. The edges of the adjacent enlarging plates or screens may be constructed to be overlapping and/or interlocking. The optical enlargement plates or screens are placed between the display units and the viewer. Optical enlargement plates or screens can be constructed to have either curved or flat sides facing the viewer.

Figure 41:
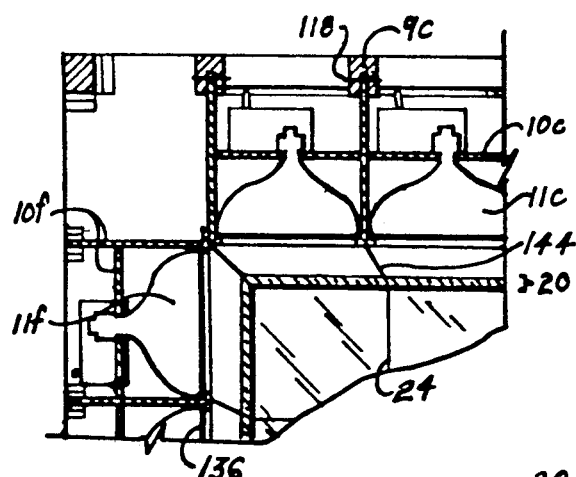
FIG. 41 is an enlarged fragmentary sectional view of an upper corner of the display assembly enclosure and fresnel lens plate assembly.
Figure 40:
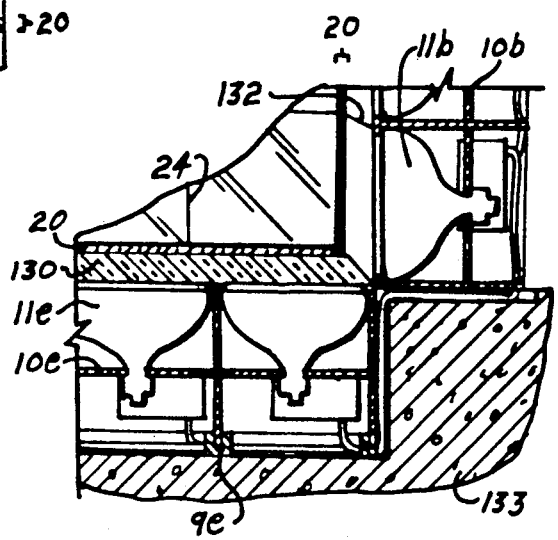
FIG. 40 is an enlarged fragmentary sectional view of a lower corner of the system enclosure illustrating details of the interconnection of the display assembly enclosure and fresnel lens plate assembly.
Figure 42:
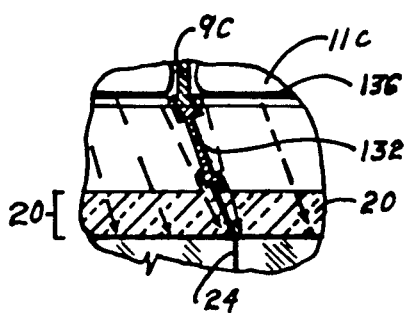
FIG. 42 is a greatly enlarged fragmentary sectional view illustrating details of the positioning, supporting, and fastening of the fresnel lens plate assembly.

Alternatively, in FIG. 40 floor 130 and display unit support 10e support fresnel lens plates 20e, a thin transparent protective floor cover 135 is positioned on top of fresnel lens. The floor cover 135 protects each fresnel lens plate below the viewer from damage by the viewer who is situated upon the floor. FIG. 42 shows an enlarged detail in which fresnel lenses on the wall and ceiling are supported at the edges by fresnel lens support armatures 132. Armatures 132 are fastened by conventional means to each corresponding display units supports 10 at one end and to an associated fresnel lens plate 20 at the other end. Each support armature 132 is angled toward the viewer so as to not interfere with reflected light cast from the viewing side of the display unit 11 to its corresponding fresnel lens plate 20. As shown in FIGS. 41 and 42, each fresnel lens 20 is positioned parallel to a corresponding display unit 11 viewing surface. Each display unit 11 reflects image through an associated fresnel lens plate 20 to the viewer. The edges of each fresnel lens plate 20 is positioned tangent to an adjacent fresnel lens plate 20 and appear to reflect a continuous scene about the viewer. The floor support, fresnel lens plates, and protective floor cover are constructed of any suitable transparent material such as plastic or glass. Adjacent fresnel lens plates are optically formed so that they cooperate to reflect a continuous scene to the viewer. Fresnel lens plates of a type generally utilized in the present invention are manufactured by North American Philips Inc. for use in their "VIDIWALL" TM system.

Figure 44:
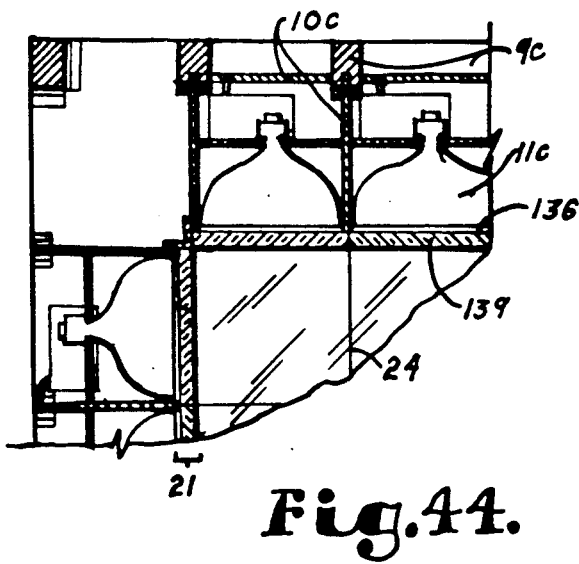
FIG. 44 is an enlarged fragmentary sectional view of a lower corner of the system enclosure illustrating details of the interconnection of the system enclosure and the fiber optic enlarging plate assembly.
Figure 45:
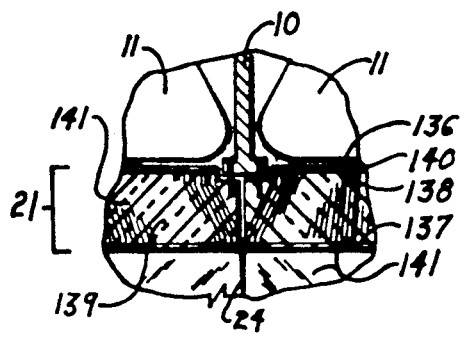
FIG. 45 is a greatly enlarged fragmentary sectional view illustrating the positioning, supporting, and fastening of the fiber optic enlarging plate assembly.
Figure 43:
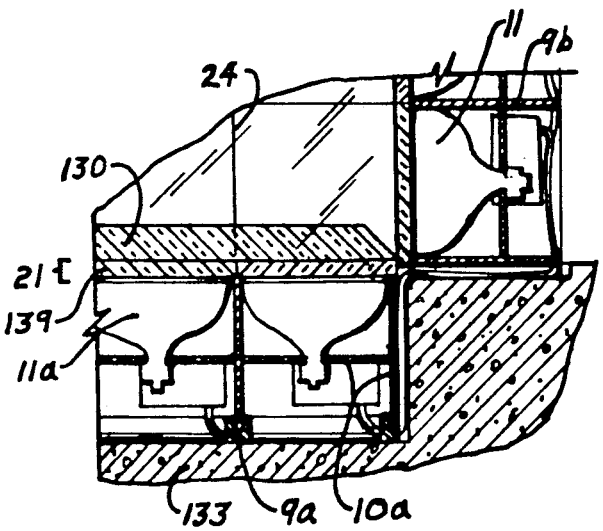
FIG. 43 is an enlarged fragmentary sectional view of an lower corner of the display assembly enclosure and a fiber optic enlarging plate assembly.

FIGS. 43 through 45 illustrates another arrangement of the enlarging assembly. FIG. 44 illustrates an enlarged view of a top corner of the assembly 23 shown in FIGS. 21 through 25 which incorporates fiber optic plates 21, to surround the viewer such that a continuous uninterrupted scene is displayed to the viewer. Edges on the viewing side of each plate 21 are placed tangent to one another. A plurality of adjacent fiber optic image transmitting guides 139 reflect adjacent portions of the displayed image of the displayed image of the display unit 11 to the viewing side 137 of the fiber optic plates in focus. The fiber optic guides 137 are tapered and increase in width as they go from the receiving side 138 to the viewing side 137 of fiber optic plate 21. The main body of the fiber optic guides 139 tilt increasingly outward from the center of each fiber optic plate 21 in order to conceal the frame from the viewer and to allow the fiber optic plates to be placed adjacent to one another to form an uninterrupted continuous scene. The adjacent fiber optic guides orientation is fixed and maintained from one side of the panel so that a coherent image is transmitted. A transparent rigid material such as glass or plastic may be placed between the fiber optic plate and viewer in order to support the viewers weight. The fiber optic plate and the transparent flooring material is supported by the floor and display unit supports 10. Alternatively, the fiber optic plates 21 may be constructed of rigid transparent material to independently support the viewer. The frames of each fiber optic plate 21 is fastened with fasteners 134 at their backedges by conventional means to the associated display unit support 10 that surrounds their respective display unit 11. Each fiber optic plate 21 is positioned parallel to its corresponding display unit 11 to accept the image transmitted from that associated display unit 11.

The manufacturing and use of coherent fiber optics in a rigid and fused arrangement for use as image conduits is known to those skilled in the art. Fiber-optic plates 19 of a type generally utilized in the present system are disclosed in U.S. Pat. No. 4,299,447 and U.S. Pat. No. 4,613,210 where a display unit is placed flush to a transparent plate through which the image appears, is replaced by a block of glass made up of fused-together tapered optical fibers, said block being designed to form a magnifying glass. U.S. Pat. No. 4,299447 and U.S. Pat. No. 4,650,280 disclose fiber optic transfer devices which use flexible optical fibers to transmit and magnify an image from a display unit may also be incorporated for use as fiber optic plates 11 in the present invention. The fiber optic bundles may be of various sections, lengths, and diameters. Fiber optic bundles consist of many transparent glass or plastic rods for internal transmission of a coherent image. Fiber optic bundles within each of the fiber optic plates are preferably fused together. By tapering a fiber optic guide to a larger exit surface area, image detensification occurs and the necessary image display intensification increases. However this detensification can be compensated for by simply using the adjustments on the display unit and increasing the picture brightness. To eliminate the effects of stray light, a black compound cladding termed extra-mural absorption is applied to the exterior of each fiber optic guide. The cladding has the triple functions of protecting the reflection surface, providing optical insulation from adjacent fibers and permitting fiber optic guides to be fused to vacuum tightness. The cross section of the optical fiber plate and guide bundles that make up each plate needs not obviously be circular, it could also be square, or rectangular or any other shape, as long as the object ends remain quasi contiguous and placed in strict correspondence to the pixels of the active side of the display unit 11. As cited in U.S. Pat. No. 4,613,210, a window of microlenses 140 which are centered both on pixels of the display unit and on the receiving ends of the fibers or fiber bundles of the fiber optic plate 11 may be included to assist in transmitting the image.

FIG. 45 illustrates that the receiving ends of the fiber optic plates are placed against the window of the CRT behind which the active display lies. The image displayed on the active display surface of the display unit are reflected through the fiber optic panels to the viewing side of the fiber optic plate. A sheet of micro-lenses 141 which are pyramid shaped or convex may be placed in strict correspondence to fibers or fiber bundles on the exit side of the fiber optic plate to facilitate viewing by the viewer. The sheet of micro-lenses 141, referred to as micro-pyramids in U.S. Pat. No. 4,613210, are of a type generally incorporated in the present invention.

Figure 48:
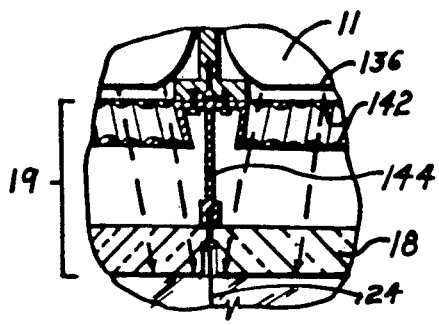
FIG. 48 is a greatly enlarged fragmentary sectional view illustrating the positioning, supporting, and fastening of the lenticular plate and rear projection screen assembly.

FIGS. 46 through 48 show another alternative optical enlarging assembly for use with the system. FIGS. 46 through 48 show enlarged sectional views of the display assembly shown in FIGS. 35 through 37 for use with system 1 in which the enlarging optics comprise a lenticular plate 19 and rear projection screen 18. The illuminated active display surface of each display unit 11 is reflected by a plurality of projection lenses 142 that comprise an associated lenticular plate 19 to an associated rear projection screen 18. The lenses are positioned such that each lenses projected images are enlarged adjacent to one another and form a continuous scene. The rear projection screens associated with each lenticular plate are placed tangent at their edges to form a continuing viewing surface above, to the side, and below the viewer. FIG. 46 shows a bottom corner of the display. The floor 130 consists of a rigid transparent material whose viewing side has been prepared with a rear projection screen coating or material. Each lenticular plate 19 and the rigid transparent floor that supports the viewer is supported by the supports 10e of the display unit 11. The rear projection screen 18 to the side of the viewer is held by the stage 133 and support armatures 144. For the walls and ceiling, the support armatures are fastened to the display unit supports 10b at one end and are fastened to the rear projection screen 18 at the other end. The support armatures 144 and fasteners 134 of the rear projection screen do not block or interfere with the projected image. Additionally, the support armatures 144 are constructed so they do not interfere with the transmission of the image from one side of the rear projection to the viewing side of the projection screen 18. The rear projection screen is either of a rigid or flexible rear projection material that is stretched tight and fastened at the edges. The lenticular plates are securely held in place by fasteners and armatures that are attached to the display unit supports 10. FIG. 47 shows an enlarged sectional diagram of the top corner of assembly 23 that incorporates lenticular plates 19 and a rear projection screen 18 to enlarge the displayed image. The greatly enlarged detail of FIG. 48 shows an arrangement of lenticular plates 19 and a rear projection screen 18 in which two adjacent display panels and said enlarging optics are placed adjacent to one another to form a continuous planar viewing surface.

U.S. Pat. No. 4,734,779 by Levis et al. discusses the use of lenticular screen and rear projection screen for enlarging an image. Levis et al. teaches that the image is preferably sub-segmented before projection in the present invention. Sub-segmenting can be accomplished in the present invention by a segment circuit means disclosed Levis et al prior to imaging on the active display system. In the present invention sub-segmenting the image can also be accomplished optically in the panoramic camera 5 or by the special effects unit 7. Furthermore, Levis et al. teaches that conventional rear projection screens may be replaced by a fiber optic plate 21 or lenticular plate 19 in the present invention.

Figure 51:
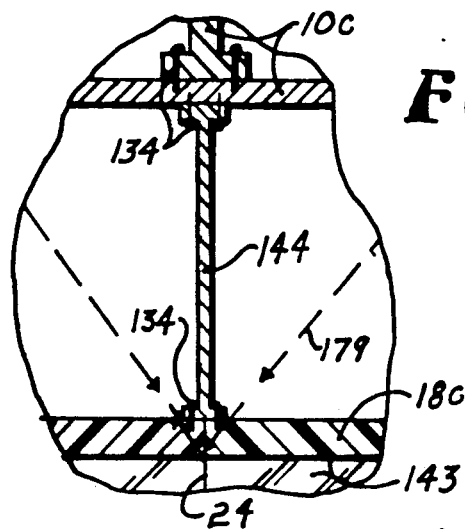
FIG. 51 is a greatly enlarged fragmentary sectional view illustrating the positioning, supporting, and fastening of the rear projection screen assembly.

Referring to 49 through 51, a final arrangement of the optical enlarging assembly for use with the large display assembly 23 of system 1 includes a rear projection screen 18 assembly. FIGS. 49 through 51 show enlarged sectional views of the display assembly shown in FIGS. 35 through 37 in which the enlarging optics comprise a rear projection screen 18. Display units 11 of a projection type, such as video projection unit 15, project transmitted image sub-segments 13a–13f,1–12 to the rear projection screen 18 assembly that surrounds the viewer.

Display units are held in place by the supports 10 and associated fasteners 134. Display units are located at a required distance from the rear projection screen to allow a focused image to be projected to the viewing surface of the rear projection screen 18. The display projectors 15 are positioned such that the images are projected tangent to one another and form a continuous scene on the viewing surface of the rear projection screen. FIG. 49 shows an enlargement of the bottom corner of the large display assembly in which floor framework 9 holds the display unit supports 10 of the floor above the stage 133. The display unit supports 10 in turn hold the planar transparent or translucent rigid flooring 130 material above the display units 11. The flooring may be of plastic, glass, or plastic-glass laminant sufficient to support the viewer. The viewing surface consists of a conventional rear projection screen material or preparation. A protective sheet of transparent glass may be placed on top of the rear projection screen to protect it from damage. FIG. 50 shows an enlargement of the top corner of the assembly in which the rear projection screen 18b and 18c segments to the sides and over of the viewer are held by support armatures which in turn attach to the display unit supports 10b and 10c respectively. The armatures 144 are held to the rear projection screen segments 18 and the display unit supports 10b and 10c by conventional fasteners 134. The armature is attached at the rear edges of the rear projection screen segments 18 such that the projected image is not blocked. In FIGS. 49-51, the edges of a projected image are denoted by dashed lines 179 with arrows indicating the direction of the projection. As shown in the greatly enlarged detail of FIG. 51, the image is refracted through the rear projection screen material at an angle that hides the fasteners 134 used to attach the screen 18 segment. Projectors 15 are conventional large screen projectors that accept an NTSC standard signal. Projectors adaptable for use in the display assembly 23 include the Talaria Television Projector line made by General Electric. This type of projection unit employs an Eidopher type of video projection system. This type of system employs a thin layer of oil which is electrostatically distorted by a scanned electron beam modulated by a video signal. A high intensity light source, such as a xenon light source, is beamed through the oil film and by way of optical elements to a rear projection screen 18. Alternatively, a direct CRT or LCD which includes a small diameter screen which produces a small but intense image which is suitable for projection with the assembly may be used. Alternatively a laser projector may be incorporated. All such conventional video projection systems may be used and are capable of reproducing color images. Each segmented picture is transmitted from an image controller over a conductor to its corresponding projector 15. The video signal representing each framestore cards 121 output picture segments are then transmitted to a corresponding video projector.

Typically the projection is onto flat surfaces as shown in FIGS. 49 through 51. Alternatively, FIGS. 52 through 53 illustrate rear projection onto a spherically shaped screen described in U.S. Pat. No. 4,656,506 is possible. In such an instance, it is known that when an image intended to be projected onto a flat surface is projected onto a spherical surface the image is "pin cushion" distorted such that a square figured would be rendered with inwardly curved sides. To compensate for such distortion, the original scene must be recorded with lenses which distort in an opposite sense, "barrel distort", or recorded image must be electronically processed (i.e. by a video special effects system 7) to oppositely distort them or the image must be oppositely distorted during projection. The preferred solution to such distortions is to re-distort the images during projection by use of aspheric lens elements within each projection unit. In the present system a plurality of video projection units 15 are incorporated. Projectors 15a-15f project their associated image segment 13a-13f to a corresponding rear projection screen 18a-18f. The projection units 15 and the screen segments 18 cooperate in such a way to project a substantially continuous panoramic scene onto the screen assembly 18a-18f such that a viewer sees a respective portion of the scene in any viewable direction. The framework 9 and supports 10 holding the screen 18 and projection units 15 may be connected or independent of one another.

The display assembly 23 illustrated in FIGS. 52 through 53 generally includes rear projection screens and projection units positioned within an opaque enclosure. A major portion of the screen assembly is the rear projection screen segments which form a polyhedral. In this example, the polyhedral is formed of four side segments 18a, 18b, 18d, and 18f, a top segment 18c, and floor segment 18e. The segments 18 have a supporting structural assembly comprising a framework of flanges which receive fasteners 134 such as bolts to join the segments 18. The floor screen 130 is supported by an edge of the stage 133. The stage 133 supports the opaque enclosure of the display assembly 23. The interior side 143 of all the segments 18 has a rear projection screen surface or material. Only the floor 130 must be of a rigid material to support the viewer, the side segments and top segments may be of a flexible rear projection screen material. A pneumatically supported flexible spherical rear projection screen 18, as disclosed in U.S. Pat. No. 4,656,506, may be incorporated to form the rear projection screen of system 1. Screen segments 18 or portions of screen segments may be moved laterally on rollers or by hinges to provide entry and exit by the viewer. The entry and exit openings 131 are hidden to the viewers eyes located at approximately the center of the viewing space 25. If a chair for the viewer to sit in is provided, it is desirable for the seating device to be rotatable about a vertical axis to allow the viewer to view in all azimuthal directions. The chair is preferably provided with a viewer interaction device, which may include program selection controls.

It is foreseen that display assemblies 22 and 23 as part of system 1 may be used in various kinds of vehicles. It is also foreseen that the display assemblies 22 and 23 of the system 1 may be used as a simulator for various kinds of vehicles 149. In such application, the device might take the form of simulated controls 150 for such vehicles 149. Similarly it is foreseen that the system could be used to remotely pilot a vehicle 149, such as described in FIG. 54 and 55. In FIG. 55 a panoramic camera system 5, of a type similar to the one described in FIG. 16, transmits by transmitter 75 a composite image 26 to a remote location for reception by receiver 76 for processing by processing means 3 and display by display system 4 within system 1. The system 1 replaces the recording, processing, and viewing systems put forth in U.S. Pat. No. 3,564,134, U.S. Pat. No. 4,549,208, U.S. Pat. No. 4,670,648, U.S. Pat. No. 4,518,990, and the like, to provide the viewer/operator of a remotely piloted vehicle 149 with a spherical field of view such that he or she can operate remote control devices 150 to transmit control signals to the remote control system 151 on the vehicle 149 to effect or affect actions of the vehicle 149.

It is further foreseen that the optical and camera arrangements disclosed in FIGS. 6 through 17 may transmit their recorded image to various types of sensors such as visual, motion detection, and pyroelectric sensors. And furthermore, the disclosed optical arrangements may be mounted such that their images are transmitted to optical sensors onboard unpiloted vehicles 149 such as robots.

It is to be understood that while certain forms of the present invention have been illustrated and described herein, it is not to be limited to the specific forms or arrangement of parts described and shown.

What is claimed and desired to be secured by Letters Patent is as follows:

1. An image display system comprising:
   (a) a video input source which outputs a video signal representing a composite image of a scene of substantially spherical coverage;
   (b) image processing means receiving said video signal and including:
   (1) a television production switcher device including a television special effects generator and segment circuit means;
   (2) said switcher device receiving said video signal and processing said video signal in cooperation with said television special effects generator for display during post production and for manipulating said image for final production;
   (3) said segment circuit processing said video signal to divide said complete image into segments to enable each segment to be displayed on a respective display of a plurality of video displays arranged in a geometric arrangement to reproduce said composite image of said scene; and
   (4) viewer interaction devices;
   (c) display assembly means including
   (1) a head mounted display assembly receiving a processed video signal which has been processed by said television special effects generator for display on said head mounted display assembly; and
   (2) a second display assembly including a plurality of display units receiving respective processed video signals representing image segments of said composite image from said segment circuit means; and
   (d) said display assembly means being arranged such that a viewer views a respective portion of said scene of substantially spherical coverage in any viewable direction.

2. An image display system comprising:
   (a) a video input source which functions to transmit a conventional raster scan television signal of a composite image representing a scene of substantially spherical coverage and which outputs a resulting video signal representing said image;
   (b) image processing including:
   (1) an image controller having segment circuit means to process said video signal to divide said composite image into rectangular image segments of conventional raster scan television format to enable each segment to be displayed on a respective display area of a conventional video display unit of conventional format in a similar orientation to said scene; and
   (2) viewer interaction devices to operate the processing means and including means to distribute said rectangular image segments of said composite image to conventionally formatted video display units; and
   (c) a display assembly means including a structural assembly mounting a plurality of said display units, said display units display screens facing inward to the viewer, said display units operable to display images in a size and shape equal to said rectangular divisions compatible with conventional raster scan television format, said display units arranged to form six rectangular sides positioned tangent to one another about a viewer such that a viewer views a respective portion of said composite image in any viewable direction surrounding the viewer.

3. An image display system comprising:
   (a) a video input source including a panoramic video camera system with a plurality of objective lenses which cooperate to record a composite image representing a scene of substantially spherical coverage and outputting a video signal representing said image
   (b) image processing means including a digital computer system to process said video signal representing said composite image and viewer interaction devices for operating said image processing means; and
   (c) display assembly means including a head-mounted display assembly with display system means for receiving said video signal as processed by said image processing means and displaying a selected portion of said composite image as defined by said image processing means.

4. A panoramic optical system comprising:
   (a) a plurality of objective lenses oriented in outwardly facing mutually angular relation to enable substantially spherical coverage by said lens means;
   (b) lens elements associated with each objective lens for transmission of images by way of optical means to a light sensitive surface;
   (c) said optical means transmitting said images such that they communicate a composite image of a substantially spherical field of view coverage to said light sensitive surface and where at least some of said optical means are positioned to change the direction of light to facilitate off-axis transmission of said transmitted images to said light sensitive recording surface; and
   (d) housing means to hold said objective lenses, said lens elements, and said optical means in place and in image communicating relationship to said light sensitive surface.

5. A portable video viewing system primarily for instant video viewing and selective, substantially concurrent, playback, said viewing system comprising:
   (a) a portable video camera including a lens assembly comprising a plurality of objective lenses oriented at equal angles from a mutual point, said objective lenses cooperating to achieve substantially spherical coverage about said mutual point;
   (b) optical means for optically transmitting subject images in focus from said objective lenses to a recording surface of said video camera;
   (c) connector interface means and camera electronics to generate and transmit a video signal representing a composite image gathered by said lens assembly to a reorder/player for storage on an associated storage medium;
   (d) said camera and recorder/player including viewing control adjustment means;
   (e) said camera and recorder/player including a portable power source; and
   (f) housing means of portable dimension and configuration and including:
   (1) an optical housing to hold optical elements including said lens assembly and said optical means in place;
   (2) a support armature to hold said optical elements of said optical housing in an advantageous viewing position;

(3) a backpack housing to hold said support armature and to hold said camera electronics and said recorder/player; and (4) fastening means to removably attach said backpack housing to a host being or vehicle.

6. An image display system comprising:

(a) a video input source which functions to transmit a composite image representing a scene of substantially spherical coverage and which outputs a resulting video signal representing said composite image;

(b) a plurality of rear projection screen systems including respective rear projection screens for receiving video signals from said segment circuit means, hidden and widely spaced rear screen projection display systems and associated rear projection screens being supported by a hidden structural assembly, and said rear projection screens being arranged adjacent to one another such that a viewer views a respective portion of images displayed by said rear projection screens in substantially any viewable direction, said screen means being adapted to have images projected onto an external surface and to have said images viewed from an internal surface of said rear projection screen;

(c) image processing means including:

(1) an image controller having segment circuit means to process said video signal to divide said composite image into image segments to enable each segment to be projected by dispersed projector display units from the exterior of the respective display area by video display units such that the resultant composite image results in a similar orientation to said scene; and (2) viewer interaction devices to operate the processing means and including means to distribute said image segments of said composite image to video display units; and (d) structural assembly including an opaque enclosure surrounding and supporting said rear projection display units, said rear projection screen being supported within said enclosure, entry and exit means positioned latterly of said viewer, planar structural support beneath the viewer on which the viewer is situated, and contiguous rear projection screen positioned beneath, to the sides, and above the viewer.

7. An image display system according to claim 3 wherein the image proceeding means comprises:

(a) an analog to digital converter for receiving said video signal;

(b) a television special effects unit for receiving a digital picture signal from said analog to digital converter;

(c) said special effects generator including a video image storage means for storing a video image;

(d) mask data means for providing mask shape information representative of a masking shape;

(e) coefficient processing means for receiving and processing the stored video image to provide an image of modified shape comprised of a plurality of picture points each synthesized from adjacent picture point information in dependence on masking shape information provided by said ask data means;

(f) computer means for generating desired mask data based on viewer input; and (g) a digital to analog converter for receiving said digital signal and converting the signal to a composite analog signal for transmission to a head-mounted display for display.

8. A system according to claim 5 wherein said assembly is a panoramic input source to a panoramic video camera including said light sensitive surface and which comprises:

(a) a lens assembly comprising said objective lenses spaced at 90 degree intervals on x-y-z axes from said mutual point, said objective lenses cooperating to achieve spherical coverage about said mutual point;

(b) said lens elements being associated respectively with said objective lenses for focusing their respective subjects to adjacent portions of said light sensitive surface of said camera;

(c) mirrors arranged on an optical path of each objective lens off-axis to said light sensitive surface to reflect an image gathered by said objective lens to said light sensitive surface; and (d) video camera electronics to generate a video signal representing images optically transmitted to said light sensitive surface.

9. A system according to claim 5 wherein said assembly is a panoramic video camera including said light sensitive surface and which comprises:

(a) a lens assembly comprising said objective lenses spaced at 90 degree intervals on x-y-z axes from said mutual point, said objective lenses cooperating to achieve spherical coverage about said mutual point;

(b) said lens elements being associated respectively with said objective lenses for focusing their respective subjects to adjacent portions of said light sensitive surface of said camera;

(c) right angled reflecting prisms incident respectively with said objective lens such that a subject image of each objective lens is reflected to said light sensitive surface;

(d) video camera electronics to generate a video signal representing images optically transmitted to said light sensitive surface.

10. A system according to claim 5 wherein said assembly is a panoramic input source to a panoramic video camera including said light sensitive surface and which comprises:

(a) a lens assembly comprising a plurality of said objective lenses spaced at equal angles from said mutual point, said objective lenses cooperating to achieve spherical coverage about said mutual point;

(b) a coherent image fiber optic guide associated with each objective lens to optically transmit a subject images to an exit end of the said image fiber guide, the fiber optic guides being gathered adjacent to one another at exit ends thereof such that they communicate a composite image of a substantially spherical field of view coverage to said light sensitive surface;

(c) said lens elements being associated respectively with said objective lenses for focusing their respective subjects in focus to entrance end of said fiber optic guides;

(d) video camera electronics to generate a video signal representing images optically transmitted to said light sensitive surface.

11. A system according to claim 1, 2, 3, or 6 wherein said video input source is a portable video viewing system primarily for instant video viewing and selective, substantially concurrent, playback, said system comprising:
   (a) a portable video camera including a lens assembly comprising a plurality of objective lenses oriented at equal angles from a mutual point, said objective lenses cooperating to achieve substantially spherical coverage about said mutual point;
   (b) optical means for optically transmitting subject images in focus from said objective lenses to a recording surface of said video camera;
   (c) connector interface means and camera electronics to generate and transmit a video signal representing a composite image gathered by said lens assembly to a reorder/player for storage on an associated storage medium;
   (d) said camera and recorder/player including viewing control adjustment means;
   (e) said camera and recorder/player including a portable power source; and
   (f) housing means of portable dimension and configuration and including:
      (1) an optical housing to hold optical elements including said lens assembly and said optical means in place;
      (2) a support armature to hold said optical elements of said optical housing in an advantageous viewing position;
      (3) a backpack housing to hold said support armature and to hold said camera electronics and said recorder/player; and
      (4) fastening means to removably attach said backpack housing to a host being or vehicle.

12. A system according to claim 5 wherein said viewing control adjustment means for said recorder/player comprises:
   (a) video screen means mounted within remote housing means and electrically interconnected to said recorder/player and structured to receive video signals therefrom and convert said signals into a visual display within said housing means, said video screen means comprising liquid crystal display means disposed in interrupting relation to a line of sight viewing defined by said optical means of said camera;
   (b) said viewing system including a dispersion lens means disposed in visually projecting relation to a visual display projected from said liquid crystal display means and structured to disperse said visual display in full and complete communication with said remote control housing; said dispersion lens means being disposed in overlying, immediately adjacent relation to said liquid crystal display means and comprising a convex configuration structured to project said visual display over said line of sight to a camera operator;
   (c) control means including circuitry means structured to selectively regulate, transfer and convert electrical video signals into visual display on said liquid crystal display means, whereby a user may instantaneously observe a predetermined field of viewing as a visual display on said liquid crystal display means and selectively view a substantially concurrent replay of the fields of view recorded by said camera; and
   (d) a remote control housing to hold in place said control means to enable a viewer to observe said visual display and manually operate said control means to interactively control said recorder/camera located at a remote location.

13. A system according to claim 5 and including:
   (a) a video over-the-air transmitter means; and
   (b) conductor means for transmitting said video signal from the recorder/player to said transmitter means.

14. A system according to claim 5 and including:
   (a) conductor means for transmitting said video signal from the video camera to a transmitter means and from said transmitter means to receiver means located at a remote location.

15. A system according to claim 5 wherein said recorder/player includes:
   (a) a audio including microphones for receiving audible sounds;
   (b) connectors for transmitting audio signals from said microphones to said recorder/player;
   (c) electrical circuitry included within the recorder/player for processing said audio signals; and
   (d) electrical means for combining said audio signals and said video signal into a television signal.

16. A system according to claim 1, 2, 3, or 6 wherein said video input source consists of a panoramic camera system comprising:
   (a) a plurality of video cameras recording a plurality of scenes and generating respective video signals representing said scenes which together achieve substantially spherical coverage about a point.

17. A system according to claim 1, 2, 3, or 6 wherein:
   (a) said video input source consists of a videotape player for transmitting video signals representing substantially spherical coverage from an associated medium of said videotape player.

18. A system according to claim 1, 2, 3, or 6 wherein:
   (a) said video input source consists of a videodisc player for transmitting video signals representing substantially spherical coverage from an associated medium of said videotape player.

19. A system according to claim 1, 2, 3, or 6 wherein:
   (a) a digital computer including a pixel programmable video display generator;
   (b) said video display generator being operatively connected to said display assembly means; and
   (c) graphics input means operatively connected to said computer to be operated by a viewer to cause the generation, alteration, and display of images by said display assembly means.

20. A system according to claim 1, 2, 3, or 6 where said image processing means comprises:
   (a) a first segment circuit means to divide an original video image into segments so that each segment is transmitted to a second segment circuit means; and
   (b) second segment circuit means operatively connected said first segment circuit means to divide first segments into sub-segments into sub-segments so that each sub-segment is displayed on a respective one of said video display units.

21. A system according to claim 1 wherein:
   (a) said segment circuit means of said image processing means includes a microcomputer used to transmit time code and program code.

22. A system according to claim 1 where said image processing means for said segment circuit processing means comprises:

(a) a video distribution means which receives and transmits said signal video representing said composite image to a plurality of control monitors;

(b) control monitors which convert said video signal into red, green, and blue component signals for transmission to each of a plurality of segment circuit means; and (c) said segment circuit means said component signals transmitted by control monitors and dividing an original video image into sub-segments so that each segment is displayed by a respective one of said display units.

23. A system according to claim 1 where said image processing means comprises:

(a) a plurality of video input sources, each input source transmitting a segment of said composite image to a respective one of a plurality of segment circuit means, each segment circuit means receiving a respective image segment and dividing first segments into sub-segments so that each sub-segment is displayed on respective one of said video display units.

24. A system according to claim 1 or 3 where said special effects generator of said image processing means comprises:

(a) an interactive control unit which the viewer can operate to transmit electronic command signals to effect input means and processing means associated of the system such that the resultant image is affected.

25. A system according to claim 1, 2, 3, or 6 and including:

(a) a panoramic display system of substantially spherical coverage as part of a control center to said in guidance of a remotely piloted vehicle on which a portable panoramic camera system of substantially spherical coverage is located.

26. A panoramic optical system for an unpiloted autonomous vehicle comprising:

(a) a housing means;

(b) a plurality of objective lens means positioned on said housing means in outwardly facing, mutually angular relation to enable substantially spherical coverage by said lens means; and (c) light sensitive means of said unpiloted autonomous vehicle optically communicating with said lens means and receiving respective images therefrom.

27. A system according to claim 1 or 2 which includes:

(a) an audio distribution system comprising an amplifier and audio speakers which are hidden and surround the viewer.

28. A panoramic camera system according to claims 4 or 5 wherein:

(a) adjacent objective lenses have overlapping fields of view coverage such that said objective lenses cooperate to record at least two views of each mutually adjacent scene taken on mutually diverging axes, such that the plurality of views of correspond to a substantially spherical field of view coverage.

29. A panoramic camera system according to claims 4 or 5 wherein:

(a) adjacent objective lenses have substantially adjacent fields of view coverage such that said objective lenses of said camera cooperate to record a single view of each mutually adjacent scene taken on mutually diverging axes, such that the plurality of views of correspond to a substantially spherical field of view coverage.

30. A display system according to claim 1 or 3 and including:

(a) said head mounted display assembly including said display system means, audio means, and housing assembly means;

(b) said display system means receiving said video signal as processed by said image processing means and said display system means converts said video signal into visual displays disposed in interruptive relation to a line of sight view of the viewer wearing said head mounted display assembly;

(c) said audio means receiving an audio signal transmitted from said image processing means including an amplifier and speakers associated with each of the viewer's ears; and (d) said housing assembly means being of portable dimension and configuration and including a viewing assembly structured to provide viewing by a user into the interior of said housing assembly means.

31. A display system according to claims 1 or 3 wherein said viewer interaction devices include:

(a) a position sensing system in direct communication with said head mounted display assembly and said image processing means, said position sensing system including:

(1) a source unit which generates a low-frequency magnetic field and is integrated with said head mounted display assembly;

(2) a sensor which senses said low-frequency magnetic field generated by said source unit and generates analog signals representing said field as sensed;

(3) analog circuitry to digitize said analog signals; and

)4) a system electronics unit containing hardware including a central processor to control said analog circuitry and software necessary for the position sensing system to compute the position and orientation of the sensor; and (b) a digital computer system arranged and programmed for direct communication with the position sensing system wherein said computer system receives position data from said position sensing system and transmits said position data to said television special effects generator which operates upon said data to define a portion of the composite image within the field of view to be observed on said head mounted display assembly.

32. A system according to claim 1 or 3 wherein:

(a) said head mounted display assembly includes two display units; and (b) said segment circuit means is connected between said special effects generator unit and said head mounted display assembly such that segment circuit means operates to divide a portion of the scene of spherical coverage into two image segments corresponding to the viewer's left and right eyes so that each image is displayed by a respective one of said two display units of said head mounted display assembly.

33. A system according to claims 1 or 3 wherein:

(a) said television special effects generator unit includes a viewer interaction device comprising a floating viewpoint control circuit means operatively connected for electronically communicating a desired position, orientation, and field of view to said television special effects generator unit.

34. A system according to claim 1 or 3 wherein said image processing means includes:
   (a) a microcomputer operatively configured for receiving said video signal representing said composite image of substantially spherical coverage and including:
      (1) converter means for converting said video signal representing said composite image to digital signals;
      (2) digital computer hardware and software for processing said digital signals; and
      (3) an internal bus for communicating with printed circuit boards;
   (b) a printed circuit board means for processing input video information such that said image can be panned, scrolled, and wrapped in the manner of a continuous three dimensional image and including output signal means to transmit the processed image for further processing or display; and
   (c) interactive devices to select a portion of the processed composite image to be viewed.

35. A large display assembly according to claim 1 and including:
   (a) a structural assembly arranged in a polyhedral fashion for holding in place display units of said display assembly such that a viewer views a respective portion of said images in substantially any viewable direction surrounding the viewer;
   (b) said structural assembly including viewer support means integrated with said structural assembly below the viewer such that the viewer can position himself within the display assembly; and
   (c) said structural assembly having an entry and exit which is positioned laterally of a viewer within said structural assembly.

36. A panoramic display assembly according to claims 1 or 2 wherein said display units include:
   (a) a plurality of cathode ray tube monitors for receiving video signals from said segment circuit means, said monitors being supported by said structural assembly, and said monitors having front faces arranged adjacent to one another such that a viewer views a respective portion of images displayed on said monitors in substantially any viewable direction.

37. A panoramic display assembly according to claim 1 or 2 wherein said display units include:
   (a) a plurality of flat panel display systems for receiving video signals from said segment circuit means, said flat panel display systems being supported by said structural assembly, and said flat panel display systems having front faces arranged adjacent to one another such that a viewer views a respective portion of images displayed on said flat panel display systems in any substantially viewable direction.

38. A panoramic display assembly according to claim 1 wherein said display assembly includes optical enlargement means comprising:
   (a) a plurality of lenticular optical plates, each plate including a plurality of lens elements which magnify in focus in the range of magnification of 1.1 to 1.5, said plates being positioned side-by-side to form a plate of lens elements, one of said lenticular optical plates being positioned in front of a face plate of each of said display units; and
   (b) a rear projection screen having a rear surface and a front surface upon which a final image to be viewed appears, and said images being combined on said screen to form a unitary image of substantially spherical coverage.

39. A panoramic display assembly according to claim 1 wherein said display assembly includes optical enlargement means comprising:
   (a) a rear projection screen including a fiber optic plate with a front face positioned to receive images from said display units, said fiber optic plates being arranged with said front adjacent one another to form a unitary image of substantially spherical coverage.

40. An image display system according to claim 1, 2, 3, or 6 and including:
   (a) first means for integrating information representing image segments corresponding to at least two views of a geometric system and producing a data segment corresponding to a single view of said geometric system and containing said information corresponding to said two views, wherein the original information to be processed is input from panoramic camera means and comprises a plurality of views of said geometric system which corresponds to a continuous equivalent image of a substantially spherical field of view; and
   (b) second means for processing said data segment produced by said first means to provide information for simulating a third view of said geometric system and including a video generation system for outputting data segments produced by the second means as image segments comprising substantially spherical coverage to said display assembly means.

41. A panoramic display assembly according to claims 1 wherein said display assembly includes optical enlargement means which comprises:
   (a) fresnel lens plates positioned to receive images from said display units, said fresnel lens plates being arranged adjacent one another and having an optical design to refract a unitary image of substantially spherical coverage to the viewer.

42. A system as set forth in claim 3 wherein:
   (a) said panoramic video camera is positioned on a vehicle, said objective lenses of said camera being integral with the exterior surface of the vehicle.

43. A system according to claim 5 and including:
   (a) a video multiplexer device for receiving video signals transmitted from a plurality of cameras recording a plurality of scenes and generating respective video signals representing said scenes which together achieve substantially spherical coverage about a point; where said video signals are combined by said multiplexer device into a single signal transmitted on a single circuit; said multiplexer receiving electricity from said portable power source; said multiplexed signal being transmitted by conductor to said recorder for storage of said multiplexed images.

44. A system according to claim 5 wherein said portable video viewing system includes:
   (a) a plurality of video cameras recording a plurality of scene and generating respective video signals representing said scenes which together achieve substantially spherical coverage about a point.

45. A system according to claim 1, 2, 3, or 6 including:
(a) a video multiplexer device for receiving video signals transmitted from a plurality of cameras recording a plurality of scenes and generating respective video signals representing said scenes which together achieve substantially spherical coverage about a point; where said video signals are combined by said multiplexer device into a single signal transmitted on a single circuit; and
(b) a video demultiplexer device for receiving said multiplexed signal transmitted from said multiplexer device and electronically separating said multiplexed signal into separate video signals each representing said scenes which together achieve substantially spherical coverage about a point, such that said demultiplexed signals are applied to separate circuits for processing and display.

46. A system as set forth in claim 5 wherein:
(a) said objective lenses of said camera being integral with the exterior surface of the vehicle.

47. A display system for virtual interaction with said recorded images according to claims 1, 2, 3, or 6 comprising:
(a) a housing means;
(b) a plurality of objective lens means positioned on said housing means in outwardly facing, mutually angular relation to enable substantially spherical coverage by said lens means; and
(c) light sensitive means optically communicating with said lens means and receiving respective optical images therefrom and generating image signals representing said optical images;
(d) image recorder means communicating said light sensitive means and operative to store said image signals;
(e) image processing means communicating with said light sensitive means and said recorder means, receiving said image signals from at least one of said light sensitive means and said recorder means, and operable to texture map virtual images represented by said image signals onto a three dimensional form;
(f) a display assembly communicating with said image processing means and enabling the display of the texture mapped virtual images; and
(g) viewer control means communicating with said image processing means and enabling interactive manipulation of said texture mapped virtual images.

48. A remote control unit for a portable video viewing system comprising:
(a) video screen means mounted within a remote housing means in communicating relationship to a recorder/player and structured to receive video signals representing a composite scene therefrom and convert said signals for visual display within said housing means, said video screen means comprising display means disposed in interrupting relation to a line of sight viewing defined by the optical means of a corresponding camera;
(b) said viewing system including a dispersion lens means disposed in visually projecting relation to a visual display projected from said display means and structured to disperse said visual display in full and complete communication with said remote control housing; said dispersion lens means being disposed in overlying, immediately adjacent relation to said display means and comprising a convex configuration structured to project said visual display over said line of sight to a camera operator;
(c) control means including circuitry means structured to selectively regulate, transfer and convert electrical video signals into visual display on said display means, whereby a user may instantaneously observe a predetermined field of viewing as a visual display on said display means and selectively view a substantially concurrent replay of the fields of view recorded by said camera;
(d) a portable power source in communicating relationship with said video screen means and said control means; and
(e) a remote control housing to hold in place said control means to enable a viewer to observe said visual display and manually operate said control means to interactively control said recorder/camera located at a remote location.

* * * * *

UNITED STATES PATENT AND TRADEMARK OFFICE
CERTIFICATE OF CORRECTION

PATENT NO. : 5,130,794
DATED : July 14, 1992
INVENTOR(S) : Kurtis J. Ritchey

It is certified that error appears in the above-identified patent and that said Letters Patent is hereby corrected as shown below:

Title page, Item [54], change the original title of the invention from "PANORAMIC DISPLAY SYSTEM" to the amended title ---PANORAMIC IMAGE BASED VIRTUAL REALITY DISPLAY SYSTEM---;

Col. 1, line 1-2, change the original title of the invention from "PANORAMIC DISPLAY SYSTEM" to the amended title ---PANORAMIC IMAGE BASED VIRTUAL REALITY DISPLAY SYSTEM---.

Signed and Sealed this

Seventh Day of September, 1993

Attest:

BRUCE LEHMAN

*Attesting Officer*    *Commissioner of Patents and Trademarks*